(12) United States Patent
Gou et al.

(10) Patent No.: US 11,978,246 B2
(45) Date of Patent: *May 7, 2024

(54) METHOD, SYSTEM, AND COMPUTER PROGRAM PRODUCT FOR IMPLEMENTING REINFORCEMENT LEARNING

(71) Applicant: Visa International Service Association, San Francisco, CA (US)

(72) Inventors: Liang Gou, San Jose, CA (US); Hao Yang, San Jose, CA (US); Wei Zhang, Fremont, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/092,528

(22) Filed: Jan. 3, 2023

(65) Prior Publication Data
US 2023/0144690 A1 May 11, 2023

Related U.S. Application Data

(63) Continuation of application No. 16/369,770, filed on Mar. 29, 2019, now Pat. No. 11,593,659.
(Continued)

(51) Int. Cl.
*G06V 10/82* (2022.01)
*G06F 18/21* (2023.01)
(Continued)

(52) U.S. Cl.
CPC ............ *G06V 10/82* (2022.01); *G06F 18/217* (2023.01); *G06F 18/231* (2023.01); *G06N 3/086* (2013.01); *G06V 10/764* (2022.01); *G06V 10/776* (2022.01)

(58) Field of Classification Search
CPC .... G06V 10/82; G06V 10/764; G06V 10/776; G06F 18/217; G06F 18/231; G06N 3/086;
(Continued)

(56) References Cited

U.S. PATENT DOCUMENTS

2018/0253837 A1\* 9/2018 Ghesu .................. G06T 7/0012
2019/0095818 A1\* 3/2019 Varadarajan ........... G06N 20/20

OTHER PUBLICATIONS

Alsallakh et al., "Do Convolutional Neural Networks Learn Class Hierarchy?", IEEE Transactions on Visualization and Computer Graphics, 2018, pp. 152-162, vol. 24:1.
(Continued)

*Primary Examiner* — Jianxun Yang
(74) *Attorney, Agent, or Firm* — The Webb Law Firm

(57) ABSTRACT

Provided is a method for implementing reinforcement learning by a neural network. The method may include performing, for each epoch of a first predetermined number of epochs, a second predetermined number of training iterations and a third predetermined number of testing iterations using a first neural network. The first neural network may include a first set of parameters, the training iterations may include a first set of hyperparameters, and the testing iterations may include a second set of hyperparameters. The testing iterations may be divided into segments, and each segment may include a fourth predetermined number of testing iterations. A first pattern may be determined based on at least one of the segments. At least one of the first set of hyperparameters or the second set of hyperparameters may be adjusted based on the pattern. A system and computer program product are also disclosed.

20 Claims, 37 Drawing Sheets

Related U.S. Application Data

(60) Provisional application No. 62/650,402, filed on Mar. 30, 2018.

(51) Int. Cl.
  *G06F 18/231* (2023.01)
  *G06N 3/086* (2023.01)
  *G06V 10/764* (2022.01)
  *G06V 10/776* (2022.01)

(58) Field of Classification Search
  CPC ........ G06N 3/045; G06N 3/006; G06N 3/084; G06N 7/01
  See application file for complete search history.

(56) References Cited

OTHER PUBLICATIONS

Bellemare et al., "The Arcade Learning Environment: An Evaluation Platform for General Agents", Journal of Artificial Intelligence Research, 2013, pp. 253-279, vol. 47.

Bellman, "Multi-Stage Games", Dynamic Programing, 2003, pp. 283-316, Dover Publications, Inc., Mineola, NY, USA.

Christiano et al., "Deep Reinforcement Learning from Human Preferences", 31st Conference on Neural Information Processing Systems, 2017, 9 pages, Long Beach, CA, USA.

François-Lavet et al., "How to Discount Deep Reinforcement Learning: Towards New Dynamic Strategies", Deep Reinforcement Learning Workshop (NIPS 2015), 2015, 9 pages.

Goertzel et al., Artificial General Intelligence, 2007, pp. 230-240, vol. 2, Springer-Verlag, New York, New York, USA.

Gotz et al., "DecisionFlow: Visual Analytics for High-Dimensional Temporal Event Sequence Data", IEEE Transactions on Visualization and Computer Graphics, 2014, pp. 1783-1792, vol. 20:12.

Guo et al., "EventThread: Visual Summarization and Stage Analysis of Event Sequence Data", IEEE Transactions on Visualization and Computer Graphics, 2018, pp. 56-65, vol. 24:1.

Hastie et al., The Elements of Statistical Learning: Data Mining, Interference, and Prediction, 2009, pp. 520-528, Second Edition, Springer, New York, NY, USA.

Kahng et al., "ActiVis: Visual Exploration of Industry-Scale Deep Neural Network Models", IEEE Transactions on Visualization and Computer Graphics, 2018, pp. 88-97, vol. 24:1.

Krstajić, "CloudLines: Compact Display of Event Episodes in Multiple Time-Series", IEEE Transactions on Visualization and Computer Graphics, 2011, pp. 2432-2439, vol. 17:12.

Liu et al., "Towards Better Analysis of Deep Convolutional Neural Networks", IEEE Transactions on Visualization and Computer Graphics, 2017, pp. 91-100, vol. 23:1.

Liu et al., "Analyzing the Training Processes of Deep Generative Models", IEEE Transactions on Visualization and Computer Graphics, 2018, pp. 77-87, vol. 24:1.

Ming et al., "Understanding Hidden Memories of Recurrent Neural Networks", IEEE Conference on Visual Analytics Science and Technology (VAST), 2017, 16 pages.

Mnih et al., "Playing Atari with Deep Reinforcement Learning", NIPS Deep Learning Workshop, 2013, 9 pages.

Mnih et al., "Human-level control through deep reinforcement learning", Nature, 2015, pp. 529-533, vol. 518.

Monroe et al., "Temporal Event Sequence Simplification", IEEE Transactions on Visualization and Computer Graphics, 2013, pp. 2227-2236, vol. 19, No. 12.

Perer et al., "MatrixFlow: Temporal Network Visual Analytics to Track Symptom Evolution during Disease Progression", AMIA Annual Symposium Proceedings, 2012, pp. 716-725, vol. 2012.

Plaisant et al., "LifeLines: Visualizing Personal Histories", Technical Research Report, 1996, 9 pages, Institute for Systems Research.

Qiu et al., "A survey of machine learning for big data processing", EURASIP Journal on Advances in Signal Processing, 2016, 16 pages, vol. 67.

Salvador et al., "FastDTW: Toward Accurate Dynamic Time Warping in Linear Time and Space", Intelligent Data Analysis, 2007, pp. 561-580, vol. 11:5.

Springenberg et al., "Striving for Simplicity: The All Convolutional Net", ICLR 2015 (Workshop Track), 2015, 14 pages.

Strobelt et al., "LSTMVis: A Tool for Visual Analysis of Hidden State Dynamics in Recurrent Neural Networks", IEEE Transactions on Visualization and Computer Graphics, 2018, pp. 667-676, vol. 24:1.

Van Der Maaten et al., "Visualizing Data using t-SNE", Journal of Machine Learning Research, 2008, pp. 2579-2605, vol. 9.

Watkins et al., "Technical Note Q-Learning", Machine Learning, 1992, pp. 279-292, vol. 8.

Wongsuphasawat et al., "LifeFlow: Visualizing an Overview of Event Sequences", Proceedings of the SIGCHI Conference on Human Factors in Computing Systems, 2011, pp. 1747-1756, ACM, San Jose, CA, USA.

Zhao et al., "MatrixWave: Visual Comparison of Event Sequence Data", Proceedings of the SIGCHI Conference on Human Factors in Computing Systems, 2015, pp. 259-268, ACM, San Jose, CA, USA.

Zhao et al., "Egocentric Analysis of Dynamic Networks with EgoLines", Proceedings of the 2016 CHI Conference on Human Factors in Computing Systems, 2016, pp. 5003-5014, ACM, San Jose, CA, USA.

"Simple DQN", Commit Apr. 25, 2017, accessed Nov. 7, 2019, retrieved from https://github.com/tambetm/simple_dqn/tree/e34a0a14477b0feea8609596f880f7cbeaf5c61b.

* cited by examiner

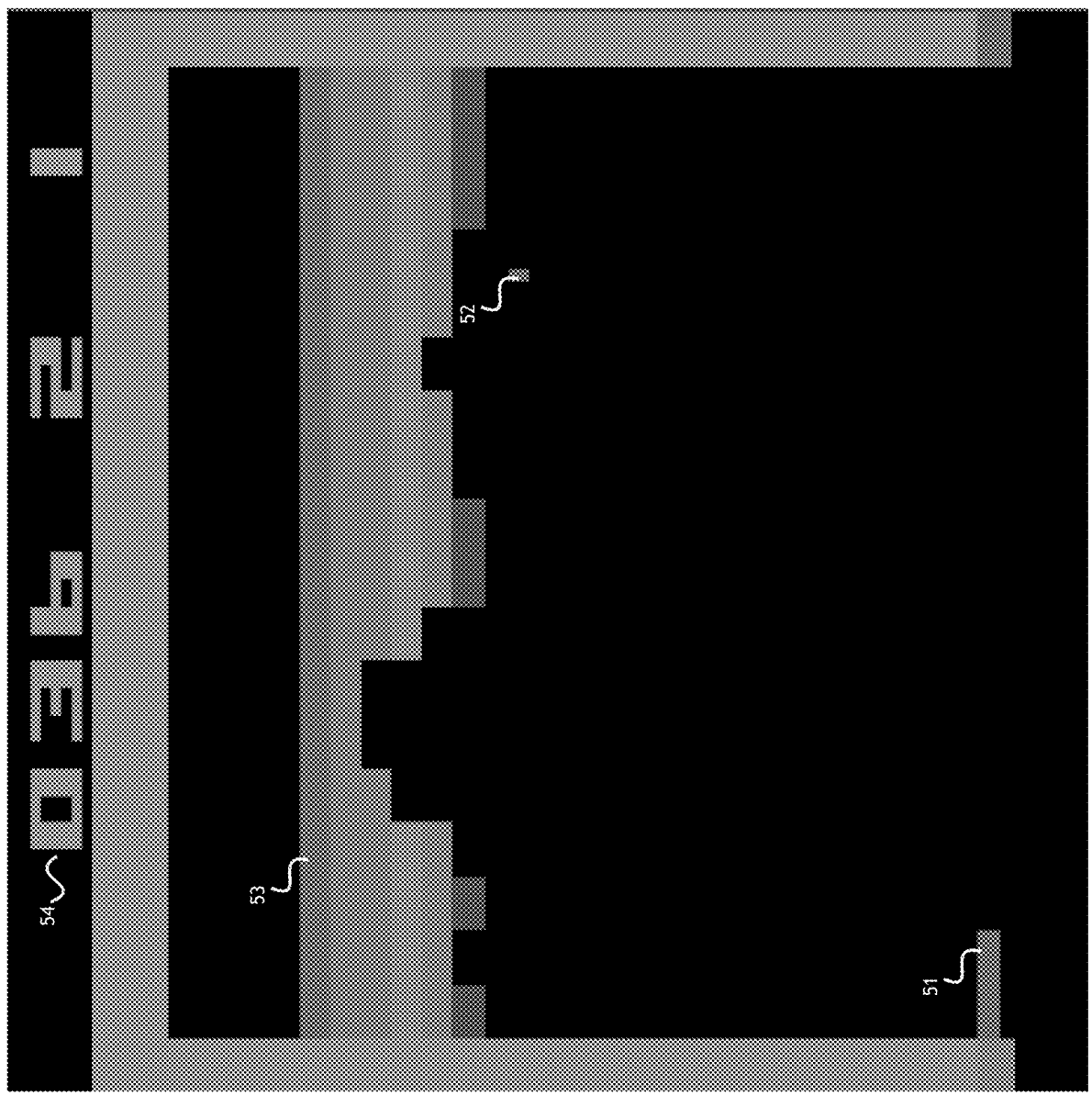

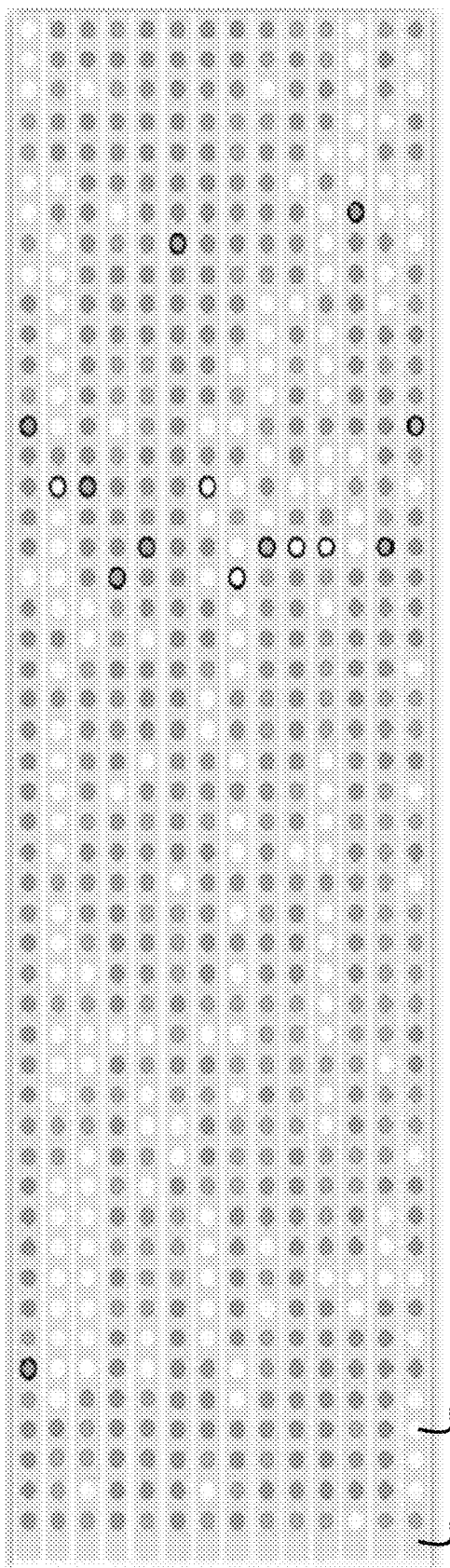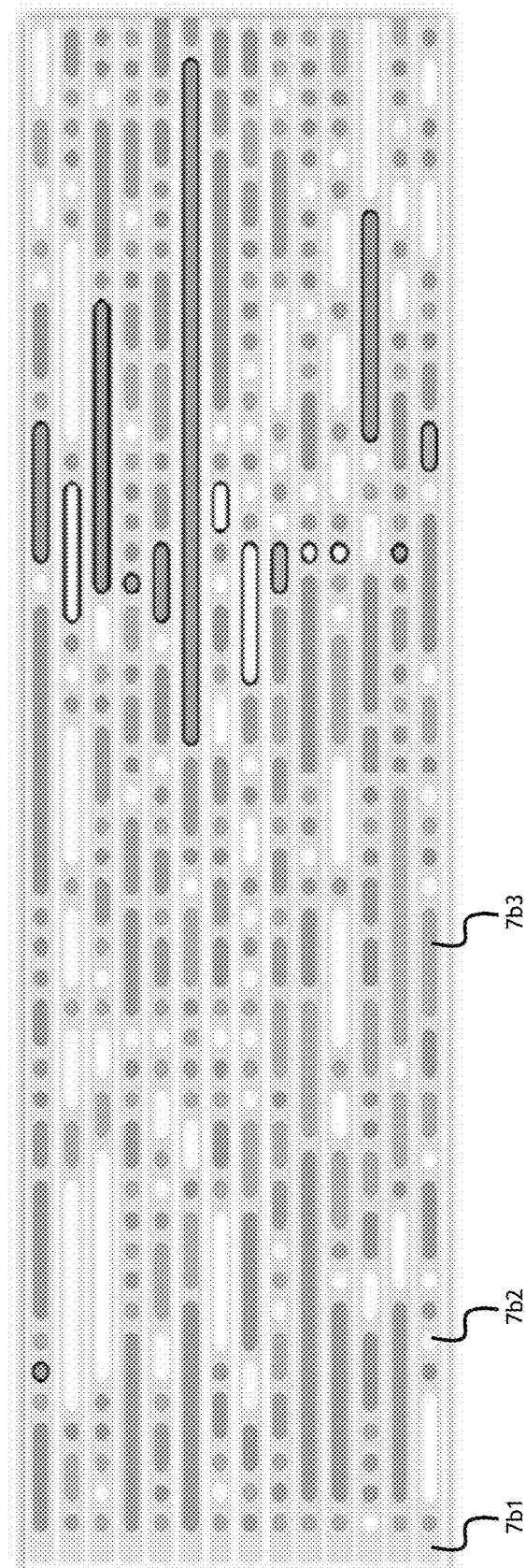
FIG. 7A
FIG. 7B

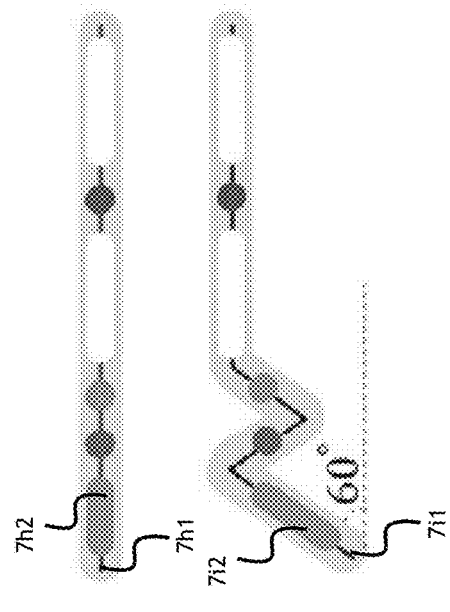
FIG. 7F
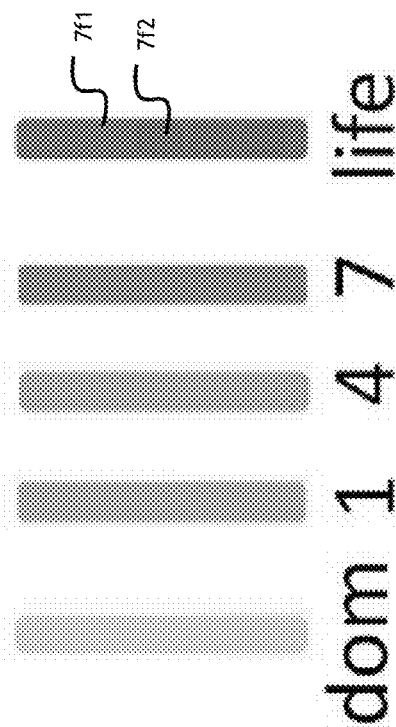
FIG. 7H
FIG. 7I
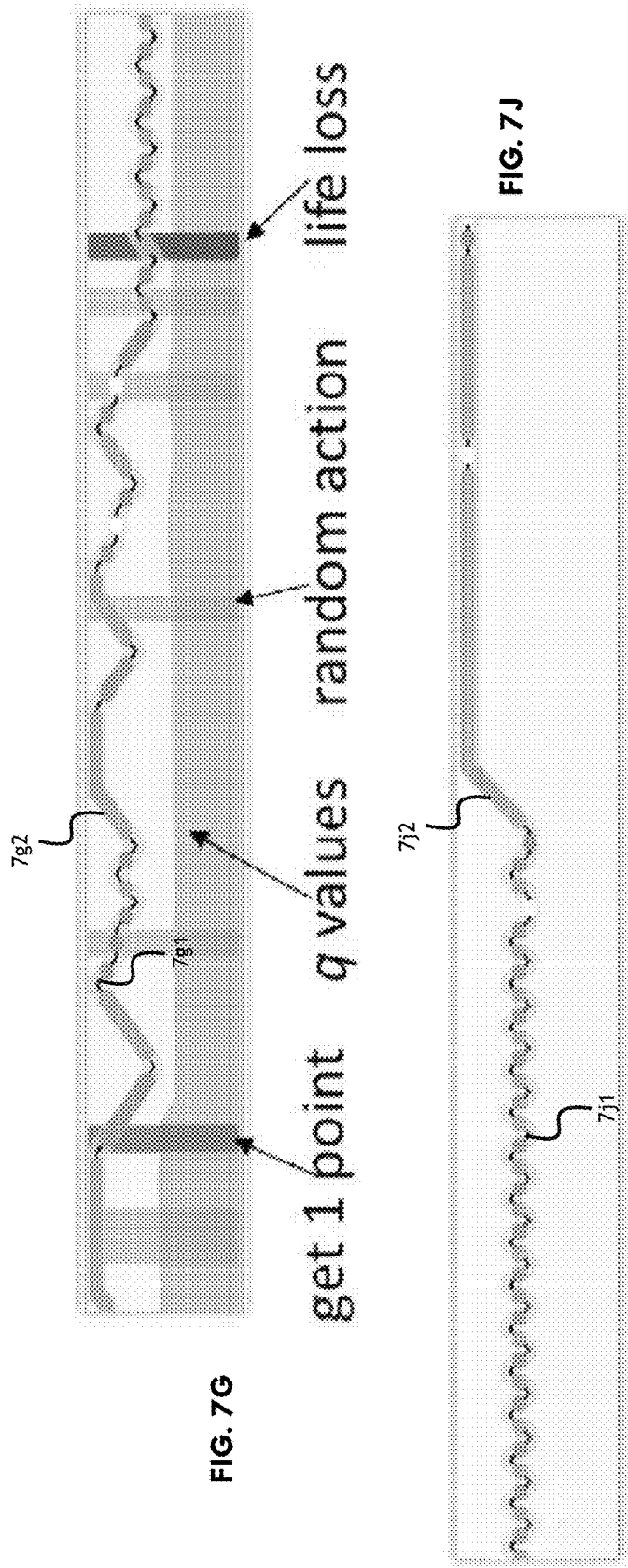
FIG. 7G
FIG. 7J

METHOD, SYSTEM, AND COMPUTER PROGRAM PRODUCT FOR IMPLEMENTING REINFORCEMENT LEARNING

CROSS REFERENCE TO RELATED APPLICATIONS

This application is a continuation of U.S. patent application Ser. No. 16/369,770, filed Mar. 29, 2019, which claims the benefit of U.S. Provisional Patent Application No. 62/650,402, filed Mar. 30, 2018, the disclosure of which is hereby incorporated by reference in its entirety.

BACKGROUND

1. Field

The disclosed subject matter relates generally to methods, systems, and products for implementing reinforcement learning and, in one particular embodiment, to a method, system, and computer program product for implementing reinforcement learning by a neural network.

2. Technical Considerations

A reinforcement learning (RL) model may be intended to train an agent (e.g., a programmed actor and/or the like) to perform actions within an environment to achieve a desired goal. For example, a deep Q-network (DQN) model may include a neural network (e.g. a deep convolutional neural network and/or the like) that may be trained by Q-learning to increase (e.g., maximize, improve, and/or the like) cumulative future reward.

For the purpose of illustration, an agent utilizing such a DQN model may play a video game (e.g., an arcade game; a console game such as an Atari® 2600 game, a Nintendo® game, and/or the like; a personal computer (PC) game; an internet game; an emulated game such as a game in a console emulator; and/or the like). For example, the state of the environment (e.g., screen images (raw pixels), game score/rewards, and/or the like) may be used as input for a DQN agent, and the set of possible actions for the agent may be the set of actions available to a player in the game. In some examples, a videogame may be an Atari® 2600 game such as Breakout®. Breakout® may include firing a ball to hit bricks (e.g., near the top of the screen) to score points and catching/intercepting the ball with a paddle (e.g., near the bottom of the screen) to avoid loss of life. As such, a DQN agent may interact with the environment (e.g., the Breakout® game) to achieve an increased (e.g., maximum possible) reward through iterative trainings. The DQN agent may become increasingly intelligent (e.g., better able to predict a move with an increased possible reward in response to different states of the environment) with successive iterations. Such a DQN agent may be able to surpass human players of such games (e.g., Atari® 2600 games such as Breakout®) in performance.

However, training such DQN models may involve more iterations and/or the like (e.g., experience, explorations, and know-how) than other types of machine learning models. For example, unlike supervised/unsupervised learning models that learn from a predefined (e.g., finite) set of data instances (e.g., with or without labels), reinforcement learning models learn from the experiences (e.g., training data) of the agent, and the experiences may be generated dynamically over time. As such, reinforcement learning may involve dynamic summarizations/quantifications of the agent's experiences to achieve a better understanding of the training data. Additionally, a reinforcement learning model (e.g., a DQN model) may use a certain amount of random inputs during training (e.g., selecting a random action in a videogame). The random actions/inputs may provide the agent more flexibility to explore the unknown part of the environment, but also may prevent the agent from fully exploiting the known part of the environment using currently learned intelligence (e.g., a tradeoff between exploration and exploitation). As such, it may be difficult to determine a proper random rate for training. Moreover, interpreting the behavior of a reinforcement learning agent (e.g., a DQN agent) may be challenging. For example, when the agent makes an action (e.g., an action in a video game such as moving a paddle to the left or right in Breakout®), it may be difficult to determine what caused the agent to take such an action. The action may be an intentional move (e.g., based on predicting an action with a greatest potential future reward) or the action may be a random choice. If the action is intentional, it may be difficult to determine which portion(s) of the input were salient (e.g., most salient or relatively highly salient) to the prediction of the action. However, the statistics and/or metrics that may be used in interpreting the agent's behavior may be difficult to capture or obtain and/or the readily captured/available statistics may not be sufficient for such interpretations. For at least these reasons, in-depth understanding of the reinforcement learning (e.g., DQN) models and interpreting the sophisticated behaviors of reinforcement learning (e.g., DQN) agents may be challenging.

Certain visual analytics works approaches may assist in understanding and improving certain neural networks. For example, such approaches may have been used in connection with supervised learning models, semi-supervised learning models, and/or unsupervised learning models. Such approaches may expose the models at multiple levels of details simultaneously. However, visual analytics works approaches may not be available and/or sufficient for reinforcement learning models (e.g., DQN models and/or the like).

SUMMARY

Accordingly, it is an object of the presently disclosed subject matter to provide methods, systems, and computer program products for implementing reinforcement learning, e.g., by a neural network.

According to non-limiting embodiments or aspects, provided is a method for implementing reinforcement learning by a neural network. In some non-limiting embodiments or aspects, a method for implementing reinforcement learning by a neural network may include, for each epoch of a first predetermined number of epochs, performing a second predetermined number of training iterations and a third predetermined number of testing iterations using a first neural network. The first neural network may include a first set of parameters. The training iterations may include a first set of hyperparameters, and the testing iterations may include a second set of hyperparameters. The testing iterations may be divided into segments. Each segment may include a fourth predetermined number of testing iterations. A first pattern based on at least one of the segments may be determined. At least one of the first set of hyperparameters or the second set of hyperparameters may be adjusted based on the pattern.

In some non-limiting embodiments or aspects, a first view may be displayed. For example, the first view may include a first chart of a first type and a second chart of a second type different than the first type. Additionally or alternatively, the first chart and/or the second chart may represent all testing iterations of all epochs. In some non-limiting embodiments or aspects, a second view may be displayed. For example, the second view may include a third chart of a third type and a fourth chart of a fourth type different than the third type. Additionally or alternatively, the third chart and/or the fourth chart may represent all testing iterations of one epoch of the first predetermined number of epochs. In some non-limiting embodiments or aspects, the epoch (e.g., the one epoch, each epoch, and/or the like) may be divided into episodes. For example, each episode may include a set of consecutive iterations of the testing iterations until a condition is satisfied. In some non-limiting embodiments or aspects, a third view may be displayed. For example, the third view may include a fifth chart of a fifth type. Additionally or alternatively, the fifth chart may represent all testing iterations of one episode.

In some non-limiting embodiments or aspects, the second view may be displayed in response to an interaction with the first view. Additionally or alternatively, the third view may be displayed in response to an interaction with the second view. Additionally or alternatively, a dendrogram representing a clustering of patterns including the first pattern may be displayed. In some non-limiting embodiments or aspects, determining the first pattern may include selecting the first pattern from the dendrogram. Additionally or alternatively, selecting the first pattern may cause at least one segment of the one episode in the fifth chart of the third view to be highlighted. Additionally or alternatively, the first pattern may be determined based on the third view (e.g., observed in the third view and/or the like).

In some non-limiting embodiments or aspects, a fourth view may be displayed. For example, the fourth view may include a sixth chart of a sixth type, a seventh chart of a seventh type, and an eighth chart of an eighth type. Additionally or alternatively, the sixth chart may represent all testing iterations of one segment. Additionally or alternatively, the seventh chart may represent processing elements of the neural network during the one segment. Additionally or alternatively, the eighth chart may represent at least one of an average state of an environment and a saliency map of processing elements in response thereto.

In some non-limiting embodiments or aspects, determining the first pattern may include determining the first pattern based on the third view (e.g., observing in the third view and/or the like).

In some non-limiting embodiments or aspects, each training iteration may include receiving first state data indicating a first state of an environment, determining a first action from a set of possible actions based on the first state data using the first neural network, performing the first action within the environment, receiving second state data indicating a second state of the environment after performance of the first action and first reward data indicating a first reward achieved in the environment by performance of the first action, and/or storing first action data indicating the first action, the first reward data, the first state data, and the second state data. Additionally or alternatively, a subset of the training iterations may further include updating the first set of parameters of the first neural network based on at least one of the action data, the reward data, the first state data, and the second state data. Additionally or alternatively, the subset of the training iterations may be determined based on the first set of hyperparameters.

In some non-limiting embodiments or aspects, the first set of parameters may be copied from the first neural network to a second neural network after a fourth predetermined number of training iterations. Additionally or alternatively, updating the first set of parameters may include determining a first predicted reward based on the first state data using the first neural network, determining a second predicted reward based on the second state data and the first reward data using the second neural network, and/or adjusting the first set of parameters to reduce a difference between the first predicted reward and the second predicted reward.

In some non-limiting embodiments or aspects, each testing iteration may include receiving third state data indicating a third state of an environment, determining a second action from the set of possible actions based on the third state data using the first neural network, performing the second action within the environment, and/or receiving fourth state data indicating a fourth state of the environment after performance of the second action and second reward data indicating a second reward achieved in the environment by performance of the second action.

In some non-limiting embodiments or aspects, adjusting the first set of hyperparameters and/or the second set of hyperparameters may include adjusting at least one of a probability of determining a random action or a condition for determining the random action for at least one of the training iterations or the testing iterations. Additionally or alternatively, adjusting the first set of hyperparameters and/or the second set of hyperparameters may include or adjusting at least one of a probability of using a first subset of training iterations or a condition for using the first subset of training iterations for updating the first set of parameters of the first neural network.

According to non-limiting embodiments or aspects, provided is a system for implementing reinforcement learning by a neural network. In some non-limiting embodiments or aspects, the system for implementing reinforcement learning by a neural network may include at least one processor. At least one non-transitory computer readable medium may include instructions to direct the processor to, for each epoch of a first predetermined number of epochs, perform a second predetermined number of training iterations and a third predetermined number of testing iterations using a first neural network. The first neural network may include a first set of parameters. The training iterations may include a first set of hyperparameters. The testing iterations may include a second set of hyperparameters. The testing iterations may be divided into segments. Each segment may include a fourth predetermined number of testing iterations. A first pattern may be determined based on at least one of the segments. At least one of the first set of hyperparameters or the second set of hyperparameters may be adjusted based on the pattern.

In some non-limiting embodiments or aspects, a first view may be displayed. For example, the first view may include a first chart of a first type and a second chart of a second type different than the first type. Additionally or alternatively, the first chart and/or the second chart may represent all testing iterations of all epochs. In some non-limiting embodiments or aspects, a second view may be displayed. For example, the second view may include a third chart of a third type and a fourth chart of a fourth type different than the third type. Additionally or alternatively, the third chart and/or the fourth chart may represent all testing iterations of one epoch of the first predetermined number of epochs. In some non-limiting embodiments or aspects, the epoch (e.g., the one epoch, each epoch, and/or the like) may be divided into episodes. For example, each episode may include a set of consecutive iterations of the testing iterations until a condition is satisfied. In some non-limiting embodiments or aspects, a third view may be displayed. For example, the third view may include a fifth chart of a fifth type. Additionally or alternatively, the fifth chart may represent all testing iterations of one episode.

In some non-limiting embodiments or aspects, the second view may be displayed in response to an interaction with the first view. Additionally or alternatively, the third view may be displayed in response to an interaction with the second view. Additionally or alternatively, a dendrogram representing a clustering of patterns including the first pattern may be displayed. In some non-limiting embodiments or aspects, determining the first pattern may include selecting the first pattern from the dendrogram. Additionally or alternatively, selecting the first pattern may cause at least one segment of the one episode in the fifth chart of the third view to be highlighted. Additionally or alternatively, the first pattern may be determined based on the third view (e.g., observed in the third view and/or the like).

In some non-limiting embodiments or aspects, a fourth view may be displayed. For example, the fourth view may include a sixth chart of a sixth type, a seventh chart of a seventh type, and an eighth chart of an eighth type. Additionally or alternatively, the sixth chart may represent all testing iterations of one segment. Additionally or alternatively, the seventh chart may represent processing elements of the neural network during the one segment. Additionally or alternatively, the eighth chart may represent at least one of an average state of an environment and a saliency map of processing elements in response thereto.

In some non-limiting embodiments or aspects, determining the first pattern may include determining the first pattern based on the third view (e.g., observing in the third view and/or the like).

In some non-limiting embodiments or aspects, each training iteration may include receiving first state data indicating a first state of an environment, determining a first action from a set of possible actions based on the first state data using the first neural network, performing the first action within the environment, receiving second state data indicating a second state of the environment after performance of the first action and first reward data indicating a first reward achieved in the environment by performance of the first action, and/or storing first action data indicating the first action, the first reward data, the first state data, and the second state data. Additionally or alternatively, a subset of the training iterations may further include updating the first set of parameters of the first neural network based on at least one of the action data, the reward data, the first state data, and the second state data. Additionally or alternatively, the subset of the training iterations may be determined based on the first set of hyperparameters.

In some non-limiting embodiments or aspects, the first set of parameters may be copied from the first neural network to a second neural network after a fourth predetermined number of training iterations. Additionally or alternatively, updating the first set of parameters may include determining a first predicted reward based on the first state data using the first neural network, determining a second predicted reward based on the second state data and the first reward data using the second neural network, and/or adjusting the first set of parameters to reduce a difference between the first predicted reward and the second predicted reward.

In some non-limiting embodiments or aspects, each testing iteration may include receiving third state data indicating a third state of an environment, determining a second action from the set of possible actions based on the third state data using the first neural network, performing the second action within the environment, and/or receiving fourth state data indicating a fourth state of the environment after performance of the second action and second reward data indicating a second reward achieved in the environment by performance of the second action.

In some non-limiting embodiments or aspects, adjusting the first set of hyperparameters and/or the second set of hyperparameters may include adjusting at least one of a probability of determining a random action or a condition for determining the random action for at least one of the training iterations or the testing iterations. Additionally or alternatively, adjusting the first set of hyperparameters and/or the second set of hyperparameters may include adjusting at least one of a probability of using a first subset of training iterations or a condition for using the first subset of training iterations for updating the first set of parameters of the first neural network.

According to non-limiting embodiments or aspects, provided is a computer program product for implementing reinforcement learning by a neural network. The computer program product may include at least one non-transitory computer-readable medium including one or more instructions that, when executed by at least one processor, cause the at least one processor to, for each epoch of a first predetermined number of epochs, perform a second predetermined number of training iterations and a third predetermined number of testing iterations using a first neural network. The first neural network may include a first set of parameters. The training iterations may include a first set of hyperparameters. The testing iterations may include a second set of hyperparameters. The testing iterations may be divided into segments. Each segment may include a fourth predetermined number of testing iterations. A first pattern may be determined based on at least one of the segments. At least one of the first set of hyperparameters or the second set of hyperparameters may be adjusted based on the pattern.

In some non-limiting embodiments or aspects, a first view may be displayed. For example, the first view may include a first chart of a first type and a second chart of a second type different than the first type. Additionally or alternatively, the first chart and/or the second chart may represent all testing iterations of all epochs. In some non-limiting embodiments or aspects, a second view may be displayed. For example, the second view may include a third chart of a third type and a fourth chart of a fourth type different than the third type. Additionally or alternatively, the third chart and/or the fourth chart may represent all testing iterations of one epoch of the first predetermined number of epochs. In some non-limiting embodiments or aspects, the epoch (e.g., the one epoch, each epoch, and/or the like) may be divided into episodes. For example, each episode may include a set of consecutive iterations of the testing iterations until a condition is satisfied. In some non-limiting embodiments or aspects, a third view may be displayed. For example, the third view may include a fifth chart of a fifth type. Additionally or alternatively, the fifth chart may represent all testing iterations of one episode.

In some non-limiting embodiments or aspects, the second view may be displayed in response to an interaction with the first view. Additionally or alternatively, the third view may be displayed in response to an interaction with the second view. Additionally or alternatively, a dendrogram representing a clustering of patterns including the first pattern may be displayed. In some non-limiting embodiments or aspects, determining the first pattern may include selecting the first pattern from the dendrogram. Additionally or alternatively, selecting the first pattern may cause at least one segment of the one episode in the fifth chart of the third view to be highlighted. Additionally or alternatively, the first pattern may be determined based on the third view (e.g., observed in the third view and/or the like).

In some non-limiting embodiments or aspects, a fourth view may be displayed. For example, the fourth view may include a sixth chart of a sixth type, a seventh chart of a seventh type, and an eighth chart of an eighth type. Additionally or alternatively, the sixth chart may represent all testing iterations of one segment. Additionally or alternatively, the seventh chart may represent processing elements of the neural network during the one segment. Additionally or alternatively, the eighth chart may represent at least one of an average state of an environment and a saliency map of processing elements in response thereto.

In some non-limiting embodiments or aspects, determining the first pattern may include determining the first pattern based on the third view (e.g., observing in the third view and/or the like).

In some non-limiting embodiments or aspects, each training iteration may include receiving first state data indicating a first state of an environment, determining a first action from a set of possible actions based on the first state data using the first neural network, performing the first action within the environment, receiving second state data indicating a second state of the environment after performance of the first action and first reward data indicating a first reward achieved in the environment by performance of the first action, and/or storing first action data indicating the first action, the first reward data, the first state data, and the second state data. Additionally or alternatively, a subset of the training iterations may further include updating the first set of parameters of the first neural network based on at least one of the action data, the reward data, the first state data, and the second state data. Additionally or alternatively, the subset of the training iterations may be determined based on the first set of hyperparameters.

In some non-limiting embodiments or aspects, the first set of parameters may be copied from the first neural network to a second neural network after a fourth predetermined number of training iterations. Additionally or alternatively, updating the first set of parameters may include determining a first predicted reward based on the first state data using the first neural network, determining a second predicted reward based on the second state data and the first reward data using the second neural network, and/or adjusting the first set of parameters to reduce a difference between the first predicted reward and the second predicted reward.

In some non-limiting embodiments or aspects, each testing iteration may include receiving third state data indicating a third state of an environment, determining a second action from the set of possible actions based on the third state data using the first neural network, performing the second action within the environment, and/or receiving fourth state data indicating a fourth state of the environment after performance of the second action and second reward data indicating a second reward achieved in the environment by performance of the second action.

In some non-limiting embodiments or aspects, adjusting the first set of hyperparameters and/or the second set of hyperparameters may include adjusting at least one of a probability of determining a random action or a condition for determining the random action for at least one of the training iterations or the testing iterations. Additionally or alternatively, adjusting the first set of hyperparameters and/or the second set of hyperparameters may include adjusting at least one of a probability of using a first subset of training iterations or a condition for using the first subset of training iterations for updating the first set of parameters of the first neural network.

Further non-limiting embodiments or aspects are set forth in the following numbered clauses:

Clause 1: A method for implementing reinforcement learning by a neural network, comprising: for each epoch of a first predetermined number of epochs, performing a second predetermined number of training iterations and a third predetermined number of testing iterations using a first neural network, the first neural network comprising a first set of parameters, the training iterations comprising a first set of hyperparameters, and the testing iterations comprising a second set of hyperparameters; dividing the testing iterations into segments, each segment comprising a fourth predetermined number of testing iterations; determining a first pattern based on at least one of the segments; and adjusting at least one of the first set of hyperparameters or the second set of hyperparameters based on the pattern.

Clause 2: The method of clause 1, further comprising: displaying a first view comprising a first chart of a first type and a second chart of a second type different than the first type, the first chart and second chart each representing all testing iterations of all epochs; displaying a second view comprising a third chart of a third type and a fourth chart of a fourth type different than the third type, the third chart and the fourth chart each representing all testing iterations of one epoch of the first predetermined number of epochs; dividing the one epoch into episodes, each episode comprising a set of consecutive iterations of the testing iterations until a condition is satisfied; and displaying a third view comprising a fifth chart of a fifth type, the fifth chart representing all testing iterations of one episode.

Clause 3: The method of clauses 1 or 2, wherein the second view is displayed in response to an interaction with the first view, and wherein the third view is displayed in response to an interaction with the second view.

Clause 4: The method of any of clauses 1-3, further comprising displaying a dendrogram representing a clustering of patterns including the first pattern.

Clause 5: The method of any of clauses 1-4, further comprising displaying a fourth view comprising a sixth chart of a sixth type, a seventh chart of a seventh type, and an eighth chart of an eighth type, the sixth chart representing all testing iterations of one segment, the seventh chart representing processing elements of the neural network during the one segment, and the eighth chart representing at least one of an average state of an environment and a saliency map of processing elements in response thereto.

Clause 6: The method of any of clauses 1-5, wherein determining the first pattern comprises observing the first pattern in the third view.

Clause 7: The method of any of clauses 1-6, wherein determining the first pattern comprises: selecting the first pattern from the dendrogram, wherein selecting the first pattern causes at least one segment of the one episode in the fifth chart of the third view to be highlighted; and observing the first pattern in the third view.

Clause 8: The method of any of clauses 1-7, wherein: each training iteration comprises: receiving first state data indicating a first state of an environment, determining a first action from a set of possible actions based on the first state data using the first neural network, performing the first action within the environment, receiving second state data indicating a second state of the environment after performance of the first action and first reward data indicating a first reward achieved in the environment by performance of the first action, and storing first action data indicating the first action, the first reward data, the first state data, and the second state data; and a subset of the training iterations further comprises: updating the first set of parameters of the first neural network based on at least one of the action data, the reward data, the first state data, and the second state data, wherein the subset of the training iterations is determined based on the first set of hyperparameters.

Clause 9: The method of any of clauses 1-8, further comprising: copying the first set of parameters from the first neural network to a second neural network after a fourth predetermined number of training iterations, wherein updating the first set of parameters comprises: determining a first predicted reward based on the first state data using the first neural network; determining a second predicted reward based on the second state data and the first reward data using the second neural network; and adjusting the first set of parameters to reduce a difference between the first predicted reward and the second predicted reward.

Clause 10: The method of any of clauses 1-9, wherein: each testing iteration comprises: receiving third state data indicating a third state of an environment, determining a second action from the set of possible actions based on the third state data using the first neural network, performing the second action within the environment, and receiving fourth state data indicating a fourth state of the environment after performance of the second action and second reward data indicating a second reward achieved in the environment by performance of the second action.

Clause 11: The method of any of clauses 1-10, wherein adjusting the at least one of the first set of hyperparameters or the second set of hyperparameters comprises at least one of: adjusting at least one of a probability of determining a random action or a condition for determining the random action for at least one of the training iterations or the testing iterations; or adjusting at least one of a probability of using a first subset of training iterations or a condition for using the first subset of training iterations for updating the first set of parameters of the first neural network.

Clause 12: A system for implementing reinforcement learning by a neural network, comprising: at least one processor; and at least one non-transitory computer readable medium comprising instructions to direct the at least one processor to: for each epoch of a first predetermined number of epochs, perform a second predetermined number of training iterations and a third predetermined number of testing iterations using a first neural network, the first neural network comprising a first set of parameters, the training iterations comprising a first set of hyperparameters, and the testing iterations comprising a second set of hyperparameters; divide the testing iterations into segments, each segment comprising a fourth predetermined number of testing iterations; determine a first pattern based on at least one of the segments; and adjust at least one of the first set of hyperparameters or the second set of hyperparameters based on the pattern.

Clause 13: The system of clause 12, wherein the instructions further direct the at least one processor to: display a first view comprising a first chart of a first type and a second chart of a second type different than the first type, the first chart and second chart each representing all testing iterations of all epochs; display a second view comprising a third chart of a third type and a fourth chart of a fourth type different than the third type, the third chart and the fourth chart each representing all testing iterations of one epoch of the first predetermined number of epochs; divide the one epoch into episodes, each episode comprising a set of consecutive iterations of the testing iterations until a condition is satisfied; and display a third view comprising a fifth chart of a fifth type, the fifth chart representing all testing iterations of one episode.

Clause 14: The system of clauses 12 or 13, wherein the second view is displayed in response to an interaction with the first view, and wherein the third view is displayed in response to an interaction with the second view.

Clause 15: The system of any one of clauses 12-14, wherein the instructions further direct the at least one processor to: display a dendrogram representing a clustering of patterns including the first pattern.

Clause 16: The system of any one of clauses 12-15, wherein the instructions further direct the at least one processor to: display a fourth view comprising a sixth chart of a sixth type, a seventh chart of a seventh type, and an eighth chart of an eighth type, the sixth chart representing all testing iterations of one segment, the seventh chart representing processing elements of the neural network during the one segment, and the eighth chart representing at least one of an average state of an environment and a saliency map of processing elements in response thereto.

Clause 17: The system of any one of clauses 12-16, wherein determining the first pattern comprises determining the first pattern based on the third view.

Clause 18: The system of any one of clauses 12-17, wherein determining the first pattern comprises receiving a selection of the first pattern from the dendrogram, wherein selecting the first pattern causes at least one segment of the one episode in the fifth chart of the third view to be highlighted and determining the first pattern based on the third view.

Clause 19: The system of any one of clauses 12-18, wherein: for each training iteration, the instructions further direct the at least one processor to: receive first state data indicating a first state of an environment, determine a first action from a set of possible actions based on the first state data using the first neural network, perform the first action within the environment, receive second state data indicating a second state of the environment after performance of the first action and first reward data indicating a first reward achieved in the environment by performance of the first action, and store first action data indicating the first action, the first reward data, the first state data, and the second state data; and for a subset of the training iterations, the instructions further direct the at least one processor to: update the first set of parameters of the first neural network based on at least one of the action data, the reward data, the first state data, and the second state data, wherein the subset of the training iterations is determined based on the first set of hyperparameters.

Clause 20: The system of any one of clauses 12-19, wherein the instructions further direct the at least one processor to: copy the first set of parameters from the first neural network to a second neural network after a fourth predetermined number of training iterations, wherein updating the first set of parameters comprises: determining a first predicted reward based on the first state data using the first neural network; determining a second predicted reward based on the second state data and the first reward data using the second neural network; and adjusting the first set of parameters to reduce a difference between the first predicted reward and the second predicted reward.

Clause 21: The system of any one of clauses 12-20, wherein: for each testing iteration, the instructions further direct the at least one processor to: receive third state data indicating a third state of an environment, determine a second action from the set of possible actions based on the third state data using the first neural network, perform the second action within the environment, and receive fourth state data indicating a fourth state of the environment after performance of the second action and second reward data indicating a second reward achieved in the environment by performance of the second action.

Clause 22: The system of any one of clauses 12-21, wherein adjusting the at least one of the first set of hyperparameters or the second set of hyperparameters comprises at least one of adjusting at least one of a probability of determining a random action or a condition for determining the random action for at least one of the training iterations or the testing iterations or adjusting at least one of a probability of using a first subset of training iterations or a condition for using the first subset of training iterations for updating the first set of parameters of the first neural network.

Clause 23: A computer program product for implementing reinforcement learning by a neural network, the computer program product comprising at least one non-transitory computer-readable medium including one or more instructions that, when executed by at least one processor, cause the at least one processor to: for each epoch of a first predetermined number of epochs, perform a second predetermined number of training iterations and a third predetermined number of testing iterations using a first neural network, the first neural network comprising a first set of parameters, the training iterations comprising a first set of hyperparameters, and the testing iterations comprising a second set of hyperparameters; divide the testing iterations into segments, each segment comprising a fourth predetermined number of testing iterations; determine a first pattern based on at least one of the segments; and adjust at least one of the first set of hyperparameters or the second set of hyperparameters based on the pattern.

Clause 24: The computer program product of clause 23, wherein the instructions further direct the at least one processor to: display a first view comprising a first chart of a first type and a second chart of a second type different than the first type, the first chart and second chart each representing all testing iterations of all epochs; display a second view comprising a third chart of a third type and a fourth chart of a fourth type different than the third type, the third chart and the fourth chart each representing all testing iterations of one epoch of the first predetermined number of epochs; divide the one epoch into episodes, each episode comprising a set of consecutive iterations of the testing iterations until a condition is satisfied; and display a third view comprising a fifth chart of a fifth type, the fifth chart representing all testing iterations of one episode.

Clause 25: The computer program product of clauses 23 or 24, wherein the second view is displayed in response to an interaction with the first view, and wherein the third view is displayed in response to an interaction with the second view.

Clause 26: The computer program product of any one of clauses 23-25, wherein the instructions further direct the at least one processor to: display a dendrogram representing a clustering of patterns including the first pattern.

Clause 27: The computer program product of any one of clauses 23-26, wherein the instructions further direct the at least one processor to: display a fourth view comprising a sixth chart of a sixth type, a seventh chart of a seventh type, and an eighth chart of an eighth type, the sixth chart representing all testing iterations of one segment, the seventh chart representing processing elements of the neural network during the one segment, and the eighth chart representing at least one of an average state of an environment and a saliency map of processing elements in response thereto.

Clause 28: The computer program product of any one of clauses 23-27, wherein determining the first pattern comprises determining the first pattern based on the third view.

Clause 29: The computer program product of any one of clauses 23-28, wherein determining the first pattern comprises receiving a selection of the first pattern from the dendrogram, wherein selecting the first pattern causes at least one segment of the one episode in the fifth chart of the third view to be highlighted and determining the first pattern based on the third view.

Clause 30: The computer program product of any one of clauses 23-29, wherein: for each training iteration, the instructions further direct the at least one processor to: receive first state data indicating a first state of an environment, determine a first action from a set of possible actions based on the first state data using the first neural network, perform the first action within the environment, receive second state data indicating a second state of the environment after performance of the first action and first reward data indicating a first reward achieved in the environment by performance of the first action, and store first action data indicating the first action, the first reward data, the first state data, and the second state data; and for a subset of the training iterations, the instructions further direct the at least one processor to: update the first set of parameters of the first neural network based on at least one of the action data, the reward data, the first state data, and the second state data, wherein the subset of the training iterations is determined based on the first set of hyperparameters.

Clause 31: The computer program product of any one of clauses 23-30, wherein the instructions further direct the at least one processor to: copy the first set of parameters from the first neural network to a second neural network after a fourth predetermined number of training iterations, wherein updating the first set of parameters comprises determining a first predicted reward based on the first state data using the first neural network, determining a second predicted reward based on the second state data and the first reward data using the second neural network, and adjusting the first set of parameters to reduce a difference between the first predicted reward and the second predicted reward.

Clause 32: The computer program product of any one of clauses 23-31, wherein: for each testing iteration, the instructions further direct the at least one processor to: receive third state data indicating a third state of an environment, determine a second action from the set of possible actions based on the third state data using the first neural network, perform the second action within the environment, and receive fourth state data indicating a fourth state of the environment after performance of the second action and second reward data indicating a second reward achieved in the environment by performance of the second action.

Clause 33: The computer program product of any one of clauses 23-32, wherein adjusting the at least one of the first set of hyperparameters or the second set of hyperparameters comprises at least one of adjusting at least one of a probability of determining a random action or a condition for determining the random action for at least one of the training iterations or the testing iterations or adjusting at least one of a probability of using a first subset of training iterations or a condition for using the first subset of training iterations for updating the first set of parameters of the first neural network.

These and other features and characteristics of the presently disclosed subject matter, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosed subject matter. As used in the specification and the claims, the singular form of "a," "an," and "the" include plural referents unless the context clearly dictates otherwise.

BRIEF DESCRIPTION OF THE DRAWINGS

Additional advantages and details of the disclosed subject matter are explained in greater detail below with reference to the exemplary embodiments or aspects that are illustrated in the accompanying figures, in which:

FIG. 5A is a screenshot of a videogame according to an implementation of a non-limiting embodiment or aspect of the process shown in FIG. 3;

FIGS. 7A-7J are screenshots of visual analytic frameworks according to implementations of non-limiting embodiments or aspects of the process shown in FIG. 3;

DESCRIPTION

Figure 1:
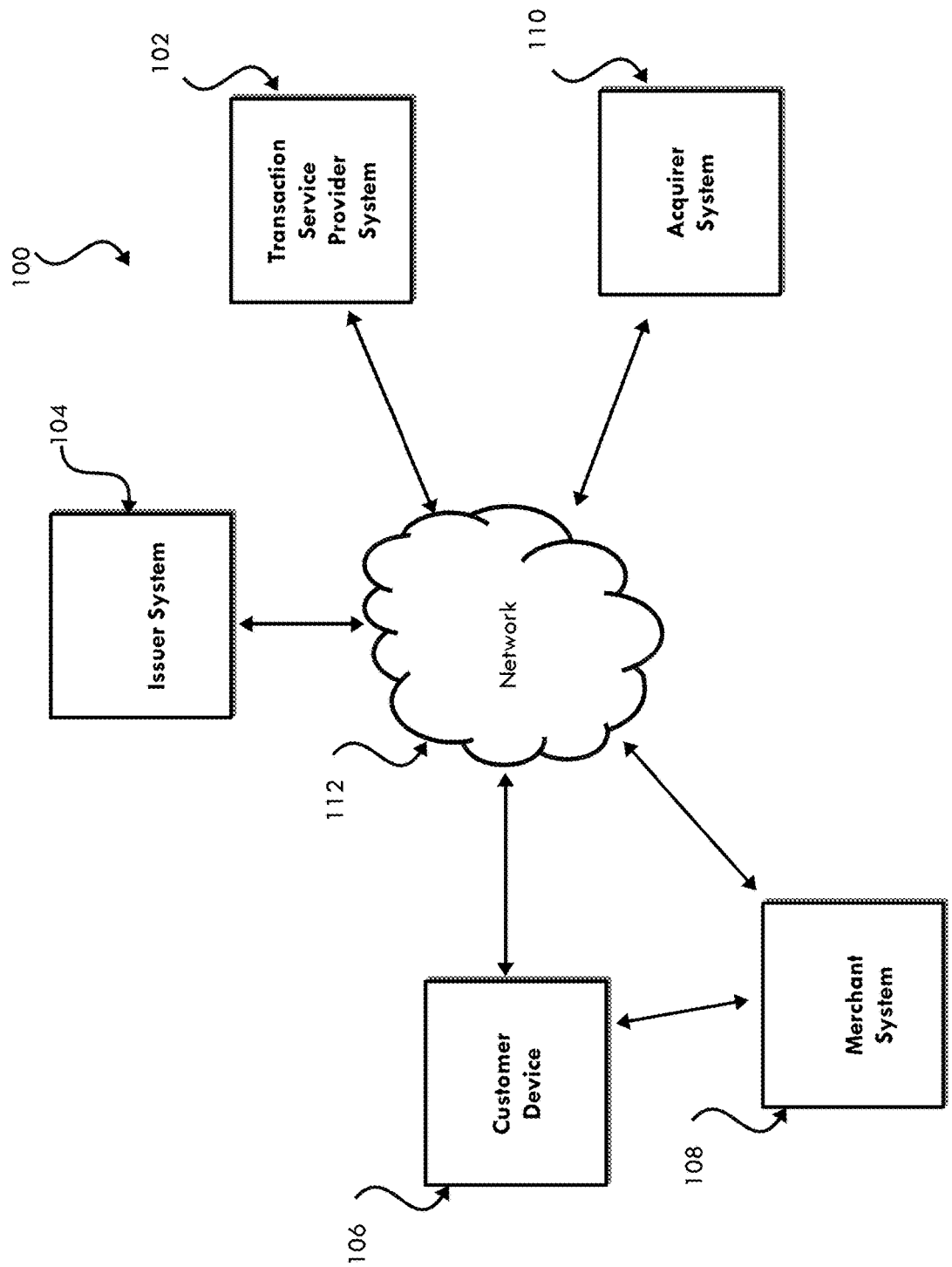
FIG. 1 is a diagram of a non-limiting embodiment or aspect of an environment in which methods, systems, and/or computer program products, described herein, may be implemented according to the principles of the present disclosed subject matter.

For purposes of the description hereinafter, the terms "end," "upper," "lower," "right," "left," "vertical," "horizontal," "top," "bottom," "lateral," "longitudinal," and derivatives thereof shall relate to the disclosed subject matter as it is oriented in the drawing figures. However, it is to be understood that the disclosed subject matter may assume various alternative variations and step sequences, except where expressly specified to the contrary. It is also to be understood that the specific devices and processes illustrated in the attached drawings, and described in the following specification, are simply exemplary embodiments or aspects of the disclosed subject matter. Hence, specific dimensions and other physical characteristics related to the embodiments or aspects of the embodiments disclosed herein are not to be considered as limiting unless otherwise indicated.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the terms "communication" and "communicate" may refer to the reception, receipt, transmission, transfer, provision, and/or the like of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and communicates the processed information to the second unit. In some non-limiting embodiments or aspects, a message may refer to a network packet (e.g., a data packet and/or the like) that includes data. It will be appreciated that numerous other arrangements are possible.

As used herein, the terms "issuer institution," "portable financial device issuer," "issuer," or "issuer bank" may refer to one or more entities that provide accounts to customers for conducting transactions (e.g., payment transactions), such as initiating credit and/or debit payments. For example, an issuer institution may provide an account identifier, such as a primary account number (PAN), to a customer that uniquely identifies one or more accounts associated with that customer. The account identifier may be embodied on a portable financial device, such as a physical financial instrument, e.g., a payment card, and/or may be electronic and used for electronic payments. The terms "issuer institution" and "issuer institution system" may also refer to one or more computer systems operated by or on behalf of an issuer institution, such as a server computer executing one or more software applications. For example, an issuer institution system may include one or more authorization servers for authorizing a transaction.

As used herein, the term "account identifier" may include one or more types of identifiers associated with a user account (e.g., a PAN, a primary account number, a card number, a payment card number, a token, and/or the like). In some non-limiting embodiments or aspects, an issuer institution may provide an account identifier (e.g., a PAN, a token, and/or the like) to a user that uniquely identifies one or more accounts associated with that user. The account identifier may be embodied on a physical financial instrument (e.g., a portable financial instrument, a payment card, a credit card, a debit card, and/or the like) and/or may be electronic information communicated to the user that the user may use for electronic payments. In some non-limiting embodiments or aspects, the account identifier may be an original account identifier, where the original account identifier was provided to a user at the creation of the account associated with the account identifier. In some non-limiting embodiments or aspects, the account identifier may be an account identifier (e.g., a supplemental account identifier) that is provided to a user after the original account identifier was provided to the user. For example, if the original account identifier is forgotten, stolen, and/or the like, a supplemental account identifier may be provided to the user. In some non-limiting embodiments or aspects, an account identifier may be directly or indirectly associated with an issuer institution such that an account identifier may be a token that maps to a PAN or other type of identifier. Account identifiers may be alphanumeric, any combination of characters and/or symbols, and/or the like. An issuer institution may be associated with a bank identification number (BIN) that uniquely identifies the issuer institution.

As used herein, the term "token" may refer to an identifier that is used as a substitute or replacement identifier for an account identifier, such as a PAN. Tokens may be associated with a PAN or other account identifiers in one or more data structures (e.g., one or more databases and/or the like) such that they can be used to conduct a transaction (e.g., a payment transaction) without directly using the account identifier, such as a PAN. In some examples, an account identifier, such as a PAN, may be associated with a plurality of tokens for different individuals, different uses, and/or different purposes.

As used herein, the term "merchant" may refer to one or more entities (e.g., operators of retail businesses that provide goods and/or services, and/or access to goods and/or services, to a user (e.g., a customer, a consumer, a customer of the merchant, and/or the like) based on a transaction (e.g., a payment transaction)). As used herein "merchant system" may refer to one or more computer systems operated by or on behalf of a merchant, such as a server computer executing one or more software applications. As used herein, the term "product" may refer to one or more goods and/or services offered by a merchant.

As used herein, a "point-of-sale (POS) device" may refer to one or more devices, which may be used by a merchant to initiate transactions (e.g., a payment transaction), engage in transactions, and/or process transactions. For example, a POS device may include one or more computers, peripheral devices, card readers, near-field communication (NFC) receivers, radio frequency identification (RFID) receivers, and/or other contactless transceivers or receivers, contact-based receivers, payment terminals, computers, servers, input devices, and/or the like.

As used herein, a "point-of-sale (POS) system" may refer to one or more computers and/or peripheral devices used by a merchant to conduct a transaction. For example, a POS system may include one or more POS devices and/or other like devices that may be used to conduct a payment transaction. A POS system (e.g., a merchant POS system) may also include one or more server computers programmed or configured to process online payment transactions through webpages, mobile applications, and/or the like.

As used herein, the term "transaction service provider" may refer to an entity that receives transaction authorization requests from merchants or other entities and provides guarantees of payment, in some cases through an agreement between the transaction service provider and the issuer institution. In some non-limiting embodiments or aspects, a transaction service provider may include a credit card company, a debit card company, and/or the like. As used herein, the term "transaction service provider system" may also refer to one or more computer systems operated by or on behalf of a transaction service provider, such as a transaction processing server executing one or more software applications. A transaction processing server may include one or more processors and, in some non-limiting embodiments or aspects, may be operated by or on behalf of a transaction service provider.

As used herein, the term "acquirer" may refer to an entity licensed by the transaction service provider and approved by the transaction service provider to originate transactions (e.g., payment transactions) using a portable financial device associated with the transaction service provider. As used herein, the term "acquirer system" may also refer to one or more computer systems, computer devices, and/or the like operated by or on behalf of an acquirer. The transactions the acquirer may originate may include payment transactions (e.g., purchases, original credit transactions (OCTs), account funding transactions (AFTs), and/or the like). In some non-limiting embodiments or aspects, the acquirer may be authorized by the transaction service provider to assign merchant or service providers to originate transactions using a portable financial device of the transaction service provider. The acquirer may contract with payment facilitators to enable the payment facilitators to sponsor merchants. The acquirer may monitor compliance of the payment facilitators in accordance with regulations of the transaction service provider. The acquirer may conduct due diligence of the payment facilitators and ensure that proper due diligence occurs before signing a sponsored merchant. The acquirer may be liable for all transaction service provider programs that the acquirer operates or sponsors. The acquirer may be responsible for the acts of the acquirer's payment facilitators, merchants that are sponsored by an acquirer's payment facilitators, and/or the like. In some non-limiting embodiments or aspects, an acquirer may be a financial institution, such as a bank.

As used herein, the terms "electronic wallet," "electronic wallet mobile application," and "digital wallet" may refer to one or more electronic devices and/or one or more software applications configured to initiate and/or conduct transactions (e.g., payment transactions, electronic payment transactions, and/or the like). For example, an electronic wallet may include a user device (e.g., a mobile device) executing an application program and server-side software and/or databases for maintaining and providing transaction data to the user device. As used herein, the term "electronic wallet provider" may include an entity that provides and/or maintains an electronic wallet and/or an electronic wallet mobile application for a user (e.g., a customer). Examples of an electronic wallet provider include, but are not limited to, Google Pay®, Android Pay®, Apple Pay®, and Samsung Pay®. In some non-limiting examples, a financial institution (e.g., an issuer institution) may be an electronic wallet provider. As used herein, the term "electronic wallet provider system" may refer to one or more computer systems, computer devices, servers, groups of servers, and/or the like operated by or on behalf of an electronic wallet provider.

As used herein, the term "portable financial device" may refer to a payment card (e.g., a credit or debit card), a gift card, a smartcard, smart media, a payroll card, a healthcare card, a wrist band, a machine-readable medium containing account information, a keychain device or fob, an RFID transponder, a retailer discount or loyalty card, a cellular phone, an electronic wallet mobile application, a personal digital assistant (PDA), a pager, a security card, a computer, an access card, a wireless terminal, a transponder, and/or the like. In some non-limiting embodiments or aspects, the portable financial device may include volatile or non-volatile memory to store information (e.g., an account identifier, a name of the account holder, and/or the like).

As used herein, the term "payment gateway" may refer to an entity and/or a payment processing system operated by or on behalf of such an entity (e.g., a merchant service provider, a payment service provider, a payment facilitator, a payment facilitator that contracts with an acquirer, a payment aggregator, and/or the like), which provides payment services (e.g., transaction service provider payment services, payment processing services, and/or the like) to one or more merchants. The payment services may be associated with the use of portable financial devices managed by a transaction service provider. As used herein, the term "payment gateway system" may refer to one or more computer systems, computer devices, servers, groups of servers, and/or the like operated by or on behalf of a payment gateway and/or to a payment gateway itself. The term "payment gateway mobile application" may refer to one or more electronic devices and/or one or more software applications configured to provide payment services for transactions (e.g., payment transactions, electronic payment transactions, and/or the like).

As used herein, the terms "client" and "client device" may refer to one or more client-side devices or systems (e.g., remote from a transaction service provider) used to initiate or facilitate a transaction (e.g., a payment transaction). As an example, a "client device" may refer to one or more POS devices used by a merchant, one or more acquirer host computers used by an acquirer, one or more mobile devices used by a user, and/or the like. In some non-limiting embodiments or aspects, a client device may be an electronic device configured to communicate with one or more networks and initiate or facilitate transactions. For example, a client device may include one or more computers, portable computers, laptop computers, tablet computers, mobile devices, cellular phones, wearable devices (e.g., watches, glasses, lenses, clothing, and/or the like), PDAs, and/or the like. Moreover, a "client" may also refer to an entity (e.g., a merchant, an acquirer, and/or the like) that owns, utilizes, and/or operates a client device for initiating transactions (e.g., for initiating transactions with a transaction service provider).

As used herein, the term "server" may refer to one or more computing devices (e.g., processors, storage devices, similar computer components, and/or the like) that communicate with client devices and/or other computing devices over a network (e.g., a public network, the Internet, a private network, and/or the like) and, in some examples, facilitate communication among other servers and/or client devices. It will be appreciated that various other arrangements are possible. As used herein, the term "system" may refer to one or more computing devices or combinations of computing devices (e.g., processors, servers, client devices, software applications, components of such, and/or the like). Reference to "a device," "a server," "a processor," and/or the like, as used herein, may refer to a previously-recited device, server, or processor that is recited as performing a previous step or function, a different server or processor, and/or a combination of servers and/or processors. For example, as used in the specification and the claims, a first server or a first processor that is recited as performing a first step or a first function may refer to the same or different server or the same or different processor recited as performing a second step or a second function.

As used herein, the term "iteration" may refer to one or more executions of a sequence of operations (e.g., steps, cycles, repetitions, and/or the like), an algorithm, and/or the like. For example, an iteration may include the sequence of operations performed by an agent (e.g., an RL agent, a DQN agent, and/or the like) in response to an input and/or set of inputs during training, testing, and/or the like.

As used herein, the term "neural network" may refer to one or more computing models representing interconnected processing elements (e.g., artificial neurons, convolutional filters, perceptrons, weight vectors, and/or the like). For example, a neural network may simulate biological neural cells (e.g., biological neurons of a biological brain and/or the like). Additionally or alternatively, a neural network may connect a predetermined number of inputs to a predetermined number of outputs by a predetermined number of layers, including an input layer, an output layer, and/or one or more hidden layers between the input and output layers.

As used herein, the term "parameter," when referring to a neural network, may refer to one or more numerical values (e.g., a vector of numerical values, a matrix of numerical values, and/or the like) representing the computing elements (e.g., artificial neurons, convolutional filters, and/or the like) and/or connections therebetween in a neural network. As an example, a neural network may be represented as a vector, a set of vectors, a matrix, a set of matrices, and/or the like representing weights and/or biases of connections between conceptual computational elements (e.g., artificial neurons, convolutional filters, and/or the like) of different conceptual layers of a neural network.

As used herein, the term "hyperparameter" may refer to one or more parameters, constraints, values, characteristics, and/or the like of the algorithm, process, and/or the like that is using (e.g., controlling, training, testing, and/or the like) a neural network. For example, hyperparameters may include the rate at which an agent (e.g., a reinforcement learning (RL) agent, a deep Q-network (DQN) agent, and/or the like) takes a random action (e.g., rather than a predicted action) during each iteration, a rate at which experiences (e.g., sets of inputs and/or outputs of a neural network and/or the like) of an agent or subsets thereof are sampled by an agent during training, a total number of training iterations, a number of training iterations in an epoch, a total number of testing iterations, a number of testing iterations in an epoch, a total number of epochs, a rate at which a first neural network (e.g., a prediction neural network) and/or parameters thereof are copied into a second neural network (e.g., a target neural network), a number of iterations in a segment, a condition for defining an episode, a learning rate, a discount factor (e.g., a value between zero and one to discount future rewards), and/or the like.

Non-limiting embodiments or aspects of the disclosed subject matter are directed to systems, methods, and computer program products for implementing reinforcement learning, including, but not limited to, implementing reinforcement learning by a neural network. Non-limiting embodiments or aspects of the disclosed subject matter provide improving a neural network (and/or an agent including and/or using such a neural network) by determining one or more patterns based on segments of iterations (e.g., testing and/or training iterations) and adjusting hyperparameters based on the pattern(s). For example, such improvements may include reducing training time (e.g., reducing a number of iterations required to sufficiently train an agent using the neural network), adjusting the rate at which random actions are taken by an agent (e.g., improving performance by evaluating and/or adjusting the tradeoff between exploration and exploitation), adjusting the rate at which experiences (e.g., set of inputs and/or outputs of the neural network) or subsets thereof are sampled during training (e.g., improving performance by sampling more experiences associated with beneficial patterns, sampling fewer experiences with disadvantageous and/or unhelpful patterns, sampling experiences with a greatest deviation from a target reward, and/or the like), and/or the like. Additionally or alternatively, non-limiting embodiments or aspects of the disclosed subject matter provide a visual analytic framework to help interpret behavior, enhance understanding, provide insight, and/or the like of a neural network (and/or an agent including and/or using such a neural network). For example, multiple visual depictions (e.g., charts, graphs, and/or the like) of the iterations (e.g., testing iterations) and/or statistics thereof as well as visual depictions of subsets (e.g., epochs, episodes, segments, and/or the like) of the iterations and/or statistics thereof may be displayed. Additionally, further depictions, indications, summaries, and/or the like of patterns may be displayed (e.g., overlaid with, adjacent to, subsequent to, and/or the like the aforementioned multiple visual depictions). As such, a user may observe patterns and make adjustments (e.g., to hyperparameters) to improve the neural network (and/or an agent including and/or using such a neural network).

For the purpose of illustration, in the following description, while the presently disclosed subject matter is described with respect to methods, systems, and computer program products for implementing reinforcement learning, e.g., with a DQN agent utilizing a neural network, one skilled in the art will recognize that the disclosed subject matter is not limited to the illustrative embodiments or aspects. For example, the methods, systems, and computer program products described herein may be used with a wide variety of settings, such as implementing reinforcement learning to direct an RL agent and/or the like in any setting suitable for machine learning, e.g., to play videogames, to authorize a payment transaction, detect fraud in a payment transaction, to recognize patterns (e.g., speech recognition, facial recognition, and/or the like), to automate tasks, to improve cybersecurity, and/or the like.

Referring now to FIG. 1, FIG. 1 is a diagram of a non-limiting embodiment or aspect of an environment 100 in which systems, products, and/or methods, as described herein, may be implemented. As shown in FIG. 1, environment 100 includes transaction service provider system 102, issuer system 104, customer device 106, merchant system 108, acquirer system 110, and network 112.

Transaction service provider system 102 may include one or more devices capable of receiving information from and/or communicating information to issuer system 104, customer device 106, merchant system 108, and/or acquirer system 110 via network 112. For example, transaction service provider system 102 may include a computing device, such as a server (e.g., a transaction processing server), a group of servers, and/or other like devices. In some non-limiting embodiments or aspects, transaction service provider system 102 may be associated with a transaction service provider as described herein. In some non-limiting embodiments or aspects, transaction service provider system 102 may be in communication with a data storage device, which may be local or remote to transaction service provider system 102. In some non-limiting embodiments or aspects, transaction service provider system 102 may be capable of receiving information from, storing information in, communicating information to, or searching information stored in the data storage device.

Issuer system 104 may include one or more devices capable of receiving information and/or communicating information to transaction service provider system 102, customer device 106, merchant system 108, and/or acquirer system 110 via network 112. For example, issuer system 104 may include a computing device, such as a server, a group of servers, and/or other like devices. In some non-limiting embodiments or aspects, issuer system 104 may be associated with an issuer institution as described herein. For example, issuer system 104 may be associated with an issuer institution that issued a credit account, debit account, credit card, debit card, and/or the like to a user associated with customer device 106.

Customer device 106 may include one or more devices capable of receiving information from and/or communicating information to transaction service provider system 102, issuer system 104, merchant system 108, acquirer system 110 via network 112. Additionally or alternatively, each customer device 106 may include a device capable of receiving information from and/or communicating information to other customer devices 106 via network 112, another network (e.g., an ad-hoc network, a local network, a private network, a virtual private network, and/or the like), and/or any other suitable communication technique. For example, customer device 106 may include a client device and/or the like. In some non-limiting embodiments or aspects, customer device 106 may or may not be capable of receiving information (e.g., from merchant system 108 or from another customer device 106) via a short-range wireless communication connection (e.g., an NFC communication connection, an RFID communication connection, a Bluetooth® communication connection, a Zigbee® communication connection, and/or the like), and/or communicating information (e.g., to merchant system 108) via a short-range wireless communication connection.

Merchant system 108 may include one or more devices capable of receiving information from and/or communicating information to transaction service provider system 102, issuer system 104, customer device 106, and/or acquirer system 110 via network 112. Merchant system 108 may also include a device capable of receiving information from customer device 106 via network 112, a communication connection (e.g., an NFC communication connection, an RFID communication connection, a Bluetooth® communication connection, a Zigbee® communication connection, and/or the like) with customer device 106, and/or the like, and/or communicating information to customer device 106 via the network, the communication connection, and/or the like. In some non-limiting embodiments or aspects, merchant system 108 may include a computing device, such as a server, a group of servers, a client device, a group of client devices, and/or other like devices. In some non-limiting embodiments or aspects, merchant system 108 may be associated with a merchant as described herein. In some non-limiting embodiments or aspects, merchant system 108 may include one or more client devices. For example, merchant system 108 may include a client device that allows a merchant to communicate information to transaction service provider system 102. In some non-limiting embodiments or aspects, merchant system 108 may include one or more devices, such as computers, computer systems, and/or peripheral devices capable of being used by a merchant to conduct a transaction with a user. For example, merchant system 108 may include a POS device and/or a POS system.

Acquirer system 110 may include one or more devices capable of receiving information from and/or communicating information to transaction service provider system 102, issuer system 104, customer device 106, and/or merchant system 108 via network 112. For example, acquirer system 110 may include a computing device, a server, a group of servers, and/or the like. In some non-limiting embodiments or aspects, acquirer system 110 may be associated with an acquirer as described herein.

Network 112 may include one or more wired and/or wireless networks. For example, network 112 may include a cellular network (e.g., a long-term evolution (LTE) network, a third generation (3G) network, a fourth generation (4G) network, a code division multiple access (CDMA) network, and/or the like), a public land mobile network (PLMN), a local area network (LAN), a wide area network (WAN), a metropolitan area network (MAN), a telephone network (e.g., the public switched telephone network (PSTN)), a private network (e.g., a private network associated with a transaction service provider), an ad-hoc network, an intranet, the Internet, a fiber optic-based network, a cloud computing network, and/or the like, and/or a combination of these or other types of networks.

The number and arrangement of systems, devices, and/or networks shown in FIG. 1 are provided as an example. There may be additional systems, devices, and/or networks; fewer systems, devices, and/or networks; different systems, devices, and/or networks; and/or differently arranged systems, devices, and/or networks than those shown in FIG. 1. Furthermore, two or more systems or devices shown in FIG. 1 may be implemented within a single system or device, or a single system or device shown in FIG. 1 may be implemented as multiple, distributed systems or devices. Additionally or alternatively, a set of systems (e.g., one or more systems) or a set of devices (e.g., one or more devices) of environment 100 may perform one or more functions described as being performed by another set of systems or another set of devices of environment 100.

Figure 2:
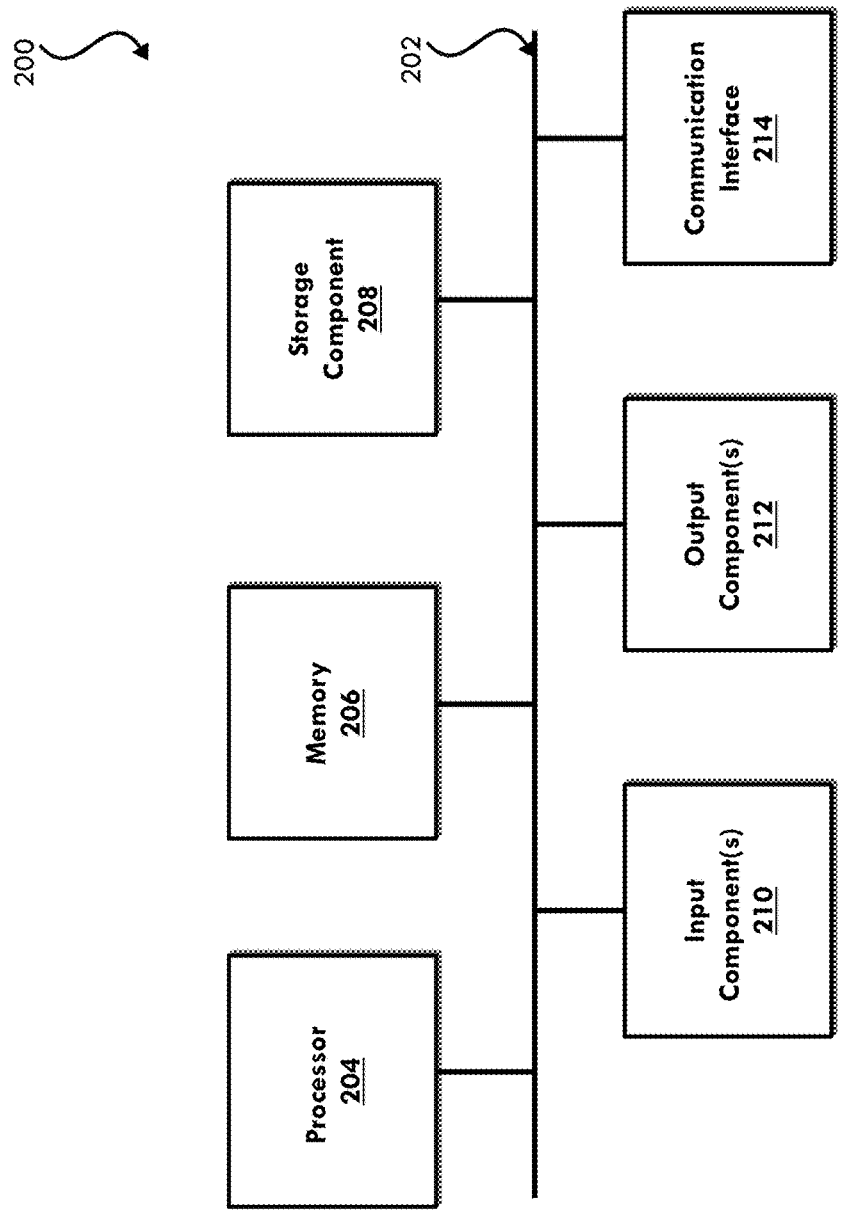
FIG. 2 is a diagram of a non-limiting embodiment or aspect of components of one or more devices of FIG. 1.

Referring now to FIG. 2, FIG. 2 is a diagram of example components of a device 200. Device 200 may correspond to one or more devices of transaction service provider system 102, one or more devices of issuer system 104, customer device 106, one or more devices of merchant system 108, and/or one or more devices of acquirer system 110. In some non-limiting embodiments or aspects, transaction service provider system 102, issuer system 104, customer device 106, merchant system 108, and/or acquirer system 110 may include at least one device 200 and/or at least one component of device 200. As shown in FIG. 2, device 200 may include bus 202, processor 204, memory 206, storage component 208, input component 210, output component 212, and communication interface 214.

Bus 202 may include a component that permits communication among the components of device 200. In some non-limiting embodiments or aspects, processor 204 may be implemented in hardware, firmware, or a combination of hardware and software. For example, processor 204 may include a processor (e.g., a central processing unit (CPU), a graphics processing unit (GPU), an accelerated processing unit (APU), and/or the like), a microprocessor, a digital signal processor (DSP), and/or any processing component (e.g., a field-programmable gate array (FPGA), an application-specific integrated circuit (ASIC), and/or the like), and/or the like, which can be programmed to perform a function. Memory 206 may include random access memory (RAM), read only memory (ROM), and/or another type of dynamic or static storage device (e.g., flash memory, magnetic memory, optical memory, and/or the like) that stores information and/or instructions for use by processor 204.

Storage component 208 may store information and/or software related to the operation and use of device 200. For example, storage component 208 may include a hard disk (e.g., a magnetic disk, an optical disk, a magneto-optic disk, a solid state disk, and/or the like), a compact disc (CD), a digital versatile disc (DVD), a floppy disk, a cartridge, a magnetic tape, and/or another type of computer-readable medium, along with a corresponding drive.

Input component 210 may include a component that permits device 200 to receive information, such as via user input (e.g., a touch screen display, a keyboard, a keypad, a mouse, a button, a switch, a microphone, and/or the like). Additionally, or alternatively, input component 210 may include a sensor for sensing information (e.g., a global positioning system (GPS) component, an accelerometer, a gyroscope, an actuator, and/or the like). Output component 212 may include a component that provides output information from device 200 (e.g., a display, a speaker, one or more light-emitting diodes (LEDs), and/or the like).

Communication interface 214 may include a transceiver-like component (e.g., a transceiver, a receiver and transmitter that are separate, and/or the like) that enables device 200 to communicate with other devices, such as via a wired connection, a wireless connection, or a combination of wired and wireless connections. Communication interface 214 may permit device 200 to receive information from another device and/or provide information to another device. For example, communication interface 214 may include an Ethernet interface, an optical interface, a coaxial interface, an infrared interface, a radio frequency (RF) interface, a universal serial bus (USB) interface, a Wi-Fi® interface, a Bluetooth® interface, a Zigbee® interface, a cellular network interface, and/or the like.

Device 200 may perform one or more processes described herein. Device 200 may perform these processes based on processor 204 executing software instructions stored by a computer-readable medium, such as memory 206 and/or storage component 208. A computer-readable medium (e.g., a non-transitory computer-readable medium) is defined herein as a non-transitory memory device. A non-transitory memory device includes memory space located inside of a single physical storage device or memory space spread across multiple physical storage devices.

Software instructions may be read into memory 206 and/or storage component 208 from another computer-readable medium or from another device via communication interface 214. When executed, software instructions stored in memory 206 and/or storage component 208 may cause processor 204 to perform one or more processes described herein. Additionally, or alternatively, hardwired circuitry may be used in place of or in combination with software instructions to perform one or more processes described herein. Thus, embodiments or aspects described herein are not limited to any specific combination of hardware circuitry and software.

The number and arrangement of components shown in FIG. 2 are provided as an example. In some non-limiting embodiments or aspects, device 200 may include additional components, fewer components, different components, or differently arranged components than those shown in FIG. 2. Additionally, or alternatively, a set of components (e.g., one or more components) of device 200 may perform one or more functions described as being performed by another set of components of device 200.

Figure 3:
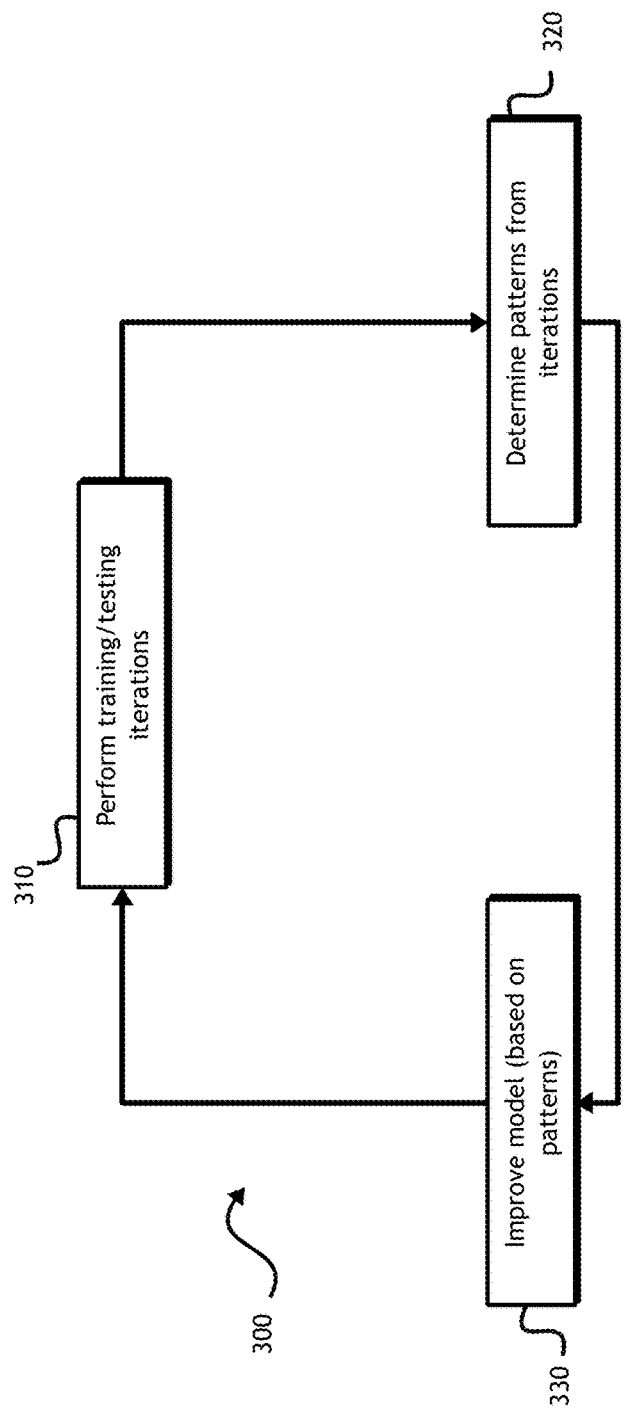
FIG. 3 is a flowchart of a non-limiting embodiment or aspect of a process for implementing reinforcement learning according to the principles of the present disclosed subject matter.

Referring now to FIG. 3, FIG. 3 is a flowchart of a non-limiting embodiment or aspect of a process 300 for implementing reinforcement learning (e.g., by a neural network). In some non-limiting embodiments or aspects, one or more of the steps of process 300 may be performed (e.g., completely, partially, and/or the like) by a device, a system, a group of devices, and/or group of systems, such as transaction service provider system 102 (e.g., one or more devices of transaction service provider system 102), issuer system 104 (e.g., one or more devices of issuer system 104), customer device(s) 106, merchant system 108 (e.g., one or more devices of merchant system 108), or acquirer system 110 (e.g., one or more devices of acquirer system 110). In some non-limiting embodiments or aspects, with reference to FIG. 3, the process 300 may be performed by a customer device 106, e.g., to play a videogame, to recognize patterns, to automate tasks, and/or the like. Additionally or alternatively, one or more of the steps of process 300 may be performed (e.g., completely, partially, etc.) by another device or a group of devices separate from or including customer device 106, such as transaction service provider system 102 (e.g., one or more devices of transaction service provider system 102), issuer system 104 (e.g., one or more devices of issuer system 104), or merchant system 108 (e.g., one or more devices of merchant system 108). In some non-limiting embodiments or aspects, with reference to FIG. 3, the process 300 may be performed by a transaction service provider system 102 (e.g., one or more devices of transaction service provider system 102), issuer system 104 (e.g., one or more devices of issuer system 104), and/or acquirer system 110 (e.g., one or more devices of acquirer system 110), e.g., to authorize a payment transaction, to detect fraud in a payment transaction, to recognize patterns, to automate tasks, to improve cybersecurity, and/or the like. Additionally or alternatively, one or more of the steps of process 300 may be performed (e.g., completely, partially, etc.) by another device or a group of devices separate from or including transaction service provider system 102, issuer system 104, and/or acquirer system 110, such as customer device 106 and/or merchant system 108 (e.g., one or more devices of merchant system 108). In some non-limiting embodiments or aspects, with reference to FIG. 3, the process 300 may be performed by a merchant system 108 (e.g., one or more devices of merchant system 108), e.g., to recognize patterns, to automate tasks, to improve cybersecurity, and/or the like. Additionally or alternatively, one or more of the steps of process 300 may be performed (e.g., completely, partially, etc.) by another device or a group of devices separate from or including merchant system 108, such as transaction service provider system 102 (e.g., one or more devices of transaction service provider system 102), issuer system 104 (e.g., one or more devices of issuer system 104), customer device(s) 106, or acquirer system 110 (e.g., one or more devices of acquirer system 110).

As shown in FIG. 3, at step 310, process 300 may include performing iterations, e.g., testing and/or training iterations of a neural network and/or an RL agent (e.g., a DQN agent). In some non-limiting embodiments or aspects, iterations may be performed for a predetermined number of epochs. For example, for each epoch of a (first) predetermined number of epochs, a (second) predetermined number of training iterations and a (third) predetermined number of testing iterations may be performed using a first neural network. In some non-limiting embodiments or aspects, there may be one epoch. In some non-limiting embodiments or aspects, there may be multiple epochs. For example, there may be tens, hundreds, thousands, and/or the like of epochs. For the purpose of illustration, there may be 200 epochs. Additionally or alternatively, the number of epochs may depend on the complexity of the environment, including consideration of factors such as the number of possible states, the number of possible actions, and/or the like. In some non-limiting embodiments or aspects, the number of epochs may be dynamic. For example, epochs may repeat until a condition is satisfied. The condition may be based on a metric such as a cumulative reward (e.g., for the epoch), an average reward (e.g., for the epoch), a cumulative or average reward per a number of iterations (e.g., per segment), a cumulative or average reward per episode, a reward distribution (e.g., per epoch, per episode, and/or the like), and/or the like. For the purpose of illustration, the condition may be satisfied when the metric on which the condition is based reaches a threshold and/or when the metric on which the condition is based remains stable (e.g., within a threshold percentage or tolerance) for a selected number of consecutive epochs. In some non-limiting embodiments or aspects, the number of epochs and/or the condition for determining whether to repeat/continue epochs may be a hyperparameter that may be set manually (e.g., by a user) and/or set automatically.

In some non-limiting embodiments or aspects, each epoch may include a (predetermined or dynamic) number of testing iterations and/or a (predetermined or dynamic) number of training iterations. In some non-limiting embodiments or aspects, the number of training iterations may be less than the number of testing iterations. For example, the number of testing iterations may be a percentage (e.g., 10%) of the number of testing iterations. Alternatively, the number of testing iterations may be equal to or greater than the number of training iterations. In some non-limiting embodiments or aspects, there may be tens, hundreds, thousands, and/or the like of testing iterations and/or training iterations. For the purpose of illustration, there may be 250,000 training iterations and 25,000 testing iterations. In some non-limiting embodiments or aspects, the number of training iterations and/or testing iterations may be dynamic. For example, training and/or testing iterations may repeat until a condition is satisfied. The condition may be based on a metric such as a cumulative reward (e.g., for a select number of iterations), an average reward (e.g., per iteration), a difference between a predicted reward for a target reward being less than a threshold, a loss based on the predicted reward and the target reward being less than a threshold, a number of episodes completed, and/or the like. For the purpose of illustration, the condition may be satisfied when the metric on which the condition is based reaches a threshold and/or when the metric on which the condition is based remains stable (e.g., within a threshold percentage or tolerance) for a selected number of consecutive iterations. In some non-limiting embodiments or aspects, the number of iterations and/or the condition for determining whether to repeat/continue iterations may be a hyperparameter that may be set manually (e.g., by a user) and/or set automatically.

In some non-limiting embodiments or aspects, the first neural network may include a first set of parameters. Additionally or alternatively, the training iterations may include a first set of hyperparameters, and the testing iterations may include a second set of hyperparameters. In some non-limiting embodiments or aspects, the second set of hyperparameters may be the same as or similar to the first set of hyperparameters or a subset thereof. Additionally or alternatively, the second set of hyperparameters may be (completely, partially, etc.) independent of the first set of hyperparameters.

In some non-limiting embodiments or aspects, each training iteration may include receiving inputs (e.g., at the agent from the environment). For example, inputs may include (first) state data indicating a (first) state of an environment, reward data indicating a current value of a reward, if any, and/or the like. In some non-limiting embodiments or aspects, each training iteration may further include determining an action based on the inputs. For example, a (first) action may be determined/predicted (e.g., by the agent) from a set of possible actions based on the state data using the neural network. For the purpose of illustration, the input(s) may be provided as inputs to the neural network, and the outputs may be a predicted (e.g., calculated by the neural network) reward for each possible action of the set of possible actions. The determined/predicted action may be the possible action with the highest score. In some non-limiting embodiments or aspects, the agent may perform an action. For example, the action may be the (first) action as determined/predicted by the neural network. Additionally or alternatively, the action may be a randomly chosen action (e.g., from the set of possible actions). For the purpose of illustration, one of the first set of hyperparameters may be a random rate ε. The random rate random rate e may be the probability that the agent takes a random action, and the agent otherwise may take the determined/predicted action (e.g., with a probability of 1-ε). Additionally or alternatively, the error rate e may be dynamic, as further described below. For example, at each iteration, the agent may generate a random number and take an action based thereon, e.g., a random action if the random number is less than the random rate e or otherwise the determined/predicted action. In some non-limiting embodiments or aspects, the agent may receive (second) input from the environment after performance of the action. For example, the (second) input may include (second) state data indicating a (second) state of the environment (e.g., after performance of the action), (second) reward data indicating a (second) value of reward (e.g., after the action, achieved in response to performance of the action, or net change in cumulative reward after the action), and/or the like.

In some non-limiting embodiments or aspects, the data associated with each (training) iteration may be stored. For example, (first) action data indicating the first action, the (first and/or second) reward data, the (first and/or second) state data, and/or the like may be stored. Data associated with each iteration may be grouped in a tuple (e.g., one tuple for each iteration). For example, a tuple may be a two-tuple (a couple), a three-tuple (a triple), a four-tuple (a quadruple), etc. For example, a tuple of a given iteration may include the action data (e.g., determined/predicted action), the reward data (e.g., reward for the action action), the state data (e.g., the (second) state after the action and/or the (first) state before the action), and/or the like. Additionally or alternatively, the tuple may also include an indication of whether an epoch, an episode, and/or a segment are completed (e.g., a tuple of action data, reward data, state data, and terminal/completion data).

In some non-limiting embodiments or aspects, the first set of parameters of the first neural network may be updated based on the tuple (e.g., action data, reward data, first and/or second state data, terminal/completion data, and/or the like) for each training iteration or a subset of iterations. For example, the subset of the training iterations may be determined based on the first set of hyperparameters. In some non-limiting embodiments or aspects, the first set of hyperparameters may include a (fourth) predetermined number of iterations for each update. For example, the number may be less than ten, on the order of tens, and/or the like. For the purpose of illustration, the number of training iterations per update may be four. In some non-limiting embodiments or aspects, when updating the first parameters of the first neural network, the tuple to be used may be the tuple of the current iteration. In some non-limiting embodiments or aspects, the tuple to be used may be a randomly selected tuple. Additionally or alternatively, the probability of selecting each tuple may be weighted based on a categorization of the tuple. In some non-limiting embodiments or aspects, whether the tuple is the current tuple, a randomly selected tuple (and if random, whether the probability of selecting each tuple is the same or different based on a categorization thereof) may be hyperparameters (e.g., of the first set of hyperparameters), as further described below.

In some non-limiting embodiments or aspects, updating the first set of parameters of the first neural network may include adjusting the first set of parameters to increase (e.g., maximize) a potential score and/or to reduce (e.g., minimize) a loss, error, or difference between the predicted reward and a target reward. For example, the update may be based on backpropagation, a Bellman equation, a quality value (e.g., q value), a loss value (e.g., a squared error loss), and/or the like. In some non-limiting embodiments or aspects, a second neural network (e.g., a target network) may be created by copying the first set of parameters from the first neural network to a second neural network after a (fifth) predetermined number of training iterations. For example, the number of iterations between copying the first set of parameters from the first neural network to the second neural network may hundreds, thousands, and/or the like. For the purpose of illustration, the number may be 1,000 iterations. In some non-limiting embodiments or aspects, updating the first set of parameters may include determining a first predicted reward based on prior state data (e.g., one or more consecutive states before taking the action) using the first neural network. Additionally, a second predicted reward (e.g., target predicted reward) may be determined based on the sum of the reward data (e.g., the reward achieved in response to taking the action) and a future reward determined using the second neural network (e.g., target network) and post-state data (e.g., one or more consecutive states after taking the action). The first set of parameters may be adjusted (e.g., by a backpropagation) to reduce a loss (e.g., a difference between the first predicted reward and the second predicted reward, a squared error loss between the first predicted reward and the second predicted reward, and/or the like).

In some non-limiting embodiments or aspects, each testing iteration may include receiving (third) inputs (e.g., at the agent from the environment). For example, inputs may include (third) state data indicating a (third) state of an environment, (third) reward data indicating a current value of reward, if any, and/or the like. In some non-limiting embodiments or aspects, each testing iteration may further include determining an action based on the inputs. For example, a (second) action may be determined/predicted (e.g., by the agent) from a set of possible actions based on the state data using the first neural network. For the purpose of illustration, the input(s) may be provided as inputs to the first neural network, and the outputs may be a predicted (e.g., calculated by the neural network) reward for each possible action of the set of possible actions. The determined/predicted action may be the possible action with the highest score. In some non-limiting embodiments or aspects, the agent may perform an action. For example, the action may be the (second) action as determined/predicted by the first neural network. Additionally or alternatively, the action may be a randomly chosen action (e.g., from the set of possible actions). For the purpose of illustration, one of the second set of hyperparameters may be a random rate ε. The error rate e may be the same as or similar to the error rate ε of the first set of hyperparameters. Additionally or alternatively, the error rate ε of the second set of hyperparameters may be less than or equal to the error rate of the first set of hyperparameters. Additionally or alternatively, the error rate e may be dynamic, as further described below. In some non-limiting embodiments or aspects, the agent may receive (fourth) input from the environment after performance of the action. For example, the (fourth) input may include (fourth) state data indicating a (fourth) state of the environment (e.g., after performance of the action), (fourth) reward data indicating a (fourth) value of reward (e.g., after the action, achieved in response to performance of the action, or net change in cumulative reward after the action), and/or the like.

As shown in FIG. 3, at step 320, process 300 may include determining patterns, e.g., based on the training and/or testing iterations. In some non-limiting embodiments or aspects, the (training and/or testing) iterations may be divided into segments. For example, each segment may include a (fourth) predetermined number of iterations. In some non-limiting embodiments or aspects, the number of iterations in a segment may be less than the number of iterations in each epoch. For example, if focusing on testing iterations, the testing iterations in each epoch may be divided into segments, and the number of testing iterations in each segment may be less than the number of testing iterations in the epoch. In some non-limiting embodiments or aspects, the number of (testing) iterations in a segment may be tens or hundreds of iterations. For the purpose of illustration, a segment may be 100 testing iterations. In some non-limiting embodiments or aspects, the number of (testing) iterations in a segment may be dynamic. Additionally or alternatively, the number of iterations in a segment may be a hyperparameter that may be set manually (e.g., by a user) and/or set automatically.

In some non-limiting embodiments or aspects, at least one pattern (e.g., a first pattern, a second pattern, etc.) may be determined based on the training and/or testing iterations. For example, if focusing on testing iterations that are divided into segments, a pattern may be determined based on at least one of the segments. In some non-limiting embodiments or aspects, one or more patterns may be determined by clustering the segments by any suitable clustering technique and/or algorithm. For example, the segments may be clustered by including agglomerative hierarchical clustering. Additionally or alternatively, dynamic time warping may be used to measure the dissimilarity between any pair of segments (e.g., in an epoch) and derive a dissimilarity matrix (e.g., for all segments in an epoch), and the dissimilarity matrix may be the input of the clustering algorithm (e.g., agglomerative hierarchical clustering). In some non-limiting embodiments or aspects, patterns may be automatically identified/defined based on one or more clusters of segments. Additionally or alternatively, a user may observe/inspect (e.g., as further described below) the clusters and identify/define patterns based on the observation. In some non-limiting embodiments or aspects, patterns identified/defined in one epoch may be used to mine patterns (e.g., search for and/or identify the same or similar patterns) in other epochs. In some non-limiting embodiments or aspects, the patterns may be patterns in actions, patterns in rewards, a combination thereof, and/or the like.

In some non-limiting embodiments or aspects, a visual display may be provided to assist a user in observation, identification, evaluation, understanding, and/or the like of the reinforcement learning agent (e.g., pattern of segments of iterations performed by the agent). For example, a first view may be displayed, and the first view may include at least one first chart of a first type and/or at least one second chart of a second type different than the first type. Additionally or alternatively, the first chart and second chart each may represent all testing iterations of all epochs. In some non-limiting embodiments or aspects, a second view may be displayed, and the second view may include at least one third chart of a third type and/or at least one fourth chart of a fourth type different than the third type. Additionally or alternatively, the third chart and the fourth chart each may represent all testing iterations of one epoch.

In some non-limiting embodiments or aspects, the epoch may be divided into episodes. For example, each episode may include a set of consecutive iterations of the testing iterations until a condition is satisfied. For purpose of illustration, in the context of a videogame, an episode may be a set of consecutive iterations until a game over condition, until a predetermined number of lives are lost (e.g., one life or multiple lives, depending or the game), and/or the like. In some non-limiting embodiments or aspects, a third view may be displayed, and the third view may include at least one fifth chart of a fifth type. Additionally or alternatively, the fifth chart may represent all testing iterations of one episode. In some non-limiting embodiments or aspects, the pattern may be determined/identified based on observing at least one of the views, a portion of at least one of the views, a combination thereof, and/or the like. For example, the pattern may be observed based on a user observing the third view (or a portion thereof).

In some non-limiting embodiments or aspects, the second view may be displayed based on (e.g., in response to) an interaction with the first view (e.g., user interaction via an input component 210). For example, a user may click or hover over an area of the first view with a mouse or other suitable input component 210. Additionally or alternatively, the third view may be displayed based on (e.g., in response to) an interaction with the second view (e.g., user interaction via an input component 210). For example, a user may click or hover over an area of the second view with a mouse or other suitable input component 210.

In some non-limiting embodiments or aspects, a fourth view may be displayed, and the fourth view may include a sixth chart of a sixth type representing the patterns and/or the clustering of segments. For example, a dendrogram may be displayed, and the dendrogram may represent a clustering of patterns. In some non-limiting embodiments or aspects, the dendrogram may be displayed based on an interaction with at least one of the first, second, and/or third views. Additionally or alternatively, a pattern may be selected based on (e.g., in response to) an interaction with the dendrogram (e.g., user interaction via an input component 210). For example, a user may click or hover over an area of the dendrogram with a mouse or other suitable input component 210. In some non-limiting embodiments or aspects, selecting the pattern on the dendrogram may cause at least one portion of at least one of the first, second, and/or third views to be highlighted. For example, selecting the pattern on the dendrogram may cause at least one segment of at least one episode in the third view (e.g., the fifth chart) to be highlighted. Additionally or alternatively, a user may observe the pattern by observing the highlighted portion(s) of the first, second, and/or third view (e.g., the highlighted segment of the fifth chart of the third view).

In some non-limiting embodiments or aspects, a fifth view may be displayed, and the fifth view may include a seventh chart of a seventh type, an eighth chart of an eighth type, and a ninth chart of a ninth type. For example, the seventh chart may represent all testing iterations of one segment. Additionally or alternatively, the eighth chart may represent processing elements (e.g., convolutional filters, neurons, and/or the like) of a neural network during the one segment. For example, one or more states that are highly (e.g., maximally) activated by each processing element in each segment may be identified. Additionally or alternatively, (a first) guided backpropagation may be used to determine what features each processing element has extracted from the state. Additionally or alternatively, (a second) guided backpropogation may be used to determine/derive a saliency map for the state based on the activation of the state. In some non-limiting embodiments or aspects, the ninth chart may represent at least one of an input state (or an average input state across the segment or a subset of iterations (e.g., four iterations) of the segment) of the environment and/or the saliency map of processing elements in response thereto. For example, the saliency map may include pixel values that may indicate how strong the corresponding pixel of the input state has been activated by a processing element. Additionally or alternatively, the state and the saliency map may be blended, overlaid, and/or the like.

As shown in FIG. 3, at step 330, process 300 may include improving the (reinforcement learning) model, e.g., based on the pattern(s). In some non-limiting embodiments or aspects, at least one of the first set of hyperparameters (e.g., for training iterations) or the second set of hyperparameters (e.g., for testing iterations) may be adjusted based on the pattern(s) and/or observations thereof. For example, the random rate ε for at least one of the first set of hyperparameters (e.g., for training iterations) or the second set of hyperparameters (e.g., for testing iterations) may be adjusted (e.g., increased, decreased, set to zero, and/or the like) based on the patterns and/or observations thereof. Additionally or alternatively, at least one of the first set of hyperparameters (e.g., for training iterations) or the second set of hyperparameters (e.g., for testing iterations) may be adjusted to include a condition for determining the random action. For example, the condition may be the occurrence of a pattern or one of a set of patterns. For purpose of illustration, if the pattern (or set of patterns) is not occurring, then the random rate e may be zero, but if the pattern (or one of the set of patterns) occurs, the random rate e may be increased (e.g., set to 5%, 10%, or up to 100%). The adjustment may be for a set number of iterations, until the pattern (or set of patterns) is no longer occurring, and/or indefinite.

In some non-limiting embodiments or aspects, the first set of hyperparameters (e.g., for training iterations) may be adjusted by adjusting at least one of a probability of using an iteration (e.g., a tuple associated with the iteratation) or a subset of iterations for training or a condition for using the iteration or a subset of iterations for training. For example, by default, each tuple may have a same probability of being randomly selected for training or a current tuple may simply be used for training. Additionally or alternatively, the probability of selecting each tuple may be weighted based on a categorization of the tuple. In some non-limiting embodiments or aspects, adjusting the (first) hyperparameters may include adjusting whether to use a current tuple or a randomly selected tuple for training. Additionally or alternatively, adjusting the first hyperparameters may include adjusting whether each tuple has the same probability of being randomly selected or whether the probability of selecting each tuple may be weighted based on a categorization of the tuple. Additionally or alternatively, adjusting the (first) hyperparameters may include adjusting the categorizations (e.g., adding, removing, and/or changing a categorization) or adjusting the weight/probability of selecting a tuple from one or more categorizations. For example, a first subset of training iterations may be in a first categorization, a second subset of training iterations may be in a second categorization, a third subset of training iterations may be in a third categorization, etc. Each categorization may have associated therewith a probability of being selected for training (e.g., 0.1 for the first categorization, 0.3 for the second categorization, 0.6 for the third categorization).

In some non-limiting embodiments or aspects, the disclosed subject matter (e.g, process 300) may be used to prevent fraudulent transactions. For example, the environment may be an electronic payment network (which may be the same as or similar to environment 100, network 112, and/or the like) and/or a transaction service provider system (which may be the same as or similar to transaction service provider system 102). Additionally or alternatively, the state data input may be information, data, and/or the like associated with a payment transaction, e.g., information, data, and/or the like from an authorization request and/or authorization response. Additionally or alternatively, the set of possible actions may be to approve the transaction, to decline the transaction, to flag the transaction for further review, report as lost/stolen, and/or the like. Additionally or alternatively, the reward may be a score, value, and/or the like associated with the outcome of each action. For example, one or more positive rewards (e.g., positive scores, values, and/or the like) may be associated with one or more actions that result in a desirable outcome, such as approving a transaction, declining a transaction that is identified as fraudulent (e.g., simultaneously by another technique, at a later time based on a report by a cardholder or representative, and/or the like), flagging a transaction for review that is identified as fraudulent, and/or the like. Additionally or alternatively, a zero reward (e.g., no reward, a zero score, a zero value, and/or the like) or one or more negative rewards (e.g., negative scores, values, and/or the like) may be associated with one or more actions that result in an undesirable outcome such as approving a transaction identified as fraudulent (e.g., simultaneously by another technique; at a later time based on a report by a cardholder, merchant, or personnel of a transaction service provider; and/or the like), declining a transaction that is identified as not being fraudulent (e.g., should have been approved), flagging a transaction for review that is identified as not being fraudulent, and/or the like.

In some non-limiting embodiments or aspects, the disclosed subject matter (e.g., process 300) may be used to train an agent to play a videogame. For the purpose of illustration, an exemplary implementation of the disclosed subject matter (e.g., process 300) to train an agent to play games on Atari® 2600 (e.g., an Atari® 2600 emulator) is described below in connection with FIGS. 4-24. While the following portion of the description describes implementing reinforcement learning (e.g., with a DQN agent utilizing a neural network) to play a videogame, one skilled in the art will recognize that the disclosed subject matter is not limited to the context of videogames, and may also be used with a wide variety of settings, such as implementing reinforcement learning to direct an RL agent and/or the like in any setting suitable for machine learning, e.g., to play videogames, to authorize a payment transaction, detect fraud in a payment transaction, to recognize patterns (e.g., speech recognition, facial recognition, and/or the like), to automate tasks, to improve cybersecurity, and/or the like.

Figure 5B:
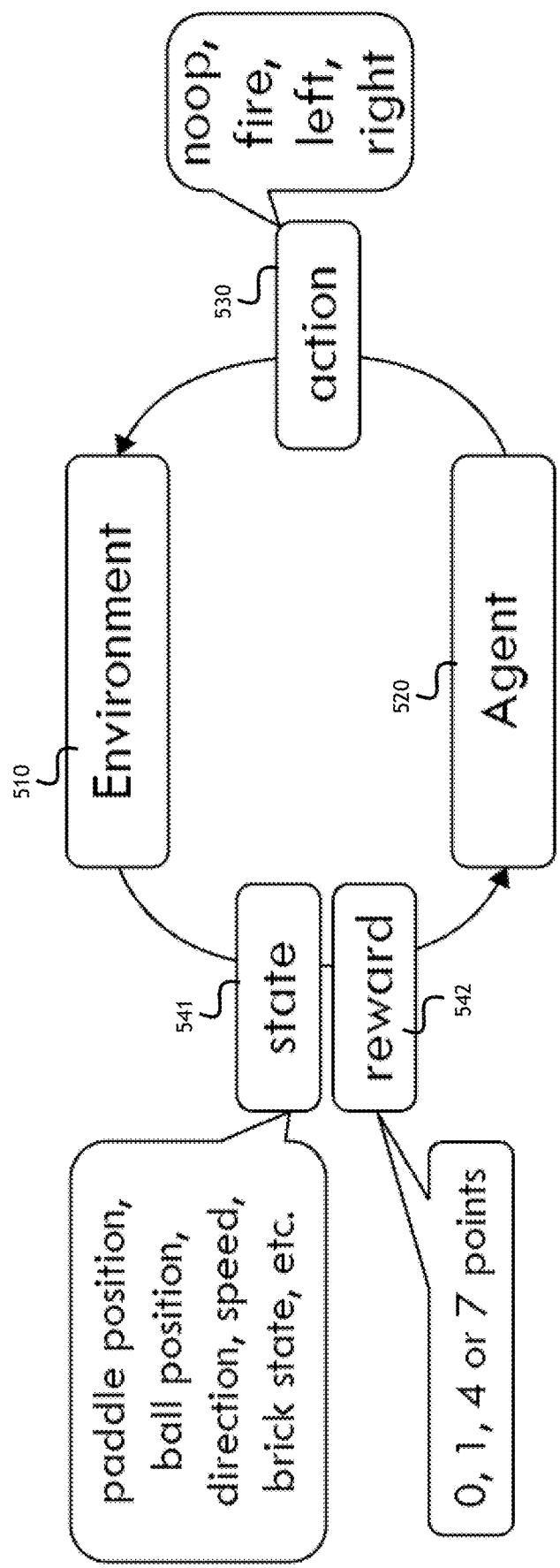
FIG. 5B is a diagram of an implementation of a non-limiting embodiment or aspect of the process shown in FIG. 3.

Referring now to FIG. 5A, FIG. 5A is a screenshot of a videogame according to an implementation of a non-limiting embodiment or aspect of the process 300. In some non-limiting embodiments or aspects, an RL agent may be trained to play different videogames (e.g., Atari® 2600 games). Such an agent may achieve performance (e.g., game rewards such as score, points, and/or the like) in such games surpassing the level of performance achieved by human players. Additionally, such performance may be achieved by taking only the game screens (raw pixels) and game rewards as input, which may represent progress toward artificial general intelligence (AGI). One exemplary model that may empower an RL agent to achieve such performance is a DQN model, which may include a deep convolutional neural network (e.g., a neural network including one or more convolutional layers and one or more fully connected layers). For the purpose of illustration, in the Breakout® game in Atari® 2600 (see, e.g., FIG. 5A for a screenshot), the goal of the agent may be to score the maximum game reward by firing the "ball" 52 (e.g., small rectangle near the center right of the screenshot) to hit the bricks 53 (e.g., elongated rectangles near the top of the screenshot) and catching/deflecting the ball with the paddle 51 (e.g., medium sized rectangle near bottom left of the screenshot) to avoid life loss. Current rewards/score and remaining lives are displayed in an area 54 (e.g., near the top of the screenshot). Such a game may be considered an example of a reinforcement learning problem (see, e.g., FIG. 5B).

Referring now to FIG. 5B, FIG. 5B is a diagram of reinforcement learning problem according to an implementation of a non-limiting embodiment or aspect of the process 300. For example, the agent 520 may be trained to interact with the environment 510 (e.g., the game) and may attempt to achieve the maximum reward 542 (e.g., game score) using a neural network to predict the action 530 with greatest potential reward based on the state/inputs 541 (e.g., game screen images). Through iterative trainings, the agent 520 may become increasingly intelligent in response to different states 541 of the environment 510 (e.g., based on the game screen, the agent may extract ball direction, paddle position, brick positions, and/or the like), and the neural network trained by the agent 520 may become increasingly accurate in predicting the action 530 (e.g., move the paddle left, move the paddle right, fire a ball, or no operation) with the greatest potential reward 542.

However, training such RL models (e.g., DQN models) may include more experience, explorations, and know-how than other types of machine learning models, which may be at least partially due to the following reasons. First, different from supervised/unsupervised learning models that may learn from a predefined set of data instances (e.g., with or without labels), reinforcement learning models may learn from the experiences of the agent 520 (e.g., tuples of inputs (state 541, reward 542, terminal/completion status, and/or the like), predicted actions 530, and/or the like), and the training data (e.g., the experiences) may be generated dynamically over time. As such, dynamic summarizations/quantifications of the experiences of the agent 520 may be utilized to achieve a better understanding of the training data. Second, the DQN model may take a certain amount of random actions 530 during training (e.g., randomly taking actions in the Breakout® game). The random actions 530 may give the agent increased flexibilities to explore the unknown part(s) of the environment 510, but such random actions 520 may also prevent the agent from fully exploiting the known part of the environment 510 using currently learned intelligence (e.g., an exploration and exploitation dilemma). Accordingly, a random rate (e) may impact the training. Third, interpreting the behavior of a DQN agent 520 may be challenging. For example, when the agent 520 takes an action 530 (e.g., moves the paddle to the left), what does the agent really see (e.g., extract as salient from the input)? Is the action 530 an intentional action (e.g., based on the action predicted by the neural network) or a random action? Such questions may not be directly answerable by model statistics captured from other approaches.

Sufficient visual analytics works may not be available for deep RL models. However, visual analytics may be useful in diagnosing and improving models, including deep RL models. In the following description, to address the aforementioned challenges and others, a visual analytics system may be used, e.g., to understand, diagnose, and improve DQN models. The visual analytic system may be used, e.g., to help a user in understanding the experiences of a DQN agent 520 in multiple levels (e.g., four or five different levels) through multiple visualizations (e.g., four or five visualization components). In some non-limiting embodiments or aspects, the current experience (e.g., current inputs) of the agent 520 as well as the output from previous training stages and/or adjustments to the model (e.g., hyperparameters) based thereon may be used as inputs for next training stages. For example, such training stages and/or adjustments to the model based thereon may impact what the agent 520 will learn next (e.g., which tuples may be more likely to be sampled from memory, the probability of making a random action, and/or the like) and/or may also reflect what the agent 520 has learned previously. By studying/observing such experiences, the visual analytics system and/or users thereof may identify action/reward patterns, which may be useful in understanding the behavior of the agent 520, evaluating the quality of the RL (e.g., DQN) model, improving the performance of the training, and/or the like. For example, at least some of those patterns may be used to improve a DQN model by controlling the rate of random actions (e.g., random rate e) during training. Additionally or alternatively, observations from synchronizing data collected during training (e.g., multiple types of heterogeneous data, such as eight types, and/or the like) may help prioritize the experiences (e.g., the training input and/or tuples of the inputs and predicted actions) and/or may boost the training in early stages. Additionally or alternatively, to understand the agent 520 when performing an action (e.g., determine which states or portions thereof are salient to different neurons of the neural network), guided backpropagation of the convolutional neural network of the DQN model may be used to expose what each neuron has seen (e.g., activation thereof). In some non-limiting embodiments or aspects, analysis of a DQN model may include: a visual analytics system to help understand DQN models by revealing the models' details in multiple (e.g., four) levels: overall training level, epoch level, episode level, and segment level; a visual design for action sequence data generated from DQN models (e.g., a design that may be able to reveal the movement patterns of a DQN agent, enable users to flexibly synchronize the varying types of time series data collected from DQN trainings, and/or the like); and improvements to the DQN models (e.g., adjustments to hyperparameters, random action control, prioritized experiences, and/or the like) based on pattern detection and/or observation of visual analytics.

In reference to RL (e.g., DQN models) the following considerations may be taken into account (e.g., completely, partially, individually, in combination, and/or the like):

C1: A blind training process. Although a videogame emulator may allow a user to watch an agent 520 play the game, the user may refrain from doing so. For example, enabling the visualization (e.g., watching the game) may significantly slow down the training process. Additionally or alternatively, long time, continuous monitoring (e.g., over a complete training of many epochs, each epoch including thousands of iterations) may be a labor-intensive task. However, without guidance, selecting (e.g., manually) certain segments to investigate may not be effective and/or may result in few or no findings by a user. Accordingly, a user may have very little visual understanding of the training process, except some numerical summary statistics, e.g., average reward.

C2: Incapable of reading the agent's mind. Without effective visualizations (e.g., to reveal how the agent 520 parses the input states/game screens returned from the environment 510), a user may not be able to determine why an agent 520 is making a particular action 530. For example, does the agent 520 really see the full moving path of the ball 52 when deciding the next action? Additionally or alternatively, which regions of the input states 541 influence the agent 520 more? A user may be eager to know the answers to these questions via visualizations.

C3: General considerations in improving training speed. Training a DQN model may take days/weeks, and such training may be affected by many hyperparameters of the model, e.g., the random rate $\varepsilon$, the size of an experience replay (ER) memory of the model, etc.

Sufficient visual analytics work may not be available for RL models (e.g., DQN models). Attempts at visualization may provide an overview of the large amount of input states, but may not be interactive and/or information presented may be limited. However, the effectiveness of visualizations demonstrates the strong need of a comprehensive visual analytics solution. Certain event sequence data visualization works may broadly be categorized into flow-based and matrix-based approaches. For example, flow-based approaches may use a timeline metaphor to list a sequence of events and extend them along one dimension (e.g., the time dimension), and multiple sequences may share the same extending dimension and thus can be synchronized accordingly. Matrix-based approaches may aggregate events and present them with compact matrices to avoid visual clutters. Unlike such flow-based and matrix-based approaches, the following proposed visual analytics framework may include visualizations of multiple types of event sequences data (e.g., sequences of actions 530, rewards 542, and screens/states 541) and/or enable a user to synchronize and analyze such data simultaneously. For example, multiple types of statistical charts may be used to quantitatively summarize the event sequences over time or at a particular time step (e.g., iteration). Additionally or alternatively, a visual design may qualitatively reflect the action pattern of a DQN agent and synchronize different types of event sequences on-demand to support comprehensive analysis.

DQN, as one type of RL model, may include training an agent 520 to interact with an environment 510 to achieve a desired goal (e.g., increased reward 542). Taking the Breakout® game as an example (e.g., FIG. 5A), the environment 510 may be the game itself, which responds to any action 530 (e.g., moving the paddle 51, firing the ball 52, or no operation) issued by the agent 520 by returning the state 541 of the game (e.g., game screen image, which may be parsed by the DQN neural network to determine paddle 51 position, ball 52 position/direction, brick 53 position, and/or the like) and the achieved reward 542. By parsing the game state 541 (e.g., screen images) and the achieved reward 542, the agent may determine a new action 530 for the next step. Such iterative interaction between the agent 520 and the environment 510 (e.g., FIG. 5B) may continue until the environment 510 returns a terminal state (e.g., game over), and the process may generate a sequence of states 541, actions 530, and rewards 542, which may be denoted as: $s_0, a_0, r_1, s_1, a_1 r_2, \ldots r_n, s_n$ (where $s_i$ denotes state 541 at step i, $a_i$ denotes action 530 at step i, and $r_i$ denotes reward 542 at step i). As such, the agent 520 may be trained toward the goal (e.g., increasing/maximizing the total reward 542).

For example, the total reward for one game episode (e.g., from the initial screen to the game over screen) may be represented as $R = r_1 + r_2 + \ldots + r_n$. For the purpose of illustration, at time t, to achieve increased (e.g., maximum) total reward, the agent 520 may carefully choose actions onwards to increase its future reward: $R_t=r_t+r_{t+1}+\ldots+r_n$ (e.g., nothing can be done for the previous t−1 steps as they have already happened). Additionally or alternatively, to accommodate the uncertainty introduced by the stochastic environment, a discount factor, $\gamma \in [0, 1]$, may be used to penalize future rewards. Therefore, $R_t=r_t+\gamma r_{t+1}+\gamma^2 r_{t+2}+\ldots+\gamma_{n-t}r_n=r_t+\gamma R_{t+1}$, e.g., the maximum reward from t onwards may be equal to the reward 542 achieved at time t plus the maximum discounted future reward. For example, Q-learning may therefore consider maximum future reward as a function of the current state 541 and the action taken 530 in the state, e.g.: Q(s, a). For the purpose of illustration, $Q(s_t, a_t)=r_t+\gamma \max_{a_{t+1} \in A}\{Q(s_{t+1}, a_{t+1})\}$, where A is the set of possible actions. This equation may be referred to as the Bellman equation. Solving such an equation at the time t may achieve increased (e.g., maximum) total reward. However, solving the Bellman equation may be difficult due to algorithm complexity, e.g., when the number of states 541 becomes large, such as in a videogame. For example, in Breakout®, the possible states 541 (e.g., the game screens) reflect several pieces of information, e.g., the position, direction, and/or speed of the ball 52 and/or the paddle 51, the state of the bricks 53, and/or the like. To reflect such information, the input may be consecutive game screens (e.g., four consecutive screens) as one input state 541, which contains both static (e.g., brick 53 state) and dynamic (e.g., ball 52 speed) information. Accordingly, each state 541 may have 84×84×4 dimensions (e.g., each screen may be a gray scale image of resolution 84×84 pixels, and 4 screens are used). As such, the total number of states may be $256^{84 \times 84 \times 4}$ (e.g., 256 gray scale values for each pixel). Solving the Bellman equation with input in this scale may be intractable. DQN, which approximates the solution through neural networks (e.g., deep convolutional neural networks) may be used to approximate a solution.

A DQN model may include a deep convolutional neural network, which may take a game state 541 (e.g., four consecutive game screens) as input and output the predicted rewards 542 for individual actions 530 (e.g., four values representing the predicted rewards for each of four actions in Breakout®). The action 530 with a highest predicted reward 542 may be the predicted action 530, and the highest reward 542 may be the quality (e.g., q) value.

Figure 6A:
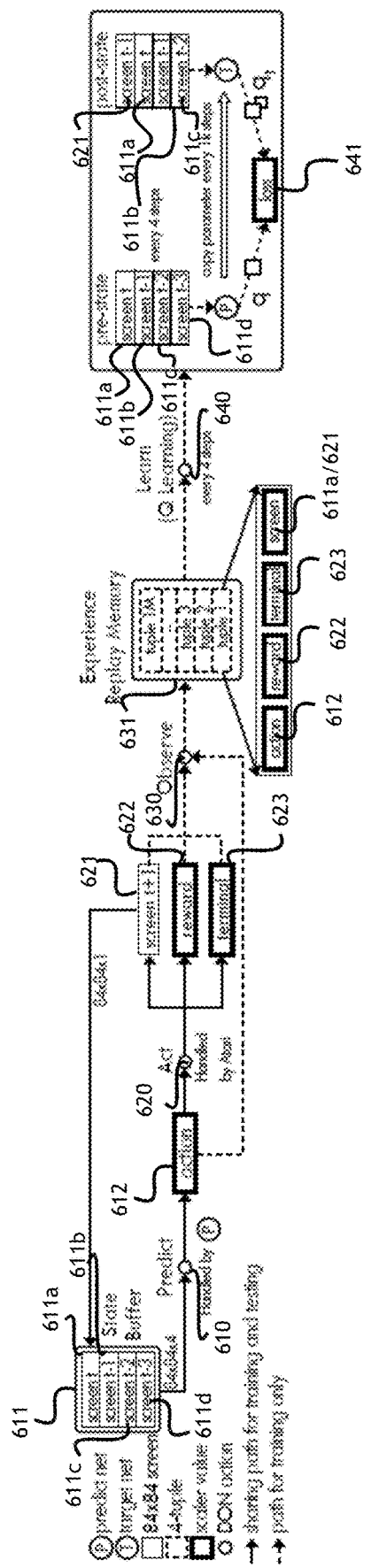
FIGS. 6A and 6B are diagrams of implementations of non-limiting embodiments or aspects of the process shown in FIG. 3.

Referring now to FIG. 6A, FIG. 6A is a diagram of stages of an exemplary RL training according to an implementation of a non-limiting embodiment or aspect of the process 300. In some non-limiting embodiments, RL (e.g., DQN) training may include multiple states, e.g., four stages: predict 610, act 620, observe 630, and learn 640.

The predict stage 610 may be conducted through the DQN, e.g. a first prediction neural network P. The input of P may be the game state (e.g., four consecutive screens in state buffer 611: screen t−3 611d, screen t−2 611c, screen t−1 611b, and screen t 611a) and the output of P may be the predicted rewards for each potential action (e.g., four potential actions). The potential action with the highest predicted reward, e.g., the predicted action 612, may be the output of the prediction stage 610.

The act stage 620 may be handled by the agent (e.g., agent 520) and/or the environment (e.g., environment 510, for example a game emulator such as an Atari® game emulator). For example, the environment (e.g., environment 510, such as a game emulator) may take the predicted action 612 as input (e.g., directly or via agent 520) and output the next state (e.g., screen t+1 621), resulting reward 622, and whether the game terminates or not (e.g., terminal value 623). The next state (e.g., screen t+1 621) may be pushed into a first memory (e.g., state buffer 611), which may be a circular queue storing the latest four states (e.g., screen images). The new state (e.g., screen t+1 621) may constitute a new state in combination with the three previous screens (e.g., screen t−2 611c, screen t−1 611b, screen t 611a, and screen t+1 621), which may be the input of next predict stage 610.

The observe stage 630 may update a second memory (e.g., experience replay (ER) memory 631), which may be a circular queue structure with many (e.g., one million) items, by compositing the predicted action 612, the reward 622 of the action 612, the next state (e.g., screen t+1 621) and/or current state (e.g., screen t 611a), and/or the terminal value 623 as a tuple (e.g., four-tuple), and pushing the tuple into the ER 631.

The learn stage 640 may be where the neural network training/updating may occur. For example, such training/updating may happen every iteration, every set number of iterations (e.g., four iterations and/or the like), or dynamically (e.g., after a dynamically changing number of iterations and/or the like). When the learn stage 640 occurs (e.g., number of iterations and/or the like) may be a hyperparameter. Additionally or alternatively, the learn stage 640 may take random samples (e.g., tuples) from the ER memory 631 as input (or the current tuple may be used as input, or the probability of selecting different samples may be adjustable by hyperparameters, as described herein). Additionally or alternatively, each sample may be a tuple such as $(s_t, a_t, r_t, t_t, s_{t+1})$. Additionally or alternatively, the learn stage 640 may include computing a q value, e.g., $q=\max(P(s_t))$, and/or a target value $q_t$, e.g., $q_t=r_t+\gamma \max(T(s_{t+1}))$, using the first neural network (e.g., prediction network P) and a second neural network (e.g., a target network T, as described herein) net respectively. Additionally or alternatively, the learn stage 640 may include updating the parameters of the first neural network (e.g., P) by reducing (e.g., minimizing) the loss 641 (e.g., the difference between q and $q_t$), e.g., by backpropagation and/or the like.

In some non-limiting embodiments or aspects, the prediction network (P) and the target network (T) may be the same DQN with parameters from different training stages. For example, T may be a copy of the parameters of P after a number of iterations (e.g., every 1,000 iterations) (see, e.g., FIG. 6A). The number of iterations may be predetermined, dynamic, or the like, and may be a hyperparameter of the model. Alternatively, rather than using T, the learn stage may be conducted by computing $q=\max(P(st))$ and $q_t=r_t+\gamma \max(P(s_{t+1}))$, e.g., both calculations use P, though such a technique may be unstable due to the inconsistent $q_t$ values.

In some non-limiting embodiments or aspects, during the predict stage 610, actions 612 may not always come from P. Rather, a percentage of the actions may be randomly generated (e.g., to not only exploit the intelligence of the agent 520 to predict actions, but also explore the unknown portions of the environment 510 by randomly generating actions). The ratio between exploration (e.g., random actions) and exploitation (e.g., predicted actions) may be dynamically updated over the training. For example, in early iterations, a high random rate may be preferred to explore the unknown environment. Additionally or alternatively, in later stages, a low random rate may be preferred to trust more on the trained agent. For the purpose of illustration, random rate ε may be a decay parameter, as follows:

$$\text{action } (a_{t+1}) = f(x) = \begin{cases} \text{random action,} & \text{with } prob\ \varepsilon \\ \text{predicted action, e.g., argmax}(P(s_t)), & \text{with } prob\ 1-\varepsilon \end{cases}$$

The following design considerations may be taken into account in designing the visual analytic framework:

R1: Providing in-depth summary statistics over a training. Having an overview of the training process may be useful, and it may provide insight for other analyses. For example:

R1.1: How did the training process evolve, in terms of common statistical summaries? Examples of these summaries may include the total reward per episode, the number of games per epoch, the losses of life, and/or the like.

R1.2: What are the distributions of actions and rewards, and how do the distributions evolve overtime? For example, will the action distribution become stable (e.g., a roughly fixed ratio among different actions in an epoch) in later training stages? Is there any relationship between the distributions of action and reward over time?

R1.3: Can the overview reflect some statistics of the agent's action/reward behavior? For example, are there any desired action/reward patterns that happen more often over time?

R2: Revealing the agent's movement/reward patterns and synchronizing the varying types of data. Demonstrating the movement/reward patterns of the agent may be useful, and few tools may otherwise be readily applicable for this purpose.

R2.1: Revealing the overall action/reward pattern over a large number of steps. When considering the large amount of experiences during DQN, an effective overview/abstraction may be useful and/or provide guidance.

R2.2: Enabling efficient indexing to examine the agent's behavior at a particular segment. From the overview, users may be able to flexibly select/dive into different segments of interest for detailed analysis.

R2.3: Being able to present other types of data on-demand to facilitate comprehensive reasoning. The q, qt values, random actions, and/or the like may be useful context information when analyzing the agent's behaviors. Users may be able to synchronize them flexibly.

R3: Reading and comparing the mind of the agent in different stages/segments. Users may be enabled to select/dive into the network of a DQN, e.g., to compare and analyze the functionalities of each neuron.

R3.1: Comparing neurons when processing different movement segments in the same training stage. For example, users may be interested to know whether the same neuron extracts the ball/paddle/brick when seeing different segments in the same epoch.

R3.2: Comparing neurons when processing the same movement segment in different stages/iterations. Such a comparison may reveal if the agent treats the same movement segment differently in different training stages and/or how the agent becomes increasingly intelligent.

Figure 6B:
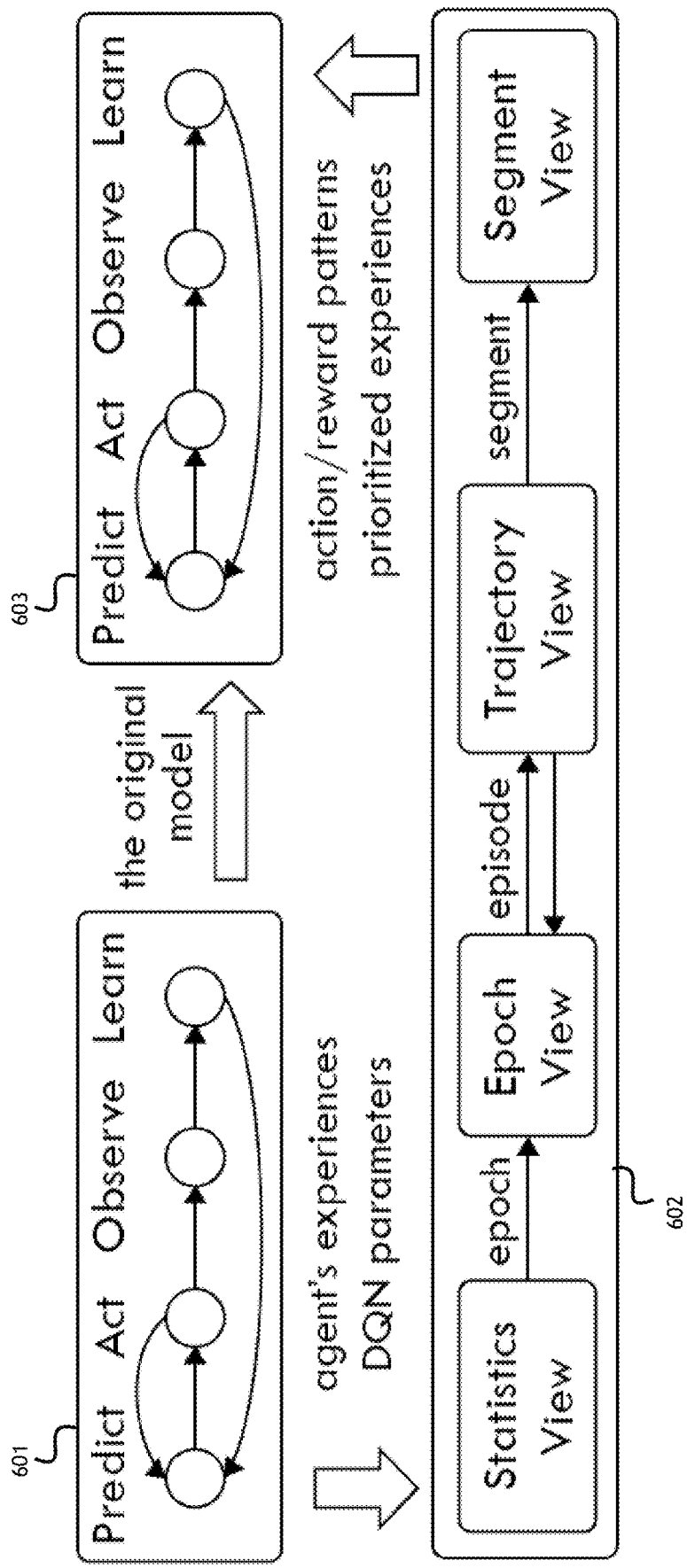

Referring now to FIG. 6B, FIG. 6B is an exemplary overview of an approach to understand, diagnose, and/or improve RL (e.g., DQN) models according to an implementation of a non-limiting embodiment or aspect of the process 300.

As shown in FIG. 6B, at step 601, the DQN model may execute training iterations (e.g., the four stages of FIG. 6A and/or the like), testing iterations (e.g., at least predict stage 610 and act stage 620 of FIG. 6A and/or the like), and/or data collection. The data collected may include the experiences of the agent (e.g., agent 520), which may be heterogeneous time varying sequences, as further described below, and the neural network (e.g., prediction network P) parameters, which may be used to gain insight into individual neurons (e.g., read the agent's mind) and/or analyze the model (e.g., DQN model).

As shown in FIG. 6B, at step 602, the visual analytic framework (e.g., FIGS. 4-4D as described herein and/or the like) may take the data from step 601 as input and/or may display/demonstrate the data in multiple (e.g., four) levels of details. Additionally or alternatively, the displays may be sequential, simultaneous, in response to interaction from the user, and/or the like. In some non-limiting embodiments or aspects, the levels may include a first view (e.g., a statistics view 4a of FIGS. 4 and 4A, as described herein, and/or the like), which may include charts representing an overall training level; a second view (e.g., an epoch view 4b of FIGS. 4 and 4B, as described herein, and/or the like), which may include charts representing an epoch level, a third view (e.g., a trajectory view 4c of FIGS. 4 and 4C, as described herein, and/or the like), which may include one or more charts representing an episode level; and a fourth view (e.g., a segment view 10 of FIG. 10B, as described herein, and/or the like), which may include a chart representing a segment level. From such a visual analytic framework, knowledge and/or insight regarding the representative action and reward patterns of the agent (e.g., agent 520) may be obtained and/or patterns/segments of experiences that are beneficial may be identified to adjust the model (e.g., DQN model) so that the agent (e.g., agent 520) may learn such patterns/segments more (e.g., higher probability of learning from iterations in such a pattern/segment, higher frequency/occurrence of learning from iterations in such a pattern/segment, and/or the like).

As shown in FIG. 6B, at step 603, such knowledge and/or insight may be used to adjust the model (e.g., DQN model), which may enable certain improvements of the model. For example, the agent's (e.g., agent 520) action/reward patterns may help in controlling the random actions in the predict stage (e.g., 610), reduce training time/improve training efficacy by prioritizing certain categories of experiences in the observe stage (e.g., 630) and/or the learn stage (e.g., 640), and/or the like.

For the purpose of illustration, in the environment 510 of the game Breakout®, the player (e.g., the agent 520) may have five lives in each game episode. Life loss may happen when the agent 520 fails to catch/deflect the ball 52 with the paddle 51. The game may terminate if the agent 520 loses all five lives. Four possible actions 530 may include: no-operation (noop), firing the ball (fire), moving left (left), and moving right (right). The agent may receive rewards 542 (e.g., 1, 4, or 7 points) when the ball hits bricks 53 (e.g., in the bottom two rows, middle two rows, and top two rows, respectively). Otherwise, the reward 542 may be 0. On the top of each game screen, the numbers in area 54 may indicate the current reward and the number of lives remaining (e.g., 36 and 2, respectively, in FIG. 5A).

In some non-limiting embodiments or aspects, the DQN may be trained for many epochs (e.g., 200 epochs). Each epoch may contains many iterations (e.g., 250,000 training iterations and 25,000 testing iterations). The testing iterations may not update the model parameters (e.g., only perform the predict stage 610 and action state 620 of FIG. 6A), and thus may be used to assess the model quality. At each testing iteration, multiple types of data may be collected. For example, the collected data may include: (1) action: a value of 0, 1, 2 or 3 representing noop, fire, left, and right; (2) reward: a value of 0, 1, 4 or 7 for the reward from the action; (3) screen: an array of 84×84 values in the range of [0, 255] representing the gray-scale pixel values of the current game scene; (4) life: a value of 5, 4, 3, 2, or 1 representing the number of lives the agent 520 still has in the current iterations; (5) terminal: a boolean value indicating if the episode ends or not; (6) random: a boolean value indicating if the action is a random one; (7) q: the predicted q (a floating point value) for the current action; (8) $q_t$: the target value (e.g., $q_t$ in FIG. 6A) for the current action.

In some non-limiting embodiments or aspects, at the beginning of the training, the random rate ε may be high (e.g., at or near 1 and/or the like). Additionally or alternatively, the random rate may decay (e.g., incrementally to 0.1 and/or the like) over time (e.g., over 1 million iterations, over 4 training epochs, and/or the like) and may remain constant after reaching a lower limit (e.g., 0.1 and/or the like) to the end. For testing, e may be a set value (e.g., 0.05), or may be dynamic and/or adjustable, as described herein. During testing, if an action 530 is a random action, the DQN (e.g, prediction network P and target network T) may be used to derive its q and $q_t$ values, respectively, though the action to be executed will be the randomly generated one.

In some non-limiting embodiments or aspects, the size of the state/screen data may become very large. To save space, the initial game screen at the beginning of the training may be saved. In each iteration, only the screen pixels that have different values than the corresponding pixels in the initial screen may be saved (e.g., due to the temporal coherence, screens in consecutive steps may be very similar). As such, the size of the screen data may be reduced.

Figure 4:
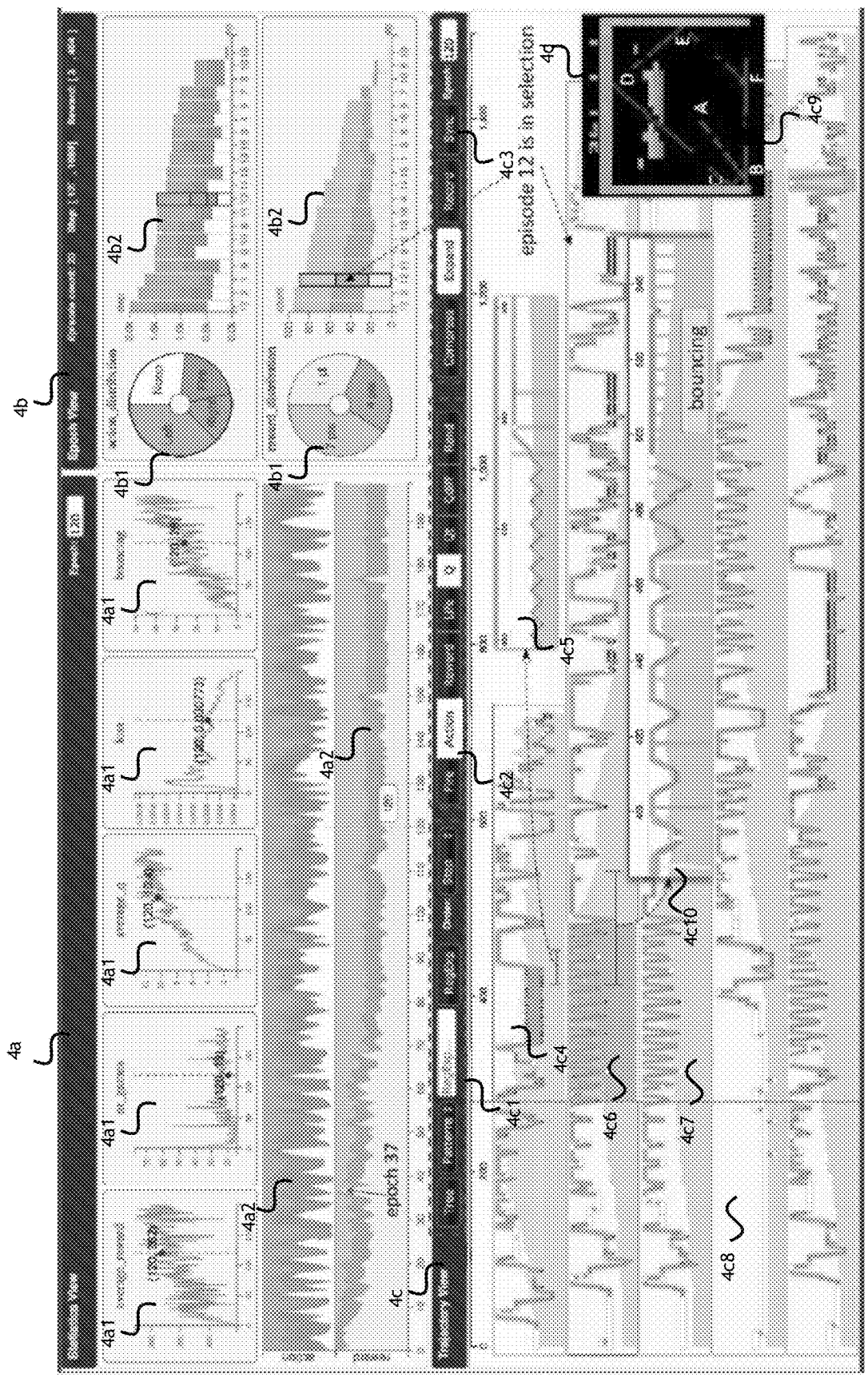
FIGS. 4-4D are screenshots of a visual analytic framework according to an implementation of a non-limiting embodiment or aspect of the process shown in FIG. 3.
Figure 4A:
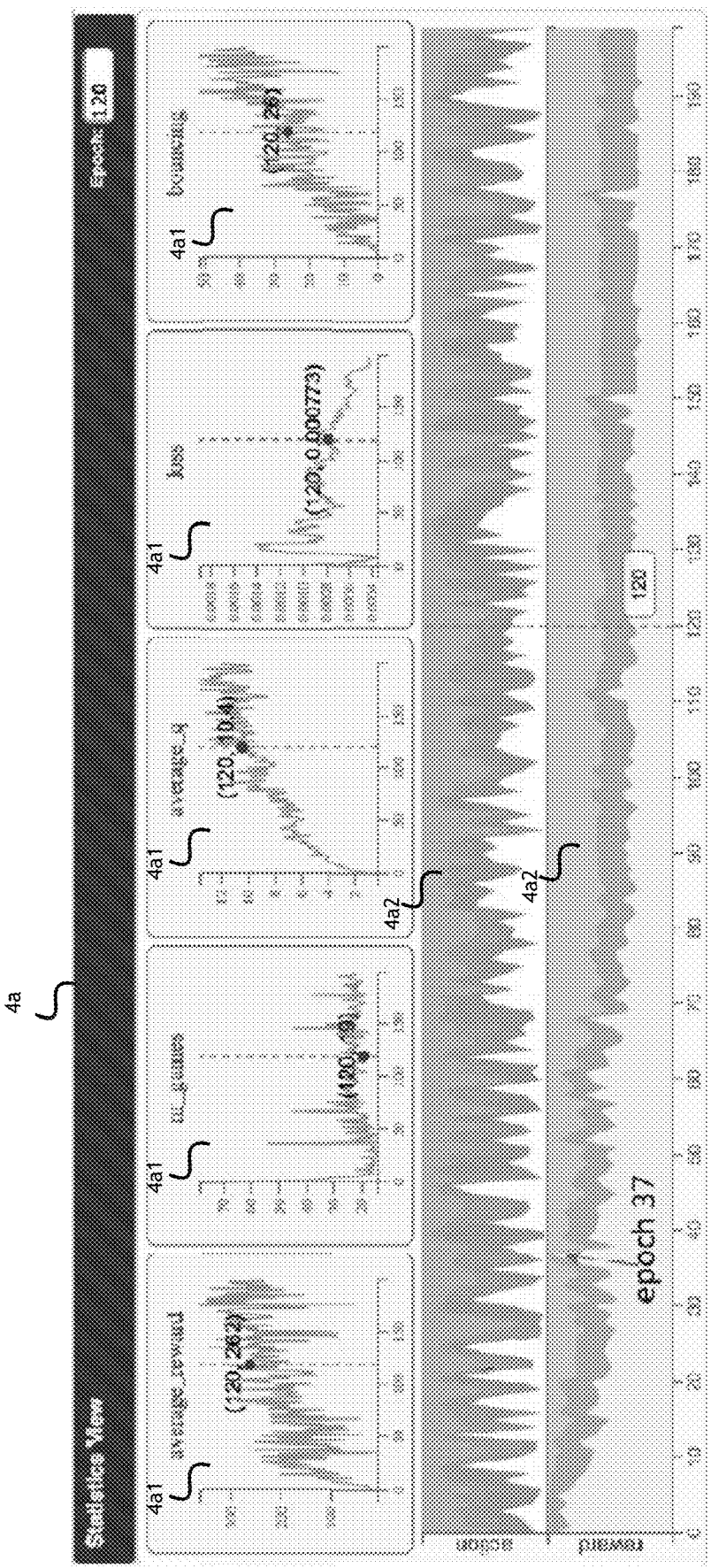
Figure 4B:
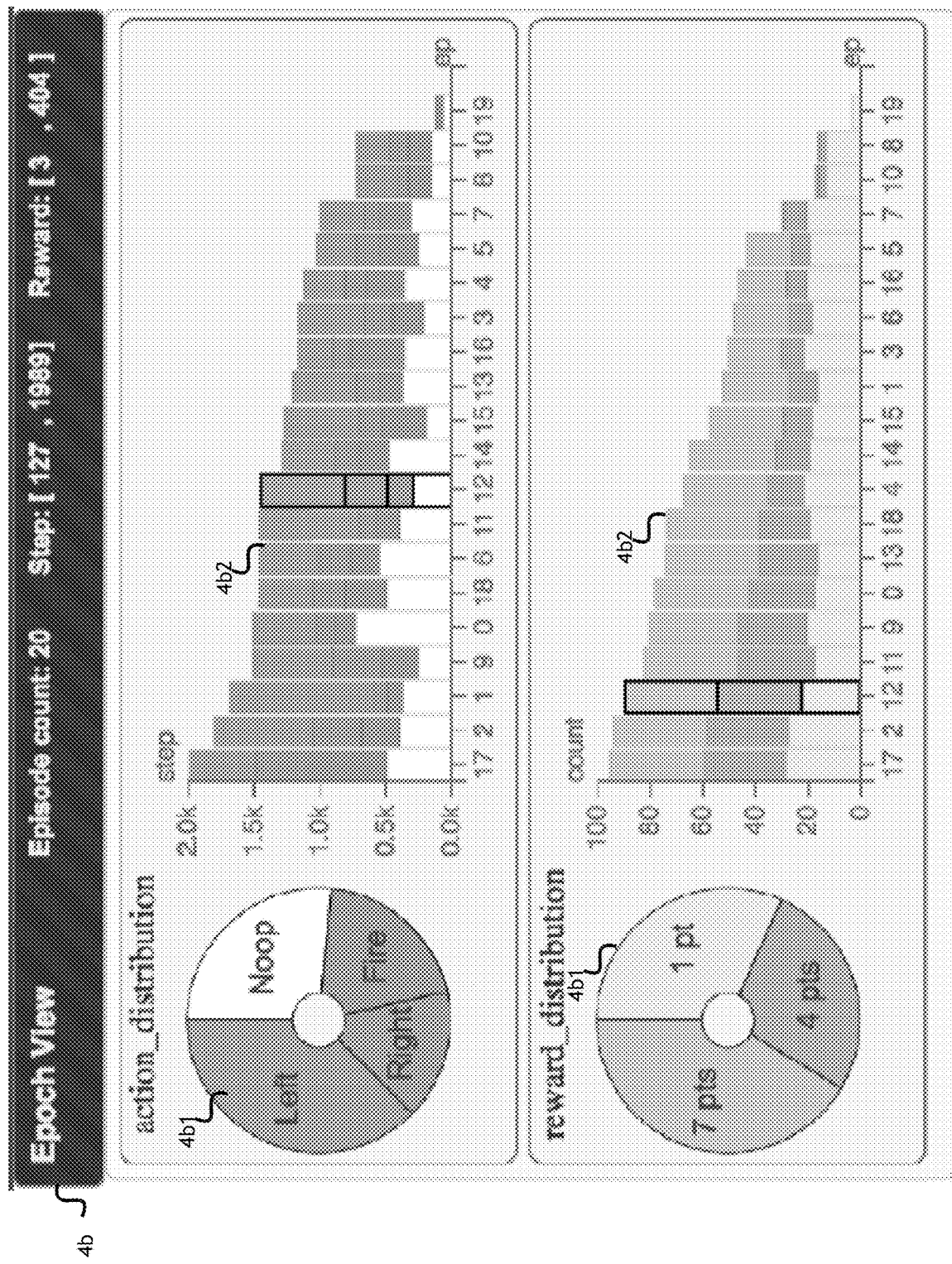
Figures 4C, 4D:
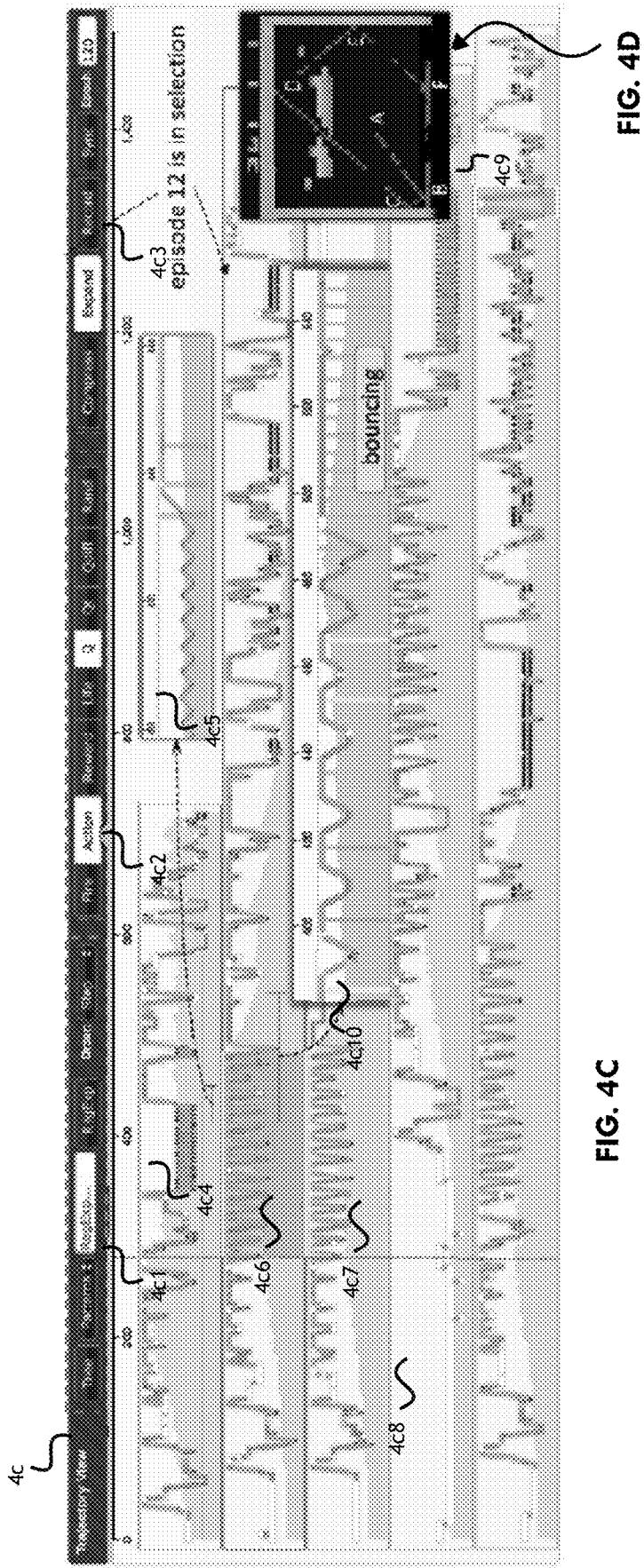

Referring now to FIGS. 4-4D, FIGS. 4-4D are screenshots of a visual analytic framework according to an implementation of a non-limiting embodiment or aspect of the process 300. For the purpose of illustration, a visual analytic framework may be provided with coordinated views. For example, these views may present data collected from an RL model (e.g., DQN model) in different levels, e.g., overall training level (e.g., statistics view 4a), epoch level (e.g., epoch view 5b), episode level (e.g., trajectory view 5c), and/or segment level (e.g., segment view 10, as described herein with reference to FIG. 10 below).

In some non-limiting embodiments or aspects, the statistics view 4a may present the overall training statistics of a DQN model with multiple (e.g., two) types of charts. For example, the charts may be line charts 4a1 and stacked area charts 4a2. Both types of charts may cover the entire training process (e.g., all testing iterations over all epochs) by presenting the time dimension with the horizontal axis (e.g., in the unit of epochs).

In some non-limiting embodiments or aspects, the line charts 4a1 (e.g., reflecting the trend of different summary statistics over the training) may be presented as small multiples. For example, multiple (e.g., five) line charts 4a1 may track multiple (e.g., five) summary statistics. As shown, for the purpose of illustration, the line charts 4a1 may include: average reward (average_reward), number of games (nr_games), mean q values (average_q), loss values (loss), number of bouncing patterns (bouncing), and/or the like. Additionally or alternatively, users may select/choose to view charts of other statistics of interest, including but not limited to minimum game reward, maximum game reward, and number of digging patterns and/or the like, e.g., in place of any of the line charts 4a1 or as an additional line chart.

Additionally or alternatively, multiple (e.g., two) stacked area charts 4a2 may demonstrate the distribution of actions 530 and rewards 542 over time. For example, the evolution of action/reward distributions may provide evidence/inference of the model quality. For example, by seeing the distribution of rewards 542 (e.g., 1 (bottom area), 4 (middle area), and 7 (top area)), one may infer that the model may be progressing towards higher rewards 542, e.g., as higher rewards 542 represent an increasingly higher portion of the rewards 542 over time. For example, at the right side of the bottom stacked area chart 4a2, the distribution of reward (e.g., 1 (bottom area), 4 (middle area), and 7 (top area) points) indicates that the agent 520 may be able to hit roughly the same number of bricks 53 in different layers and/or more bricks 53 in the top two layers (e.g. seven-point bricks). Additionally or alternatively, a user may also change the content of the stacked area chart. For example, a user may replace the reward distribution with the iteration distribution in each life of the agent 520, and/or the like.

For the purpose of illustration, the line charts 4a1 and stacked area charts 4a2 in the statistics view 4a may be synchronized together. For example, when a user hovers (e.g., with a mouse, touchscreen, pointing device, and/or the like) over one chart, a dashed line may be displayed that chart as well as other charts. Additionally or alternatively, a pop-up tooltip in individual views may show the corresponding values on each chart, as shown in FIGS. 4 and 4A (e.g., the mouse may be in the stacked area chart 4a2 of the reward distribution and the current epoch may be 120). Additionally or alternatively, the hovering event may also send the hovered epoch to the epoch view 4b to trigger an update of that view.

In some non-limiting embodiments or aspects, the epoch view 4b may present the summary statistics of the selected (e.g., clicked, hovered, and/or the like) epoch with a combined visualization of multiple types of charts (e.g., a pie chart and/or a stacked bar chart), as shown in FIGS. 4 and 4B. The pie chart(s) 4b1 may show the action/reward distribution of all steps/iterations in the current/selected epoch. Additionally or alternatively, the stacked bar chart(s) 4b2 may show the action/reward distribution in individual episodes of the epoch. For example, the top stacked bar chart 4b2 may display 20 episodes in the current epoch (e.g., one stacked bar for each episode), and the stacked bars may be sorted by decreasing value from left to right to help users quickly identify the episode with a certain maximum number of iterations/rewards.

In some non-limiting embodiments or aspects, the multiple (e.g., two) types of charts may be coordinated with user interactions. For example, when hovering over a sector of a pie chart 4b1 (e.g., the sector representing noop actions), the corresponding portion of the stacked bars may be highlighted (e.g., as the area of the sector may be the summation, average, and/or the like of the corresponding portions in the stacked bars). For the purpose of illustration, the distributions of actions 530 and rewards 542 may be presented in this view. Additionally or alternatively, users may flexibly select/choose other variables for visualization as well.

Figure 15:
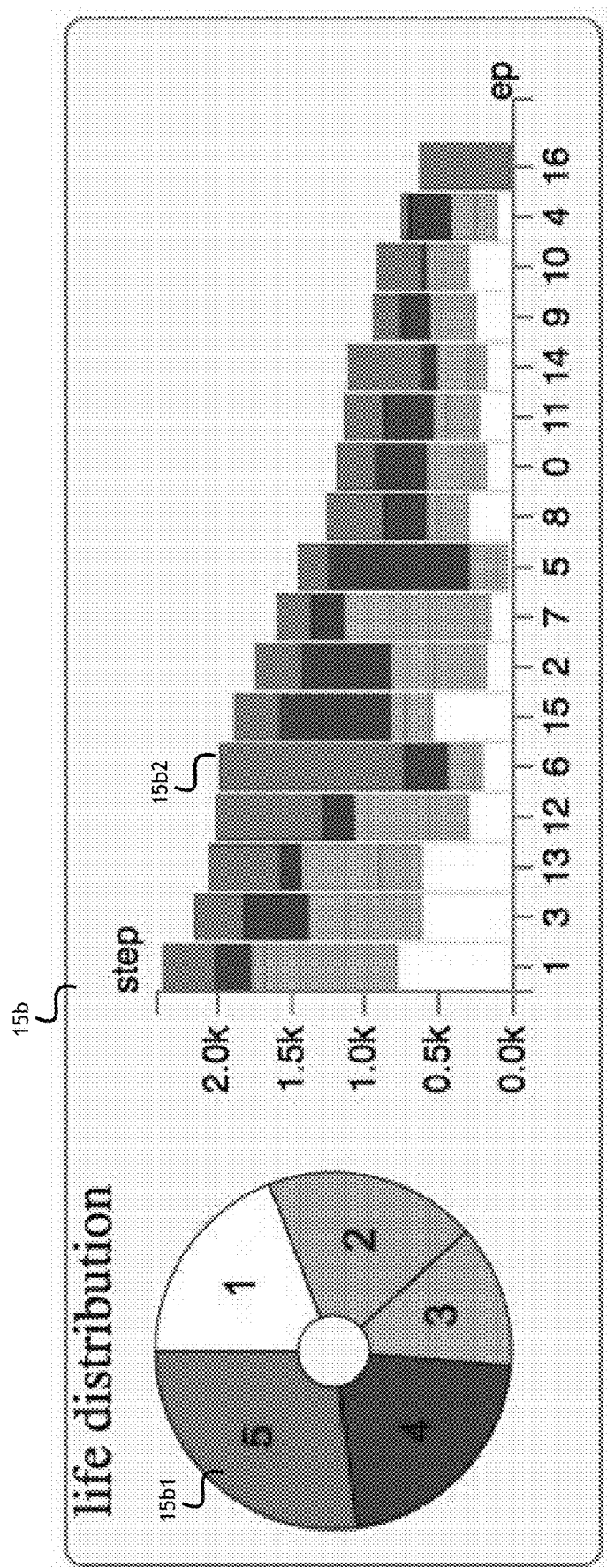
FIG. 15 is a screenshot of a visual analytic framework according to an implementation of a non-limiting embodiment or aspect of the process shown in FIG. 3.

Referring now to FIG. 15, FIG. 15 is a screenshot of a view of a visual analytic framework according to an implementation of a non-limiting embodiment or aspect of the process 300. In some non-limiting embodiments or aspects, an additional or alternative epoch view 15b may by displayed. For example, as shown in FIG. 15, two charts (first (pie) chart 15b1 and second (stacked bar) chart 15b2) for life distribution (e.g., lives remaining during iterations of each episode) may be displayed.

Referring again to FIGS. 4 and 4C, in some non-limiting embodiments or aspects, the trajectory view 4c may provide an overview of the action/reward (e.g., movement/reward) patterns of the agent 520 in different episodes. Additionally or alternatively, the trajectory view 4c may facilitate a user's detailed examinations on-demand.

In some non-limiting embodiments or aspects, action data from one game episode may be considered a trajectory (e.g., an event sequence). For the purpose of illustration, various goals may be served by selecting how to visually depict trajectory information. Such goals may include: (G1) demonstrating an effective overview of all episodes in one epoch; (G2) allowing users to explore episode details on-demand; (G3) effectively revealing the action/reward patterns; (G4) being able to synchronize the (e.g., eight) types of data (as listed above); and/or the like. Various alternative designs for charts in the trajectory view are depicted in FIGS. 4, 4C, and 7A-7J.

Referring now to FIGS. 7A-7J, FIGS. 7A-7J are screenshots of possible trajectory views of a visual analytic framework according to an implementation of a non-limiting embodiment or aspect of the process 300. For example, referring to FIG. 7A, one design may include presenting one episode with a background line 7a1 and embedding circles 7a2 representing different types of actions onto the line. The colors/shading may represent different actions 530 (e.g., noop, fire, left, right, and/or the like). Additionally or alternatively, the circles with a black stroke/outline may represent actions 530 associated with a reward 542. However, such a design may lack a reflection of the agent's movement patterns and may not be efficiently scalable.

Referring to FIG. 7B, circles 7b2 may be embedded in background line 7b1, similar to FIG. 7A. Additionally or alternatively, consecutive circles 7b2 representing the same actions 530 may be connected as one line 7b3, which may effectively reveal the many repeats of an action 530 (e.g., noop, fire, left, right, and/or the like).

Figure 7D:
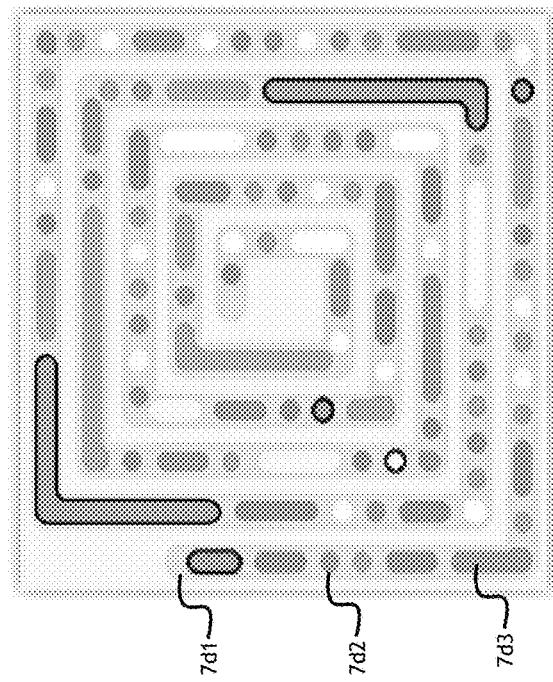
Figure 7C:
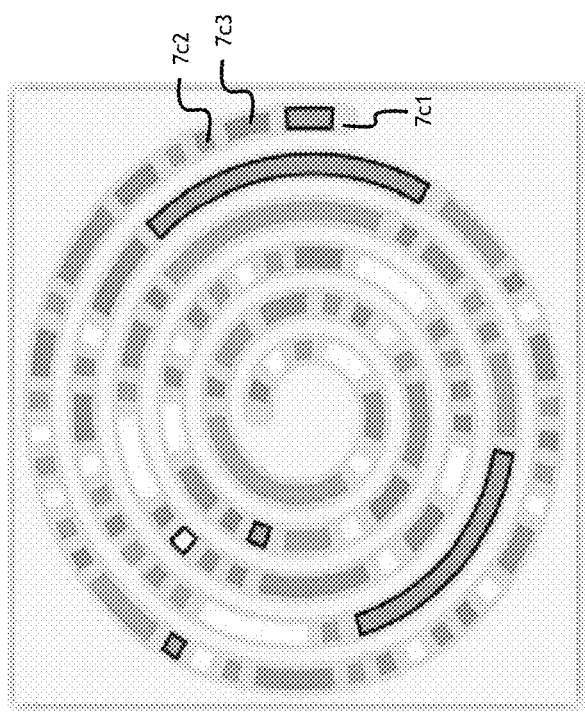

Referring to FIG. 7C, sections 7c2 (e.g., squares, rectangles, annular sectors, and/or the like) may be embedded in spiral background line 7c1. Additionally or alternatively, consecutive sections 7c2 representing the same actions 530 may be connected as one elongated sections 7b3 (e.g., rectangle, annular sector, and/or the like), which may effectively reveal the many repeats of an action 530 (e.g., noop, fire, left, right, and/or the like).

Referring to FIG. 7D, circles 7d2 may be embedded in rectangular spiral background line 7d1. Additionally or alternatively, consecutive circles 7d2 representing the same actions 530 may be connected as one line 7d3, which may effectively reveal the many repeats of an action 530 (e.g., noop, fire, left, right, and/or the like).

In some non-limiting embodiments or aspects, a spiral (e.g., FIG. 7C) or rectangular spiral (e.g., FIG. 7D) layout may display one entire episode. However, if using such a spiral/rectangular spiral, compactly arranging all episodes (e.g., in one epoch and/or the like) with varying lengths may be difficult, as the spiral layout for such episodes may have different widths and heights.

In some non-limiting embodiments or aspects, the moving behavior of the agent 520 may be visually reflected by the position of the paddle 51. For example, an initial position of the paddle 51 may be the same in each episode, and the position of the paddle 51 may be estimated based on the action 530 sequence (e.g., it may take roughly 5 left movements from the initial position to the left boundary, 3 right movements to the right boundary, and/or the like). Referring to FIGS. 7E and 7G-7J, to visualize the position of the paddle 51 as a function of time (e.g., of iteration), the vertical axis may be the distance of the paddle to the right boundary and the horizontal axis may be time (e.g., iterations/steps and/or the like). The movement patterns of the agent 520 may thus be revealed.

Figure 7E:
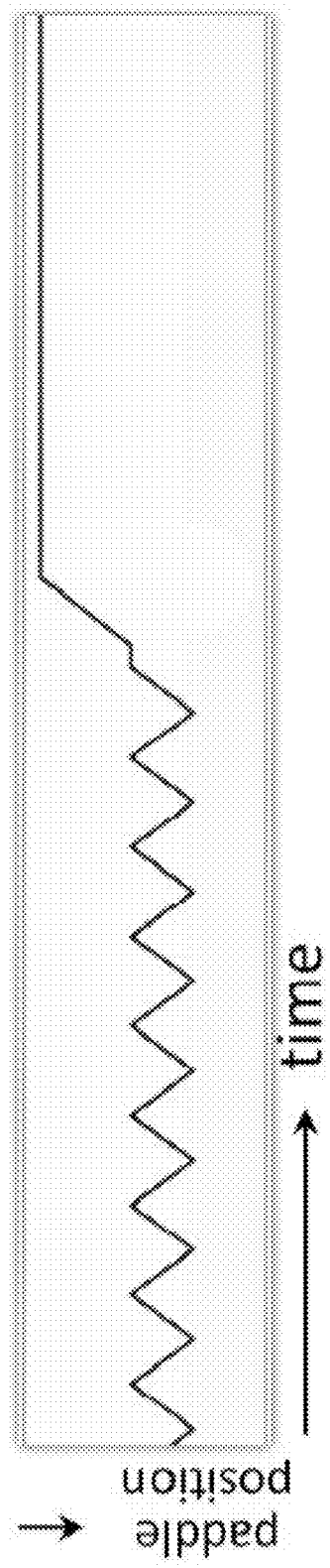

For example, referring to FIG. 7E, the oscillation in roughly the first half of the image (e.g., from left end to near the center) may indicate that the agent keeps switching between left and right movements to adjust the position of the paddle. Additionally or alternatively, this design may allow flexible compression of the chart/curve for each episode horizontally (e.g., compress the horizontal axis, such as like a spring, and/or the like), which may enable viewing a long episode within limited screen space. In some non-limiting embodiments or aspects, the paddle positions, which may reflect the agent's moving patterns, may not reflect other actions taken by the agent (e.g., fire, noop). For example, in the right half of FIG. 7E (e.g., from near the center to the right end), the paddle 51 may remain at the leftmost position (e.g., the top of the chart). However, the action that the agent is taking in this time period may be noop, fire (e.g., the fire action does not change the paddle position), or left movement (e.g., the paddle is blocked by the left boundary and cannot go further).

Referring again to FIGS. 4 and 4C as well as FIGS. 7G-7J, action circles/lines (e.g., 7g2, 7h2, 7i2, 7j2) may be overlaid on the paddle movement curve (e.g., 7g1, 7h1, 7i1, 7j1). Using such a design, referring to FIGS. 4 and 4C, the action 530 taken by agent 520 may be represented by a color, shading, and/or the like, of the line/curve. For example, at area 4c4, which is reproduced in zoomed-in/uncompressed image 4c5, the agent 520 may be observed taking three types of actions (e.g., left, noop, and fire) based on the color/shading of the circles/lines, and most often during this time period, the agent 520 may be repeating the left action.

In some non-limiting embodiments or aspects, the trajectory design may synchronize other types of data with the action data. For example, referring to FIGS. 4 and 4C, in zoomed-in/uncompressed images 4c5 and 4c10, some actions may be highlighted with background bars in different colors/shades. The bars may represent if the action 530 is a random action, the reward 542 (e.g., 1, 4, or 7 points) received by the action 530, and/or the like. Exemplary background bars are also depicted in FIG. 7F, representing random, 1, 4, 7, and remaining lives, respectively, based on the color/shading of the background bar. Referring to FIG. 7F, glyphs may be designed for actions 530 with life loss. For example, the background 7f1 of this glyph may be a color/shade (e.g., gray), and the foreground of the glyph may have between 0 and 4 rectangles 7f2 (e.g., darker shade and/or different color, such as red, and/or the like), the number of which may indicate the number of remaining lives after the life loss resulting from the action 530. Additionally or alternatively, the terminal information (e.g., when the agent loses all five lives and/or game over) may also be represented in this glyph (e.g., a gray bar 7f1 with no dark/red rectangles).

In some non-limiting embodiments or aspects, the q and $q_t$ values may be presented as transparent area charts (e.g., with different colors and/or shading) in the background, for example, as depicted in FIGS. 4 and 4C at area 4c5. For example, when a user interacts (e.g., clicks, selects, and/or the like) the action circles/lines, a video clip (e.g., a sequence of screen images may be displayed (e.g., pop up and/or the like) and depict the corresponding collected screen data (e.g., sequence of screen images). For the purpose of illustration, a screenshot of such a video clip is shown in FIG. 8.

Figure 8:
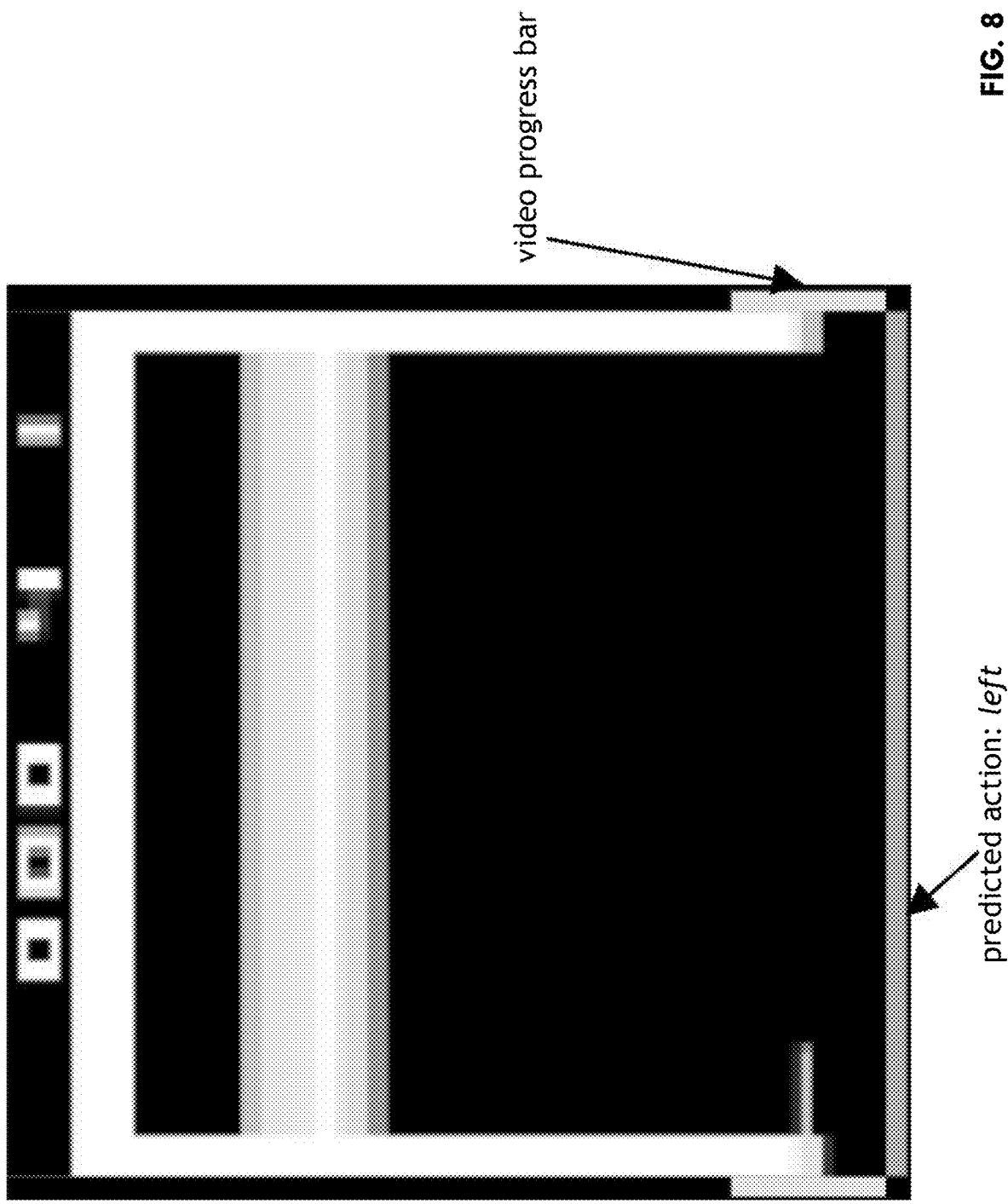
FIG. 8 is a screenshot of a video of a videogame according to an implementation of a non-limiting embodiment or aspect of the process shown in FIG. 3.

Referring to FIG. 8, FIG. 8 depicts a screenshot of a video clip of a videogame according to an implementation of a non-limiting embodiment or aspect of the process 300. As shown in FIG. 8, the progress/position of the video clip may be depicted by progress bars, e.g., vertical bars on either or both sides of the displayed screen image. Additionally or alternatively, the action 530 associated with the screen image/state 541 may be represented a color and/or shading, which may be the same color and/or shading associated with such action in the trajectory view 4c. For example, a horizontal bar at the bottom of the screen image may have a color and/or shading corresponding to the predicted action 530 at the current screen image (e.g., state 541) of the video. Additionally or alternatively, the color may change from screen image to screen image as the video plays. In some non-limiting embodiments or aspects, such a video clip may be useful in assessing/observing actions by the agent 520 (e.g., repeating actions, such as repeating the noop action and/or the like).

In some non-limiting embodiments or aspects, a set of graphical elements (e.g., check-boxes, widgets, buttons, and/or the like) may allow users to turn on/off the visualization of different types of data as desired. For example, graphical elements are depicted in areas 4c1, 4c2, and 4c3 of FIGS. 4 and 4C.

Figure 9A:
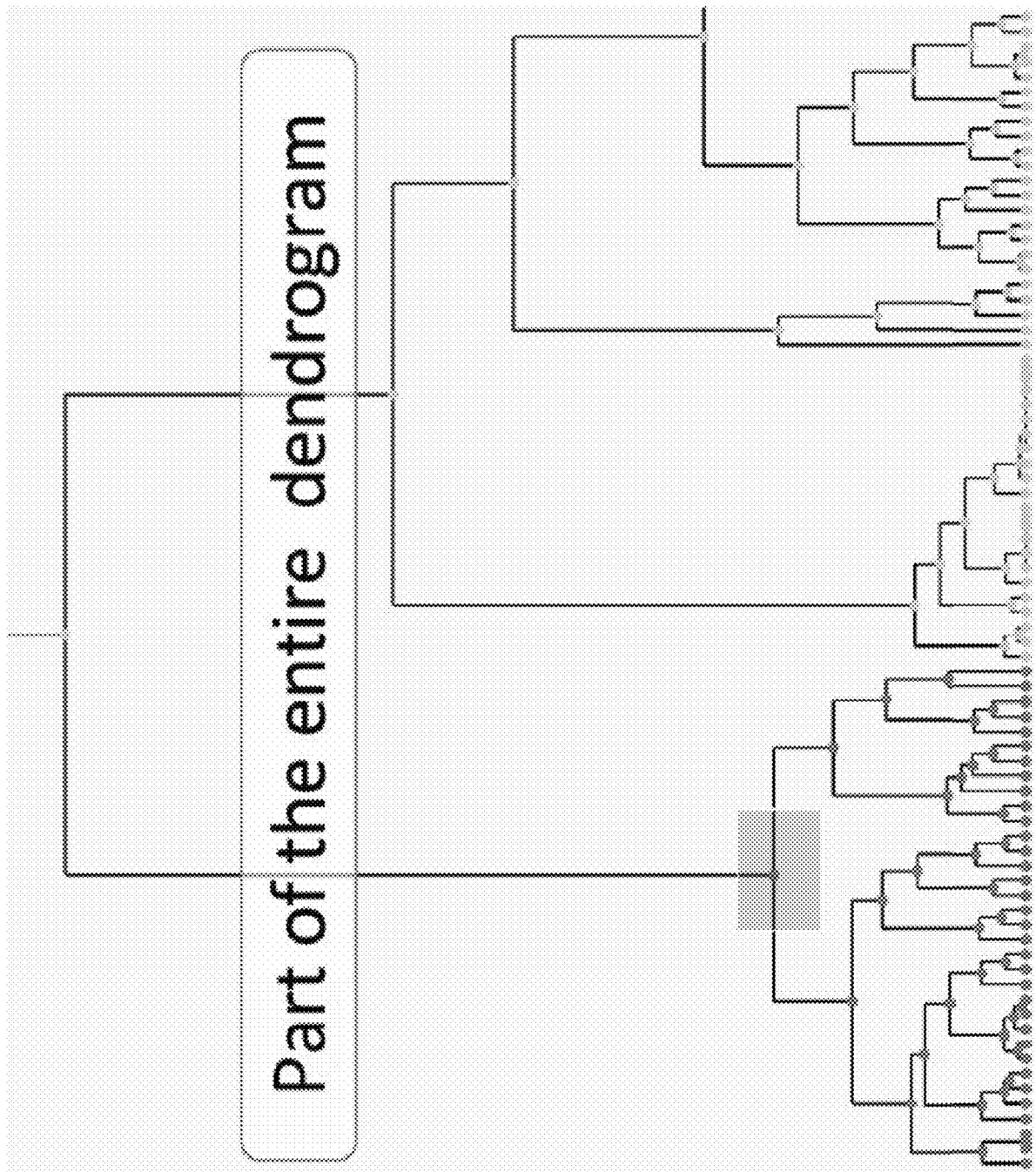
FIGS. 9A and 9B are screenshots of visual analytic frameworks according to implementations of non-limiting embodiments or aspects of the process shown in FIG. 3.
Figure 9B:
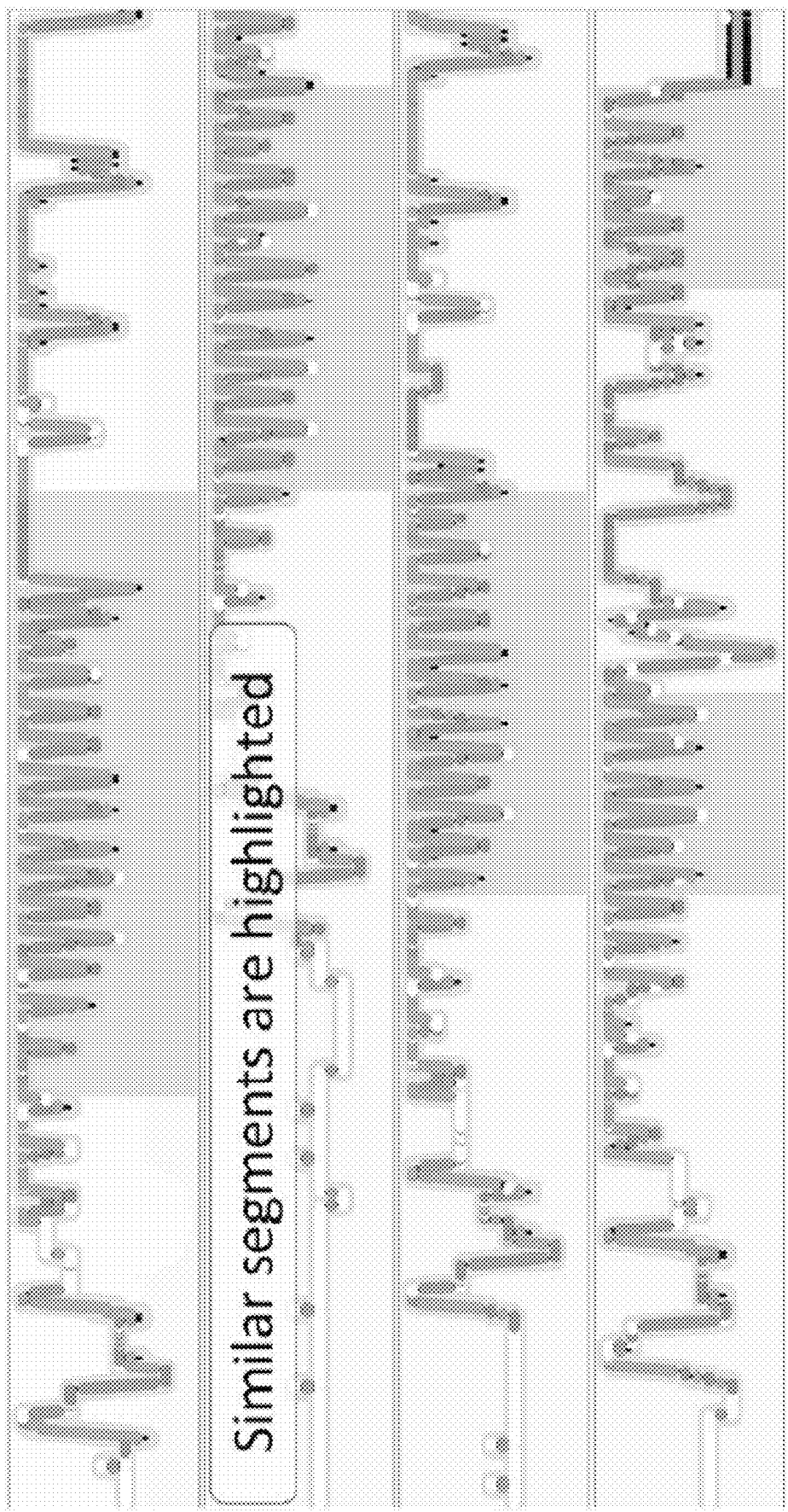

In some non-limiting embodiments or aspects, visually identifying and summarizing typical patterns from the large amount of actions 530 in an episode may be difficult. In some non-limiting embodiments or aspects, the episodes/trajectories in one epoch may be divided into many smaller segments. Additionally or alternatively, the segments may be clustered to identify patterns. For example, segments may be clustered using an agglomerative hierarchical clustering. For the purpose of illustration, the segment length may be a set amount (e.g., 100 iterations), a selectable/adjustable amount of iterations, a dynamic amount of iterations, and/or the like. Additionally or alternatively, the segment length may be a hyperparameter of the model (e.g., RL model, DQN model, and/or the like). In some non-limiting embodiments or aspects, a segment may be expressed with a sequence of values (e.g., indicating the paddle 51 position, such as distance to the right boundary). Additionally or alternatively, to align different segments, dynamic time warping may be used to measure the dissimilarity between any pair of segments and derive a dissimilarity matrix for all segments in an epoch, which may be the input of a clustering algorithm, such as the clustering algorithms described herein. In some non-limiting embodiments or aspects, graphical elements (e.g., a button such as the "Tree" button, a check-box, a widget, and/or the like) may be selectable by a user, as shown in area 4c1 of FIGS. 4 and 4C. For example, when the "Tree" button is selected, a chart/visualization (e.g. a dendrogram and/or the like) may be displayed (e.g., pop up) representing the clustering, as shown in FIG. 9A. Additionally or alternatively, selecting different portions of the chart/visualization (e.g., selecting branches of the dendrogram and/or the like) may highlight different segments in the trajectory view, as shown in FIG. 9B.

In some non-limiting embodiments or aspects, action 530 (e.g., movement) patterns of the agent 520 may be observed from the clustering results. For example, such patterns may be determined/defined automatically. Additionally or alternatively, some patterns may be observed and defined by a user. In some non-limiting embodiments or aspects, after determining/defining such patterns in one or some epochs, the patterns may be searched for (e.g., mined) in other epochs. Additionally or alternatively, the appearance trend of such patterns may be summarized to provide more insight into the model evolution. In some non-limiting embodiments or aspects, one or more expressions may be used to define a pattern. For example, an action sequence may be expressed as a string (e.g., of 0, 1, 2, and 3, representing the four possible actions) and a regular expression may be used to search on the string to find when and where a particular pattern happens. For the purpose of illustration, as shown in Table 1, the first two rows may represent exemplary movement patterns defined with regular expressions: repeating and hesitating.

TABLE 1

| Pattern | Regular expression | Explanation |
| --- | --- | --- |
| repeating | 0{30,} | repeating noop (0) for at least 30 times |
| hesitating | (20*30*){5,} | repeating left (2) and right (3) for at least 5 times. There might be multiple noop actions between the left and right |
| digging | 10 + 10 + 40 + 40 + 70 + 70 | the two 1 s, 4 s, and 7 s are where the ball hits the bottom, middle and top two rows, the 0 s in between are the round trip of the ball between the paddle and bricks |
| bouncing | (70+){5,} | hitting top 2 rows for at least 5 times |

Reward patterns may be identified, determined, and/or defined similarly to action patterns, as described above. For example, the agent 520 may become smart (e.g., well-trained) in the later steps/iterations of the training, and the agent may try to dig a tunnel through the bricks 53, e.g., so that the ball can bounce between the top boundary and the top two rows of bricks 53 to achieve 7 points for hitting the bricks 53 in the top two rows. For the purpose of illustration, digging and/or bouncing patterns may be defined using regular expressions, as shown in the last two rows of Table 1.

In some non-limiting embodiments or aspects, the regular expression for each pattern may be relaxed. For example, the digging in Table 1 may be relaxed to 10+40+40+70+. Additional and/or alternative patterns may be defined (or redefined) similarly. For the purpose of illustration and not limitation, FIG. 14 may depict a trajectory view of a digging pattern.

In some non-limiting embodiments or aspects, tracking the appearances and/or counts of important patterns may provide insight into the evolution of the behaviors of the agent 520. For example, a decrease of staying may indicate that the agent 520 may become more flexible in switching among actions 530. Additionally or alternatively, an increase of digging may reflect that the agent 520 has learned to dig tunnels through bricks 53 to gain higher rewards 542. For the purpose of illustration, various different patterns may be used as summary statistics, for example, as shown in the line charts 4a1 of statistics view 4a.

Figure 10A:
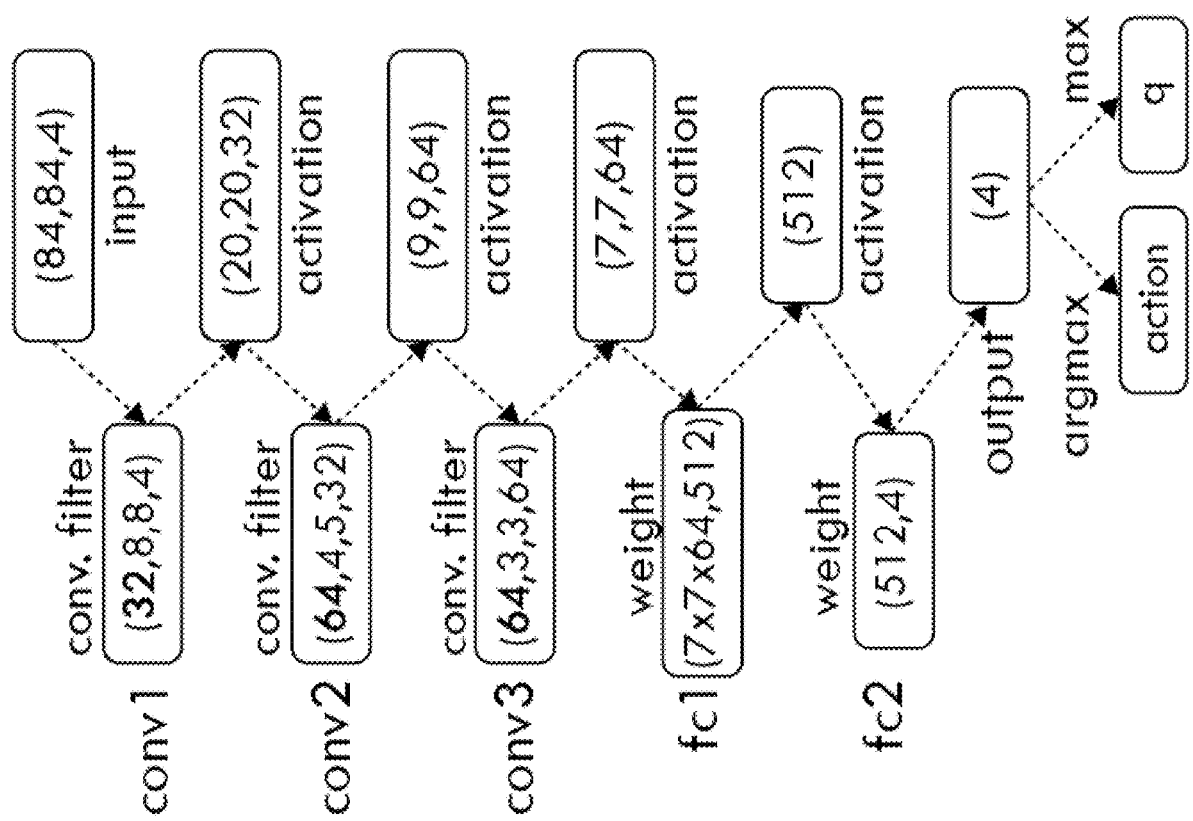
FIG. 10A is a diagram of an implementation of a non-limiting embodiment or aspect of the process shown in FIG. 3.

Referring now to FIG. 10A, FIG. 10A is a diagram of a DQN model according to an implementation of a non-limiting embodiment or aspect of the process 300. In some non-limiting embodiments or aspects, observing and/or analyzing into the structure of such a DQN model may reveal what has been extracted by the neural network and/or processing elements (e.g., neurons) of the DQN model. In some non-limiting embodiments or aspects, the input of the neural network may be a state 541 of size 84×84×4 (e.g., at the top right of FIG. 10A), and the output may be a vector of four values (e.g., second to bottom row on the right of FIG. 10A) representing the predicted rewards for the four actions. Among the four values, the maximum value (e.g., the highest predicted reward 542) may be the predicted q (e.g., bottom row on the right), and the action 530 with the maximum value may be the predicted action 530 (e.g., bottom row on left). For the purpose of illustration, as shown in FIG. 10A, between the input and output, there may be multiple (e.g., three) convolutional layers (e.g., conv1, conv2, conv3) and multiple (e.g., two) fully connected layers (e.g., fc1, fc2). Additionally or alternatively, the size of the input to each layer may be depicted by the row on the right side above such layer, and the size of the output of such layer may be depicted by the row on the right side below such layer.

In some non-limiting embodiments or aspects, the neurons (e.g., convolutional filters) in the convolutional layers may be the basic computational units/processing elements that extract features from the input states 541. For example, focusing on such neurons may provide insight into what the agent sees (e.g., extracts from the input images/states 541). For the purpose of illustration, referring to FIG. 10A, the convolutional layers may be represented with four numbers, e.g., the number of filters, the width of each filter, the height of each filter, and the number of channels in each filter, respectively. As shown in FIG. 10A, there may be 32, 64, and 64 filters in the first (conv1), second (conv2), and third (conv3) convolutional layers, respectively.

For the purpose of illustration, given a segment, the state that is maximally (e.g., most) activated by each of the 160 filters may be identified, and guided backpropagation may be performed to reveal what features (e.g., of the input state 541) each filter may have extracted from that state 541, as shown in Algorithm 1. For example, for each filter in each layer, a forward propagation may be applied on all of the input states 541 of the segment (e.g., Algorithm 1, line 5), which may provide the state 541 (e.g., max state in Algorithm 1, line 7) that can be maximally activated by the filter. Using the activation of this state 541 (e.g., max activation in Algorithm 1, line 8), guided backpropagation may be performed to derive a saliency map (e.g., map in Algorithm 1, line 9) for the state. The saliency map may have the same size with the input state (e.g., 84×84×4 and/or the like), and the pixel values in the map may indicate how strong the corresponding pixels of the input state 541 have been activated by this filter (e.g., the backpropagation may compute the gradient of the maximum activation on the input state 541). In some non-limiting embodiments or aspects, by blending the input state 541 with its corresponding saliency map, the region of the input state that has been seen by the current filter may be exposed (e.g., like an eye of the agent).

---

Algorithm 1 Picking out the most activated state (max state) from a segment (screens), and generating the corresponding saliency map (map) of the state for each convolutional filter in each layer.

```
1:   screens = [s₁,s₂, ...,sₙ]  // a segment of n screens
2:   states = [{s₁,s₂,s₃,s₄},...,{sₙ₋₃,sₙ₋₂,sₙ₋₁,sₙ}]  // n-3 states
3:   for i = 0; i < layers.length; i++ do
4:      for j = 0; j < layers[i].filters.length; j++ do
5:         activations = DQN.f_prop(layers[i].filters[j], states)
6:         max_idx = argmax(activations)
7:         max_state = states[max_idx]
8:         max_activation = activations[max_idx]
9:         map = DQN.b_prop(layers[i].filters[j], max_activation)
10:        max_states[i][j] = max_state  // save the most activated state
11:        saliency_maps[i][j] = map   // and its saliency map
```

---

-continued

Algorithm 1 Picking out the most activated state (max state) from a segment (screens), and generating the corresponding saliency map (map) of the state for each convolutional filter in each layer.

```
12:      end for
13:   end for
```

---

Figure 10B:
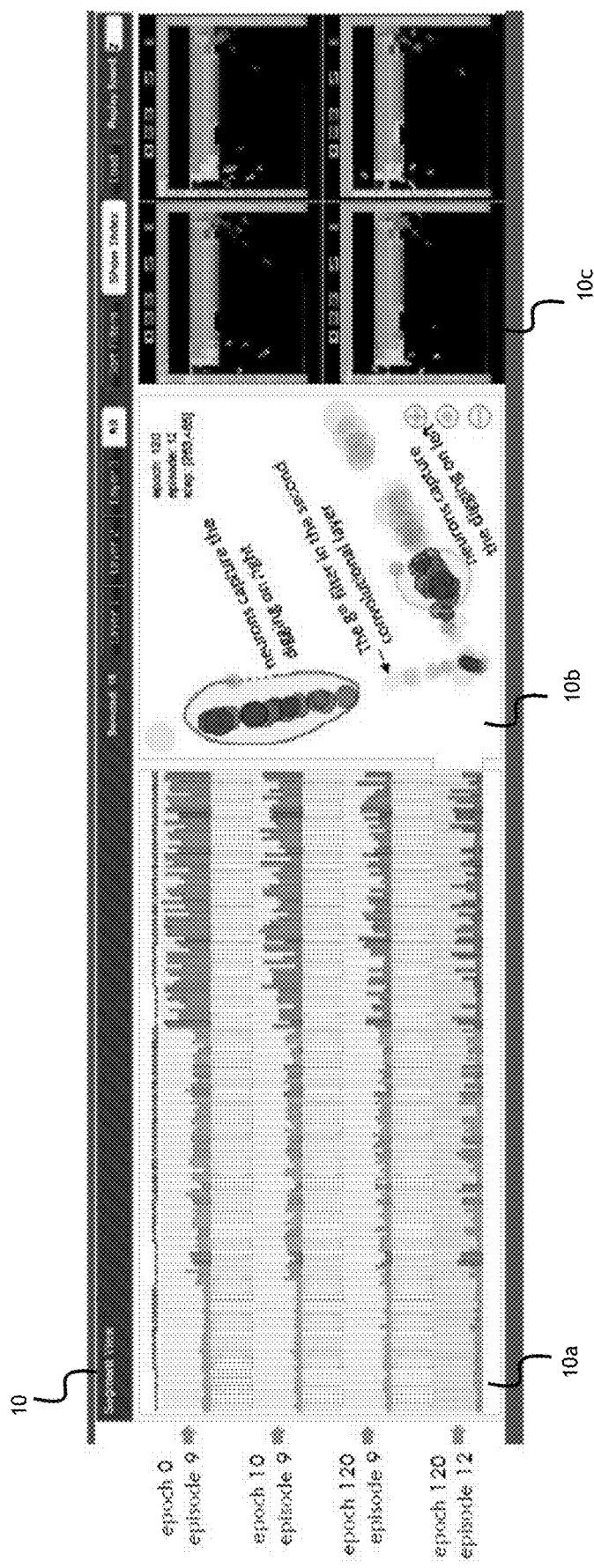
FIG. 10B is a screenshot of a visual analytic framework according to an implementation of a non-limiting embodiment or aspect of the process shown in FIG. 3.
Figure 11B:
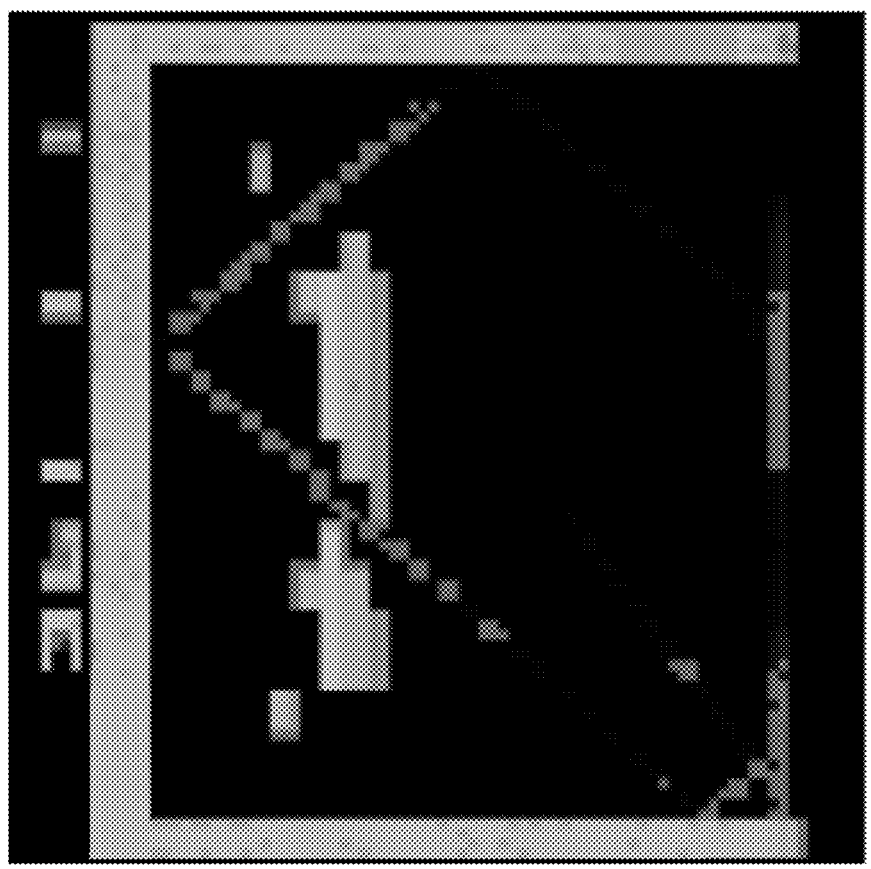
FIGS. 11A-11D are screenshots of a videogame and saliency maps according to an implementation of a non-limiting embodiment or aspect of the process shown in FIG. 3.
Figure 11A:
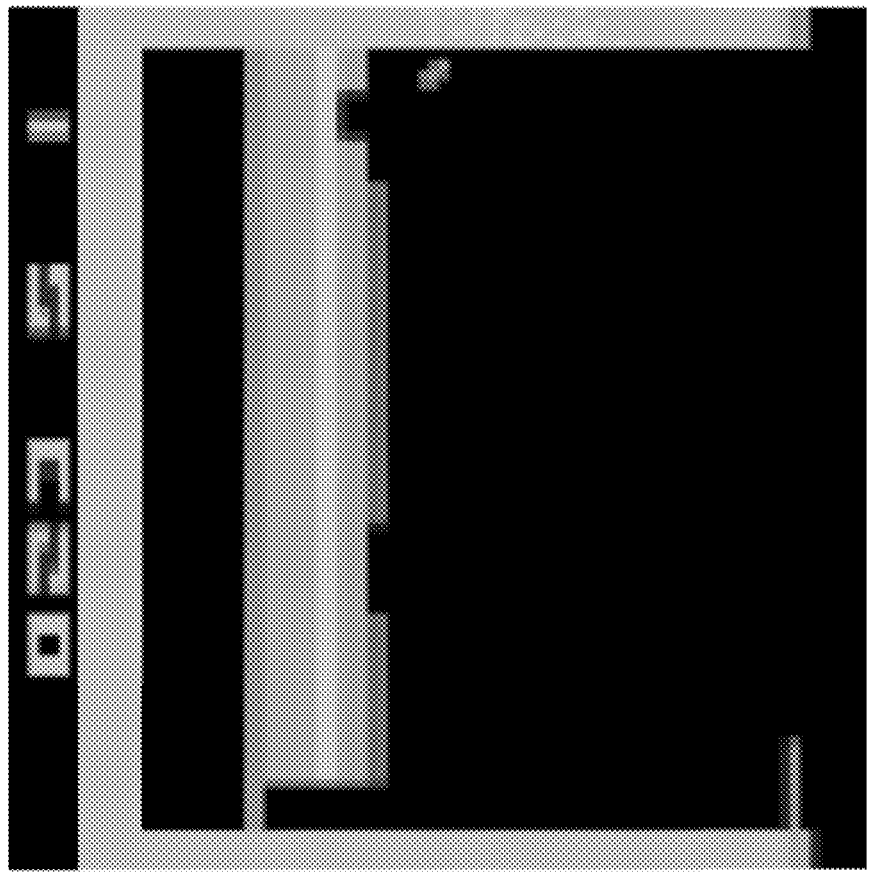
Figure 11D:
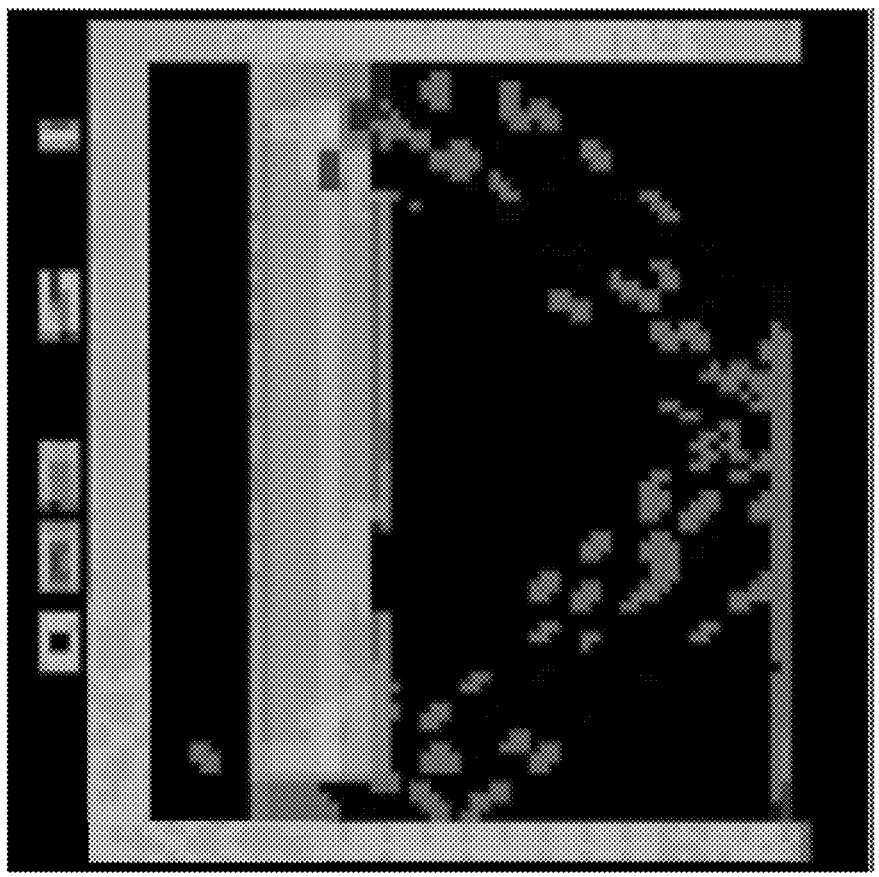

Referring now to FIGS. 11A-11D, FIGS. 11A-11D are screenshots of a saliency map of a visual analytic framework according to an implementation of a non-limiting embodiment or aspect of the process 300. For example, FIG. 11A shows the blending result of the second screen of a state (each state contains, e.g., four screens) with its corresponding saliency map. As shown in FIG. 11A, the filter/agent 520 can be seen to have extracted the ball 52 from the state. Additionally or alternatively, FIGS. 11B, 11C, and 11D may show what the agent 520 extracts (e.g. sees) from the segment in the 1st, 2nd, and 4th row of chart 10a of segment view 10 in FIG. 10B, as described below.

Referring now to FIG. 10B, FIG. 10B is a screenshot of a segment view of a visual analytic framework according to an implementation of a non-limiting embodiment or aspect of the process 300. In some non-limiting embodiments or aspects, the segment view 10 may reveal what the agent 520 really sees (e.g., which portions of the screen images/state 541 impact predicted actions 530) during a segment of actions 530 (e.g., movement and/or the like). In some non-limiting embodiments or aspects, the segment view 10 may enable a user to effectively analyze the convolutional filters (e.g., 160 convolution filters, as shown in FIG. 10A) along with the state 541 each convolutional filter has maximally activated (e.g., 160 states, one for each convolutional filter). For example, as shown in FIG. 10B, segment view 10 may include multiple (e.g., three) sub-views/charts: a parallel bar charts sub-view 10a, a principal component analysis (PCA) sub-view 10b, and averaged game screens sub-view 10c (e.g., showing four averaged game screens of the input segment).

The parallel bar chart sub-view 10a may be designed like a horizontal parallel coordinates plot (PCP), and each parallel axis may be a bar chart representing one segment (e.g., four rows/segments). Each bar in each row may represent a convolutional filter (e.g., a neuron) from the DQN network, and the height of the bar may indicate how strongly the neuron has been activated (e.g., based on the number of activated pixels in the corresponding saliency map, see Algorithm 1). Additionally or alternatively, a color (e.g., red, green, blue, and/or the like) or shade (e.g., lightest, middle, darkest, and/or the like) may indicate that the filter is from the first, second, or third convolutional layer, respectively. In some non-limiting embodiments or aspects, different rows may represent different segments, and the corresponding neurons may be linked together with Bézier curves across rows for comparison. Additionally or alternatively, clicking a graphical element (e.g., a "Sort Filters" button, checkbox, widget, and/or the like) in the segment view 10 (e.g., in the header area thereof) may sort the bars based on their height. In some non-limiting embodiments or aspects, users may focus on filters in a selected layer (e.g., conv1, conv2, or conv3), a combination of layers, all such layers, and/or the like for analysis, e.g., by interacting with the graphical elements (e.g., widgets, buttons, checkboxes, and/or the like in the header) corresponding to each and/or all layers. As shown in FIG. 10B, the widget may be set to "All" layers. Additionally or alternatively, a selected row (e.g., the bottom row) may be highlighted (e.g., with a color such as pink and/or a shade) based on selecting/choosing that row/segment for analysis in the other two sub-views (e.g., 10b, 10c). For example interacting (e.g., clicking, hovering, and/or the like) on different rows may switch the selection/choice.

The PCA sub-view 10b may show the PCA projection of the convolutional filters (e.g., 160 convolutional filters) of the selected row based on a saliency map thereof, e.g., transferring 84×84×4 dimensional saliency maps to two dimensions (2D). In some non-limiting embodiments or aspects, each circle in the PCA sub-view 10b may represent one filter. Additionally or alternatively, the color/shade and size of each circle may represent which layer the filter is from and how strong the filter is activated, respectively. Additionally or alternatively, the circles in the PCA sub-view 10b may have one-to-one correspondence with the bars of the selected row in the parallel bar charts (e.g., parallel bar chart sub-view 10a). For example, clicking any bars or circles may pop up a video (e.g., four screen images/video frames), which may show the blending result of the input state and the corresponding saliency map. For the purpose of illustration, FIG. 11A may show a screen image (e.g., a second screen image/frame of a pop-up video) when clicking a convolutional filter (e.g., the eighth convolution filter) in the second convolutional layer (e.g., position indicated in PCA sub-view 10b). Additionally or alternatively, graphical elements (e.g., buttons, widgets, and/or the like) may enable semantic zoom (e.g., based on user interaction with such graphical elements, such as the buttons depicted in the bottom right corner of the PCA sub-view 10b), which may mitigate the overlap among circles.

In some non-limiting embodiments or aspects, the averaged game screens sub-view 10c may display multiple screens (e.g., four screens), which may show the average state of a segment. For example, the top-left screen of the averaged game screens sub-view 10c may be the result of averaging the first screen from all input states of the selected segment. Additionally or alternatively, when a user selects different convolutional filters from the parallel bar charts sub-view 10a (e.g., via hovering, brushing, and/or the like) or from the PCA sub-view 10b (e.g., via clicking, lasso selection, and/or the like), the union of the corresponding saliency maps may be highlighted on the averaged game screens sub-view 10c. For example, the two selected clusters of filters shown in PCA sub-view 10b (e.g., selected circles within colored/shaded lassos) may demonstrate agent 520 watching the ball 52 digging the left and right corner bricks 53.

Referring again to FIG. 4A, the statistics of training an exemplary RL model (e.g., DQN model) over multiple epochs (e.g., 200 epochs) may be displayed. In some non-limiting embodiments or aspects, the training may be considered to be successful based on the evidence (e.g., line charts 4a1) demonstrating that the average reward per episode (average_reward) and the number of games per epoch (nr_games) may be increasing and decreasing, respectively, over time (e.g., epochs). Additional summary statistics for the training may be displayed/analyzed simultaneously in the small-multiples of line charts 4a1 (e.g., to address R1.1). From the stacked area charts 4a2, the relative proportion of 4-point and 7-point rewards may be increasing with the training (e.g., over successive epochs), indicating the agent 520 may hit more bricks 53 in the middle two and top two layers over time. Additionally or alternatively, no obvious distribution pattern of the (four) actions 530 (e.g., left, right, noop, fire) may be found in the stacked area chart 4a2 for actions 530. For example, such an observation may address/provide evidence regarding R1.2, e.g., the action 530 distribution may not be stable in later training stages/iterations and the agent 520 may achieve high rewards 542 with different action distributions. For the purpose of illustration, as depicted in FIGS. 4 and 4A, some abnormal epochs may be found, which may provide informative hints for future explorations/experiments. For example, the reward distribution in epoch 37 may not be following the general trend in the stacked area chart 4a2. By exploring this epoch in the trajectory view 4c, the agent 520 may be seen to have repeated hesitating and staying patterns, which may indicate the parameter of the DQN model in this epoch may not be very good (e.g., addressing R1.3). However, the model may adjust its parameters back as the reward 542 distribution improves in epoch 38. Additionally or alternatively, the number of different patterns may be presented/displayed in the overall statistics (e.g., addressing R1.3). For example, from the rightmost line chart 4a1, the bouncing pattern may occur more and more often over time (e.g., over successive epochs), which may provide useful indications on the model quality.

Referring again to FIG. 4, the dashed line in the statistics view 4a may indicates that epoch 120 is currently in exploration in the epoch view 4b. For example, referring to FIG. 4B, the epoch view may demonstrate the action and reward distribution of all the iterations during testing (e.g., 25,000 iterations) in this epoch (e.g., the pie charts 4b1), as well as their distribution in individual episodes (e.g., the stacked bar charts 4b2). For example, from the pie charts 4a1, more left actions 530 may have been taken than right actions 530 in general (e.g., addressing R2.1), and the agent 520 may hit more 7-point bricks than 4-point bricks in this epoch. In some non-limiting embodiments or aspects, diving into individual episodes of the epoch, action 530 and reward 542 distributions may be compared with the stacked bar charts 4b2. For example, the reward 542 distributions in episodes 17 and 2 may be similar (e.g., the first two stacked bars from the left in the reward 542 distribution stacked bar chart 4b2), but the action 530 distributions may be different in these two episodes (e.g., the first two bars from the left in the action 530 distribution stacked bar chart 4b2). This observation may demonstrate that similar rewards 542 may be achieved with different action 530 distributions (e.g., addressing R1.2).

Referring to FIG. 4C, the trajectory view 4c may demonstrate the action 530 (e.g., movement) patterns of the agent 520 in the selected epoch (e.g., epoch 120). For example, five episodes/trajectories may be in the visualization (e.g., trajectory view 4c) and they may be sorted by their number of steps (e.g., from least steps at the top to most steps at the bottom). As shown in FIG. 4C, some patterns may be identified easily (e.g., addressing R2.1), such as the hesitating and staying patterns in trajectory view 4c in area 4c4 and area 4c8, respectively. Additionally or alternatively, enlarged details may be presented/displayed for select portions (e.g., zoomed-in/uncompressed image 4c5), which may demonstrate that the hesitating patterns (e.g., from area 4c4) may be terminated by the random actions 530, as shown by, e.g., colored/shaded bars such as cyan bars and/or the like (e.g., addressing R2.2 and R2.3). Such a view may enhance a user's understanding on the functions of random actions 530. Additionally, the action 530 (e.g., movement) patterns in area 4c6 and area 4c7 may be similar to each other. For example, referring to zoomed-in/uncompressed image 4c10, zooming into the pattern from area 4c6 may be useful for visualizing the reward data; additionally or alternatively, replaying with the video clips (e.g., series of screen images representing the state 541), the agent 520 may be seen digging a tunnel through the bricks 53 (e.g., using the paddle 51 to direct a ball 52 repeatedly to a given area of the bricks 53 to dig a tunnel therethrough). Additionally, a bouncing pattern may appear immediately after the digging pattern, as shown in zoomed-in/uncompressed image 4c10 (e.g., addressing R2.2 and R2.3). Additionally or alternatively, the q value may increase during the digging pattern, but the q value may start decreasing after the tunnel is through the bricks 53 (e.g., when the bouncing starts). When digging the tunnel, the agent 520 may see (e.g., extract) the progress of the tunnel (e.g., from the screen images of the input state 541), and the expected reward may increase as the tunnel may potentially result in bouncing (e.g., the ball 52 repeatedly hitting bricks 53 in the top two rows to receive high (7-point) rewards 542). However, when the bouncing starts, the bricks 53 (e.g., in the top two rows) may be destroyed by the ball 52, and the expected future reward (e.g., the q value) may decrease. Additionally or alternatively, when bouncing patterns occur, the paddle 51 may be at the leftmost position most often (e.g., this observation has been observed in most of the bouncing cases).

With continued reference to FIG. 4C, at area 4c6, the brushed/selected digging segment (e.g., highlighted iterations, from about 263 to about 485, of episode 12 in epoch 120) may be selected for display in the segment view 10, e.g., for detailed analysis. For example, referring again to FIG. 10B, in parallel bar charts sub-view 10a, the fourth row (e.g., the currently selected row corresponding to episode 12 of epoch 120) may correspond to the brushed/selected segment form trajectory view 4c. Additionally or alternatively, PCA sub-view 10b in combination with the four averaged screens of averaged game screens sub-view 10c may show that two groups of filters may capture the digging behaviors on the two sides of the scene. The four average screens may be similar (e.g., due to the overlap of screens in consecutive states 541) and the difference among the four saliency maps of selected filters also may be marginal. To save space, one average screen (e.g., the fourth average screen) may be presented along with the saliency maps from all filters in FIG. 11D, e.g., because the other three may be similar. In some non-limiting embodiments or aspects, the agent 520 may try to dig tunnels from both sides of the bricks 53, e.g., with different angles of the ball 52. Additionally or alternatively, different filters may capture the path of the ball 52, the path of the paddle 51, and the bricks 53 on two sides of the game scene.

Referring again to FIG. 10B, the third row of the parallel bar charts (in parallel bar charts sub-view 10a) may be another segment in this epoch (e.g., corresponding to area 4c9 of FIG. 4C) (e.g., addressing R3.1). The agent 520 may move the paddle 51 all the way to the left then to the right in this segment. For the purpose of illustration, FIG. 4D may show the fourth average screen and the joint saliency map from all filters. For example, the agent 520 may clearly see (e.g., extract) the path of the ball 52, e.g., the ball 52 starts from point A (the first fire action in this segment), bounces off the boundary of the scene at points C, D and E. The repeating left and right actions 530 in this segment may be where the agent 520 moves the paddle 51 to catch the ball 52 in points B and F. By exploring the neurons/filters in these two segments, certain neurons may be determined to perform similar functions, e.g., filter 16 from the third convolutional layer may trace the ball 52 in both segments. Additionally or alternatively, some neurons may have dramatically different functions, e.g., filter 23 in the second convolutional layer may see (e.g., extract) the top-left tunnel through the bricks 53 in the digging segment but may trace the ball 52 in the other segment. This visual analytics result may demonstrate evidence that neurons in the same stage/iteration may not always have the same behaviors when processing different input states 541. Additionally or alternatively, based on comparing the height of bars in the parallel bar charts (e.g., in parallel bar charts sub-view 10a), pixels activated by neurons in earlier layers may be smaller in general than later layers. For example, the circles from three layers in the PCA view 10b may follow an inner-to-outer layout (e.g., circles from the first and third convolutional layers may be in the inner/outer regions and circles from the second convolutional layer may be in between).

Figure 11C:
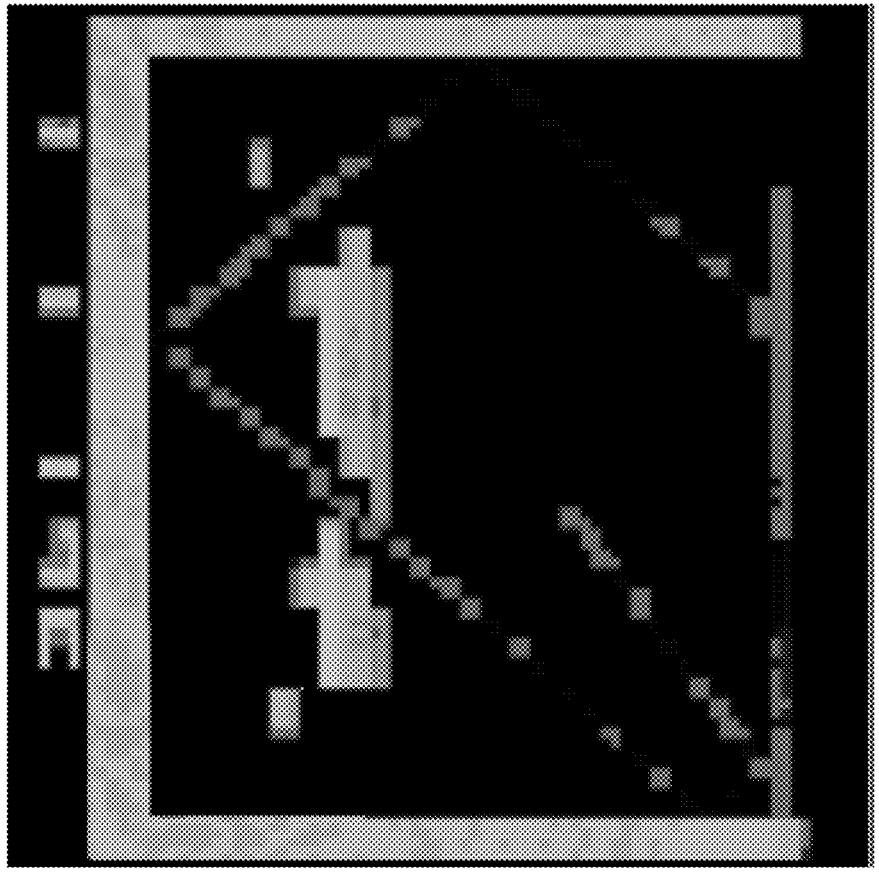

Referring to FIGS. 11B and 11C, the backpropagation results of the same segment may be shown, but using the model parameters in epoch 1 and epoch 10, respectively (e.g., the first and second row in parallel bar charts sub-view 10a of FIG. 10B) (e.g., addressing R3.2). Based on a comparison of these three figures, the agent 520 in earlier stages/iterations may not really see (e.g., extract) the full path of the ball 52. This may explain why the agent 520 may fail to catch the ball 52 in those stages/iterations (e.g., the agent 520 may be partially blind). Moreover, based on a comparison of the height of the bars in the first three rows in parallel bar charts sub-view 10a of FIG. 10B, the number of activated pixels (e.g., especially activated by the third layer) may be decreasing from early to later stages/iterations, but the activated regions may become more and more precise over time (e.g., successive iterations). For example, the agent 520 may gradually realize that the top boundary of the scene (e.g., the white region below the numeral reward) is not important in choosing actions, as the activated pixels in that region become less and less (e.g., based on comparing FIGS. 11B, 11O, and 4D).

For the purpose of illustration and not limitation, assume a hypothesis that the random actions 530 are not necessary after a DQN model is well-trained (e.g., Experiment 1). For example, the logic behind this hypothesis may be that an action 530 predicted by an intelligent DQN agent should be better than a randomly generated action 530. To test this hypothesis, the random rate $\varepsilon$ may be set to 0 after 200 epochs, and the well-trained agent 520 may be used to play the Breakout® game for 25,000 steps to see the effect of the random rate (e.g., compared to $\varepsilon$=0.05 during testing iterations).

Figure 12A:
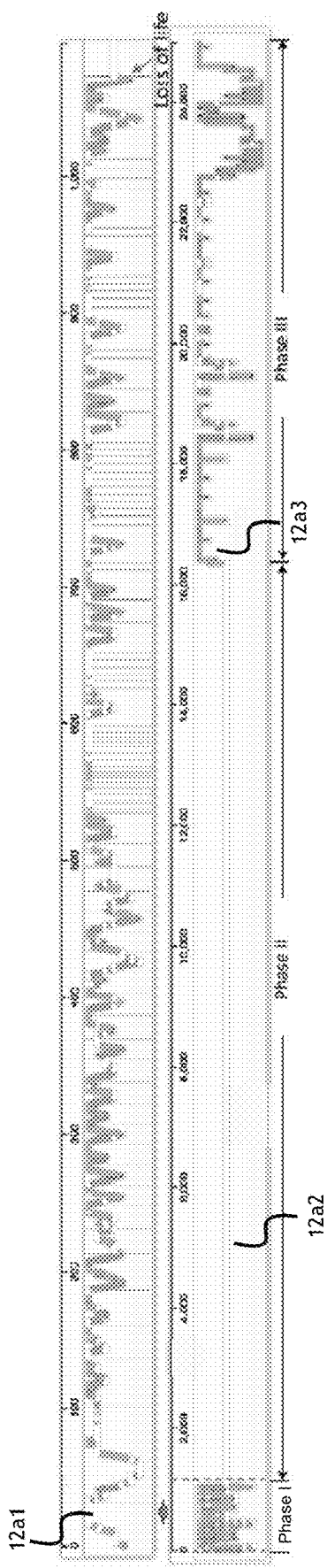
FIGS. 12A and 12B are screenshots of visual analytic frameworks according to implementations of non-limiting embodiments or aspects of the process shown in FIG. 3.

Referring to FIG. 12A, the 25,000 steps may be displayed in the trajectory view (e.g., the same as or similar to trajectory view 4c). The visualization may demonstrate differences from this experiment with data collected when $\varepsilon$=0.05. First, there may be only one episode in the 25,000 steps, and the episode may be very long. Second, the agent 520 may repeat the noop action in roughly 60% of the episode. The episode may be roughly cut into three phases, as labeled in FIG. 12A. By zooming into the first phase (Phase I), the agent 520 may be observed to have played very well in approximately the first 1,080 iterations (e.g., area 12a1), and a bouncing pattern may be observed around 520 iterations. Phase I may ends with a life loss around iteration 1080. For Phase II, the agent 520 may repeat the noop action for approximately 15,000 steps (e.g., area 12a2). This observation may reject the hypothesis that random actions 530 are not necessary for well-trained models, as the agent 520 can still be trapped by certain states of the environment 510. For example, FIG. 12C may show the screen data at position indicated by area 12a2. Based on the image, the paddle 51 may be observed to stay around the middle of the scene and the ball 52 may not be in the scene (e.g., there may have been no fire action 530). One may infer that the agent 520 earned 374 points and lost 1 life in Phase I from the numerical values on top of this image. Additionally or alternatively, based on reviewing the screen data at the position indicated in area 12*a*3, the game may have crashed, as the numbers for reward and life disappear from the scene (e.g., as shown in FIG. 12D). Therefore, the results in Phase III may not be meaningful.

Based on Experiment 1, random actions may be deemed to be useful. In some non-limiting embodiments or aspects, when the random actions 530 happen may be controlled (e.g., based on a condition) (Experiment 2). For example, a random action 530 may interrupt an intentional action 530 (e.g., an otherwise desirable predicted action 530). For the purpose of illustration, if the ball 52 is moving from top-right to bottom-left and the agent 520 is repeating left movements to move the paddle from right to left to catch the ball 52, a random action 530, e.g., a right movement, may slow the paddle 51 and result in a life loss. Additionally or alternatively, a random action 530, when useful (e.g., to prevent the agent 520 from being trapped), may not happen in time. For example, a random action 530 may happen after the agent has repeated the noop action for 100 iterations. If the random action 530 can happen right after the second noop, the other 98 meaningless repeats may be avoided.

In some non-limiting embodiments or aspects, random actions 530 may be useful (e.g., needed, beneficial, and/or the like) in certain scenarios. For example, a random action 530 may be useful when the agent 520 keeps hesitating but gets no reward 542 (e.g., as depicted in FIG. 4C at area 4*c*5). Additionally or alternatively, a random action 530 may be useful when the agent 520 keeps repeating the same action 530 but gets no reward 542 (e.g., FIG. 12A). As such, for Experiment 2, a random action 530 (or a chance of a random action, e.g., increasing the random rate to) may be introduced (or increased) whenever either of these two scenarios happen. In some non-limiting embodiments or aspects, a pattern detection (PD) algorithm may be explained as follows. A buffer may be maintained to store a number of iterations (e.g., a set number of iterations such as 20, an adjustable number, a dynamic number, and/or the like). At each iteration, if the agent 520 received rewards 542 within the number of iterations in the buffer (e.g., 20 iterations), no random action 530 may be needed and/or taken. However, if the agent 520 did not receive any reward 542 during that number of iterations (e.g., 20), but the agent 520 repeated the same action 530 or the same movement pattern in those iterations, a random action 530 (or an increased chance thereof) may be introduced. The repeating of a pattern may be detected using regular expressions. For example, if the latest three actions 530 are right (2), left (3), and noop (0) and this pattern may be found a number of times (e.g., 6 times) in a number of latest iterations (e.g., 18 iterations) less than the number in the buffer (e.g., 20), then a hesitating pattern may be happening and a random action 530 may be useful. Additionally or alternatively, this Experiment 2 may include checking patterns of varying lengths (e.g., approximately 2-7 iterations; note that the pattern length in the foregoing example may be 3), and a random action 530 (or chance thereof) may be introduced if a pattern has been repeated a number of times (e.g., at least three times).

Figure 12B:
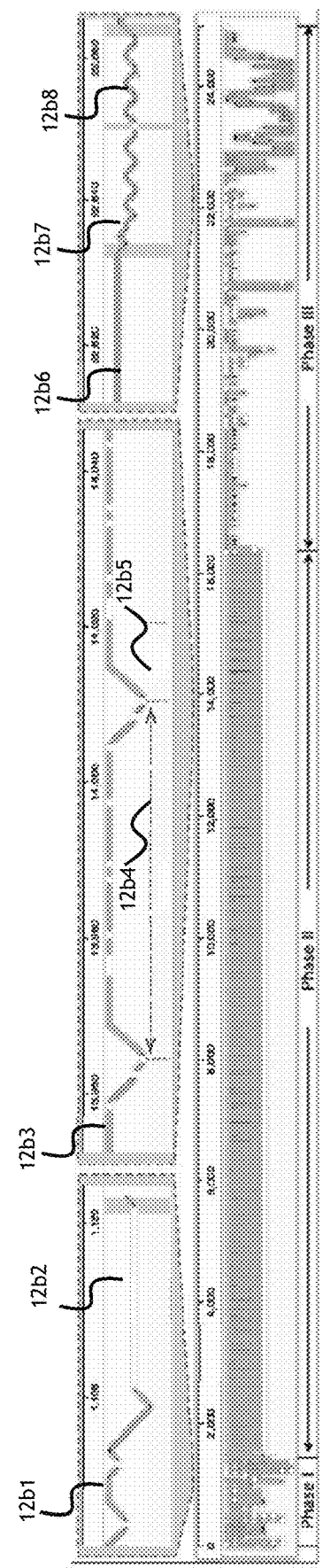
Figure 12D:
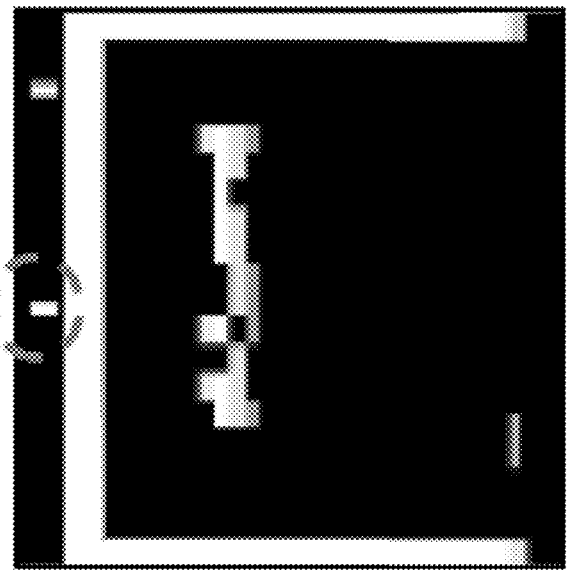
FIGS. 12C-12E are screenshots of a videogame according to an implementation of a non-limiting embodiment or aspect of the process shown in FIG. 3.
Figure 12C:
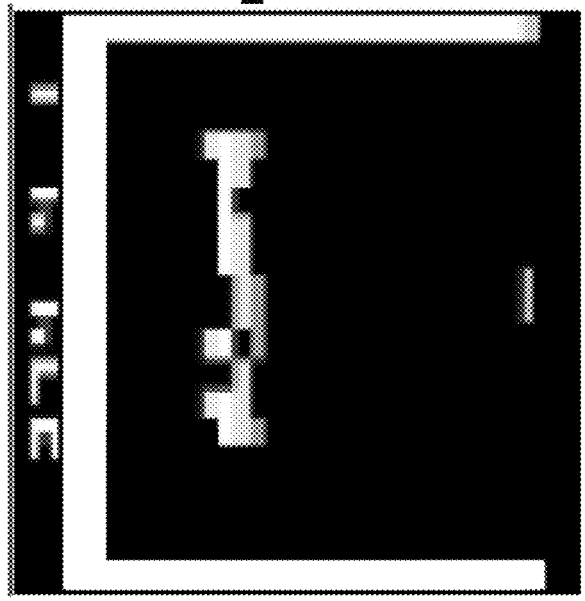
Figure 12E:
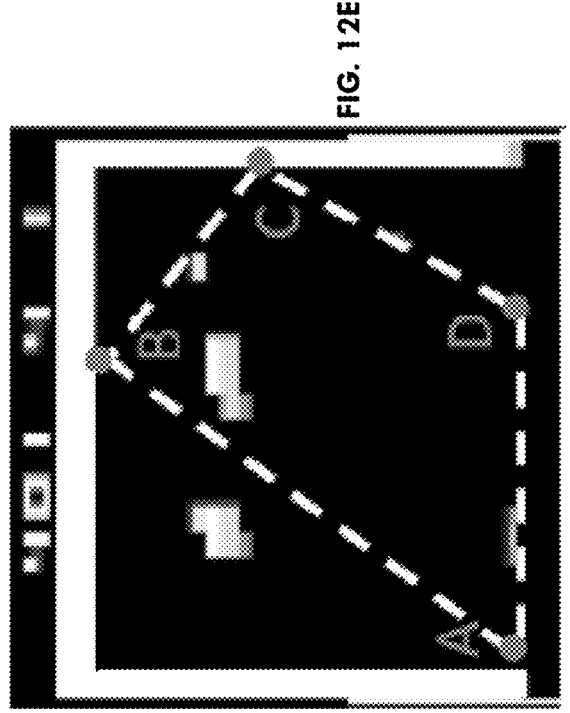

Referring to FIG. 12B, the result of applying the PD algorithm to the DQN model may be shown. The model may generate a relatively long episode (e.g., 25,000 steps), and the episode may be cut into three phases. By zooming into different segments of the first phase (e.g., roughly before iteration 1,800), the agent may be observed to have played the game very well at area 12*b*1, and the PD algorithm may have worked relatively well in terminating the repetition of one action at area 12*b*2. For example, referring to area 12*b*2, the model/agent 520 may have determined that the noop action has been repeated 20 times, and a random action 530 (e.g., represented by a colored/shaded bar, such as a blue bar, cyan bar, and/or the like) may be introduced. However, the random action 530 may be another noop and the latest 20 actions may all be noop. Another random action 530 (e.g., a left movement, represented by a second colored/shaded bar) may be introduced, and it may break the repetition of noop. In Phase II, the agent 520 may be observed to have been trapped by the environment 510. For example, based on zooming into this phase, starting at area 12*b*3, the agent 520 may be found to keep repeating the same pattern and the pattern length may be very long (e.g., at areas 12*b*4 and 12*b*5), e.g., around 50 iterations. By clicking on the segment to replay the video clip, as shown in FIG. 12E, the agent 520 may be observed to keep moving the paddle 51 between points A and D to catch the ball 52, and the ball 52 may repeat the loop between the following points: A-B-C-D-C-B-A. A random action may not have been introduced as the length of the repeating pattern exceeds the threshold (e.g., 7) based on the buffer size of the PD algorithm (e.g., one third of 20). In Phase III, the game may be observed to have crashed. However, by exploring different segments in Phase III, the PD algorithm may be observed to have worked well in breaking short repeating patterns. For example, in area 12*b*7, the pattern left-fire-right-fire may be detected and the pattern may repeat three times. Additionally or alternatively, a random action 530 (e.g., noop) may be introduced. However, the same pattern may start repeating again after this random action 530 (e.g., area 12*b*8), and it may repeat another three times. Additionally or alternatively, more random actions 530 may be introduced again to finally break this pattern.

Figure 13:
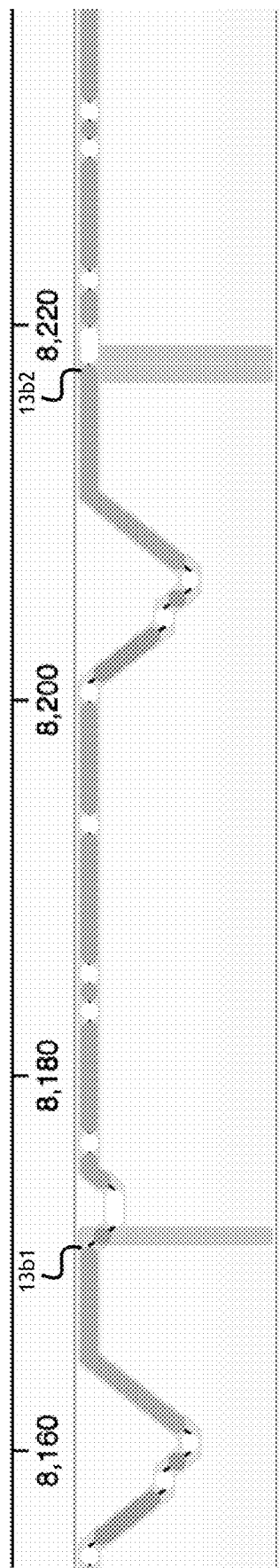
FIG. 13 is a screenshot of a visual analytic framework according to an implementation of a non-limiting embodiment or aspect of the process shown in FIG. 3.
Figure 14:
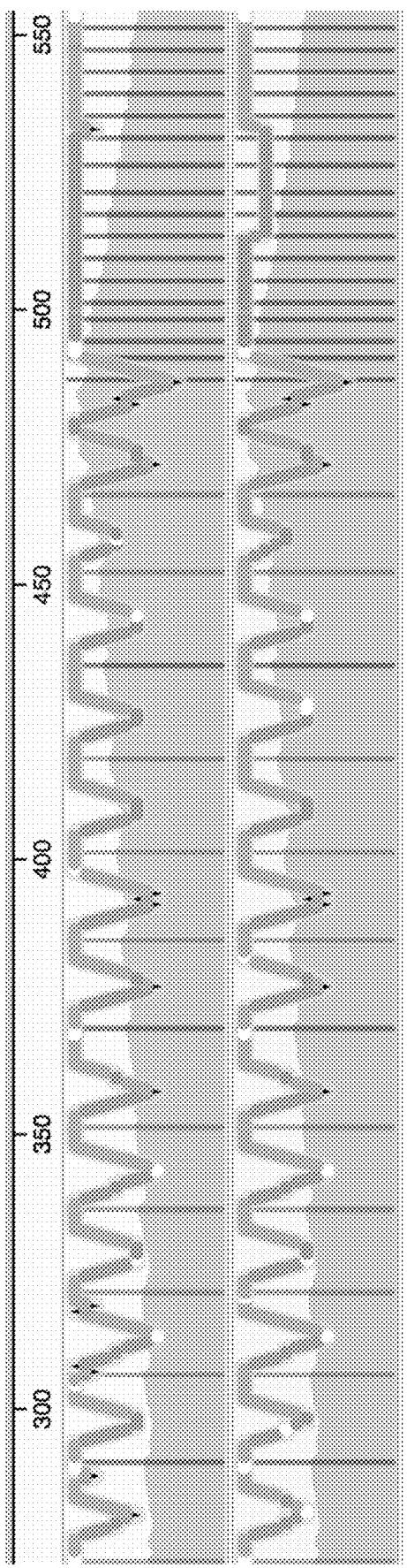
FIG. 14 is a screenshot of a visual analytic framework according to an implementation of a non-limiting embodiment or aspect of the process shown in FIG. 3.

Based on Experiment 2, one may infer that a repeating pattern may be longer than 7 iterations, and the game may crash due to a long repeating pattern (e.g., Phase II in FIG. 12B). For example, a long repeating pattern may start with the repeating of the left action for around 10 times (e.g., FIG. 12B, at area 12*b*5). In some non-limiting embodiments or aspects, the buffer length may be reduced from 20 to 10 (e.g., introducing a random action 530 if the agent 520 repeats the same action for 10 iterations) (Experiment 3). Referring to FIG. 13, the results of Experiment 3 may be displayed, and the result may be similar to Experiment 2. Zooming into the new result, the repeating of left at the beginning of the long pattern may have been detected and random actions 530 may be successfully introduced (e.g., in area 13*b*1). However, the changed buffer length may not be sufficient to break the pattern, and the pattern may keep repeating until the game crashes (e.g., area 13*b*2).

In some non-limiting embodiments or aspects, the pattern length in the PD algorithm may be set to 50 (e.g., up from 7 in Experiment 2). Additionally or alternatively, the buffer size may be increased to 100 (e.g., up from 20 in Experiment 2), and a random action 530 may be introduced if a pattern repeats twice. After applying these changes, 25,000 iterations (e.g., testing iterations) may be performed (Experiment 4). During such iterations, the agent 520 may be observed to play the game very well and it may avoid being trapped by the environment 510. For example, in 25,000 steps, the agent 520 may play 12 episodes of the game and/or may receive 5,223 points in total rewards. The number of random actions 530 introduced during these 25,000 steps may be 501, which may be less than the number of random moves that would have been generated by simply setting the random rate to 0.05 (e.g., 5% of 25,000 is 1,250).

Referring to Table 2, the top two rows may show the quantitative comparison of the results using the 5% random rate and the PD algorithm (e.g., average results from 10 tests). In 25,000 iterations (e.g., testing iterations), the agent 520 using the PD algorithm may introduce less random actions 530 than an agent using the 5% random rate and/or may achieves more rewards 542 (e.g., about 800 more points). Additionally or alternatively, the PD algorithm may lead to less life losses, as the number of episodes per epoch may be less for an agent 520 using the PD algorithm than that of an agent 520 using the 5% random rate. In some non-limiting embodiments or aspects, the random rate (e.g., 5%) may be a hyperparameter that may be changed/adjusted in different tests. For the purpose of illustration and not limitation, in 25,000 steps, the PD algorithm may use about 500 random actions 530, which may be about 2% of 25,000. Therefore, a DQN agent 520 with a 2% random rate may be compared to an agent 520 using the PD algorithm, and the result may be shown in Table 2 (e.g., the last row). Although the number of random actions 530 may be similar to the PD algorithm, the total reward in 25,000 steps for an agent 520 using the 2% random rate may be much less than an agent 520 using the PD algorithm. This may indicate that the PD algorithm may effectively control when to introduce random actions.

TABLE 2

|  | steps/epoch | episodes/epoch | total rewards/epoch | random actions/epoch |
| --- | --- | --- | --- | --- |
| ε = 0.05 | 25,000 | 16.6 | 4198.6 | 1269.4 |
| PD Algorithm | 25,000 | 11.4 | 4899.2 | 503 |
| ε = 0.02 | 25,000 | 9.9 | 3780.8 | 492.1 |

Visualization may improve understanding about random actions 530. Additionally or alternatively, the choice of the pattern length may be a hyperparameter that may be adjusted. For example, the pattern length may be 50, which may be an informed choice based on experimental results (e.g., not an arbitrary length). For example, 50 iterations may be (or be close to) the upper bound, which may be the number of iterations that it takes for the ball 52 to complete a round trip between the paddle 51 and bricks 53. In some non-limiting embodiments or aspects, the PD algorithm may use extra time to perform pattern mining, and the amount of overhead may be quantified and summarized and the scenarios that the PD algorithm may be useful (e.g., more useful than a set random rate, taking into account the difference in time/resources for pattern mining) may be determined.

The techniques described herein may be applied in a wide variety of settings, such as implementing reinforcement learning to direct an RL agent 520 (e.g., DQN agent 520) and/or the like in any setting suitable for machine learning, e.g., to play videogames (e.g., other than Breakout®), to authorize a payment transaction, detect fraud in a payment transaction, to recognize patterns (e.g., speech recognition, facial recognition, and/or the like), to automate tasks, to improve cybersecurity, and/or the like. For example, with reference to other games, the difference from Breakout® may include the screen size, possible actions, pattern scalability, and/or the like. For the purpose of illustration, the techniques described herein may be applied to games including other Atari® games, e.g., games involving simple movements, such as Pong®, Space-Invaders®, Enduro®, and/or the like. Additionally or alternatively, games containing very sophisticated scenes may be difficult for a DQN agent to extract useful movement patterns, e.g., Montezuma's Revenge®, Gravitar®, and/or the like.

Figure 16:
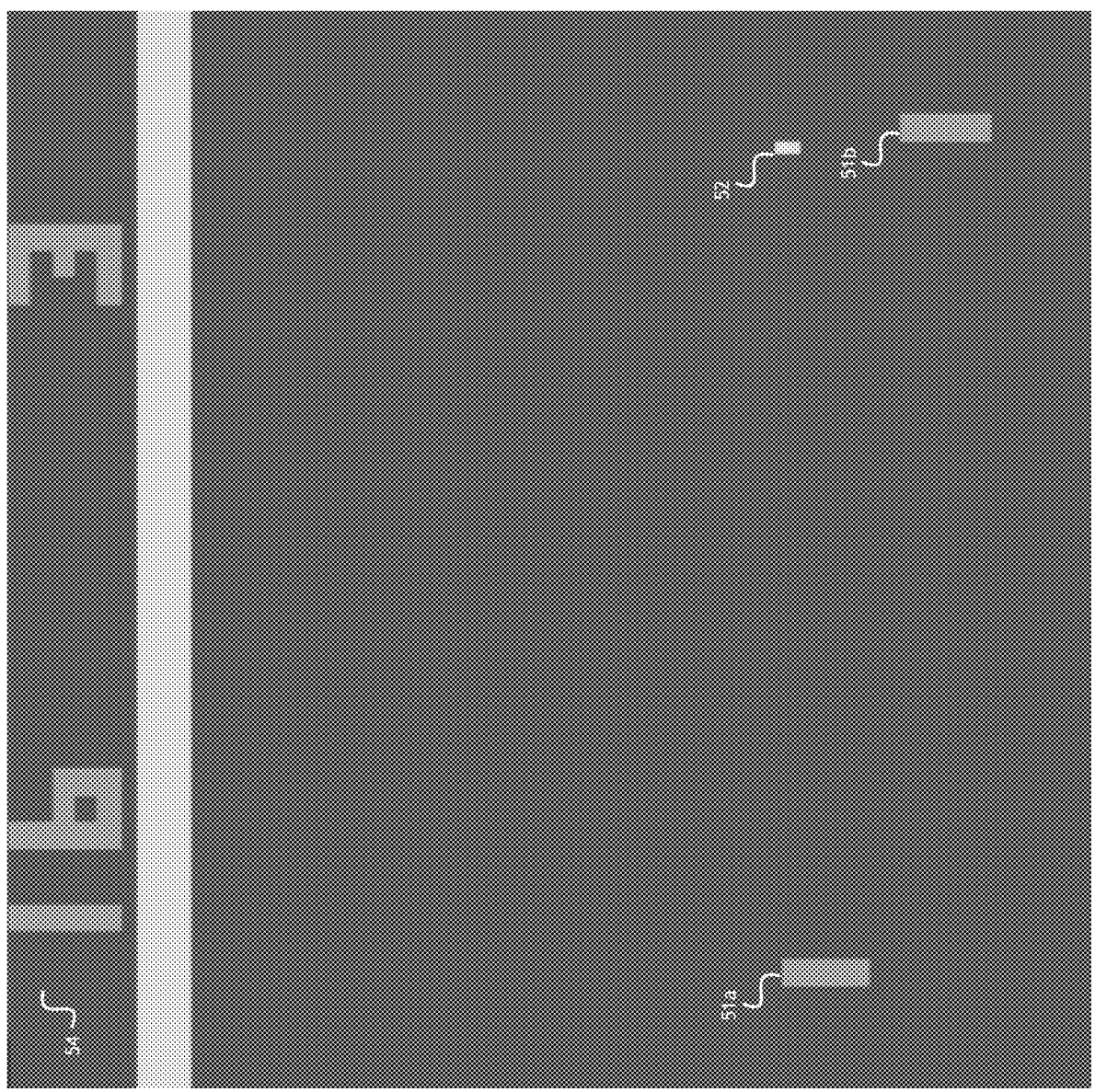
FIG. 16 is a screenshot of a videogame according to an implementation of a non-limiting embodiment or aspect of the process shown in FIG. 3.

Referring to FIG. 16, a screenshot of the game Pong® for Atari® 2600 is depicted. For the purpose of illustration, a first paddle 51a and a second paddle 51b may move up and down near the left and right edges of the screen, respectively, and a ball 52 may move between the paddles 51a, 51b. Additionally, an area 54 may display the scores (e.g., the left number corresponding to the score for first paddle 51a and the right number corresponding to the score for second paddle 51b).

Figure 17:
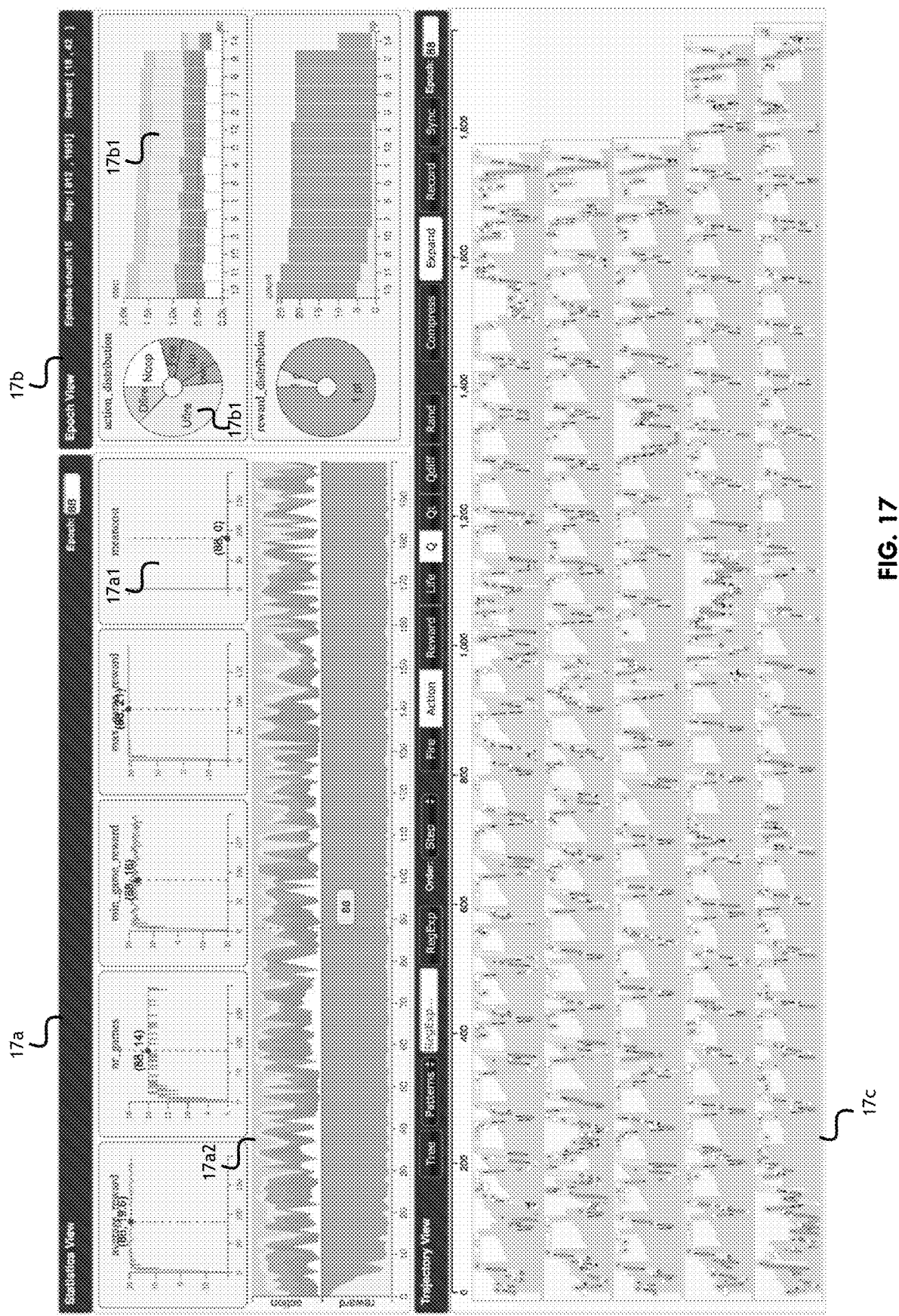
FIG. 17 is a screenshot of a visual analytic framework according to an implementation of a non-limiting embodiment or aspect of the process shown in FIG. 3.

Referring to FIG. 17, a screenshot of a visual analytic framework may be displayed for a DQN agent playing Pong®. The framework may be similar to the framework described above (e.g., FIG. 4), but may include six actions (e.g., instead of four): no-operation (noop), firing the ball (fire), moving up (up), moving down (down), moving up and firing the ball (Ufire), moving down and firing the ball (Dfire). The possible rewards may be −1 (the agent 520 fails to catch the ball 52, e.g., when the computer opponent gets 1 point), 0, and 1 (the agent 520 makes the computer opponent fail to catch the ball 52). The proposed model improvement techniques described herein may also be applied to this game similarly to the game Breakout®. As shown in FIG. 17, the visual analytic may include at least three views, including statistics view 17a (e.g., with line charts 17a1, stacked area charts 17a2, and/or the like), epoch view 15b (e.g., with pie charts 17b1, stacked bar charts 17b2, and/or the like), and trajectory view 17c (e.g., with a visual overview of the action/reward patterns and/or the like), and/or the like.

Figure 18:
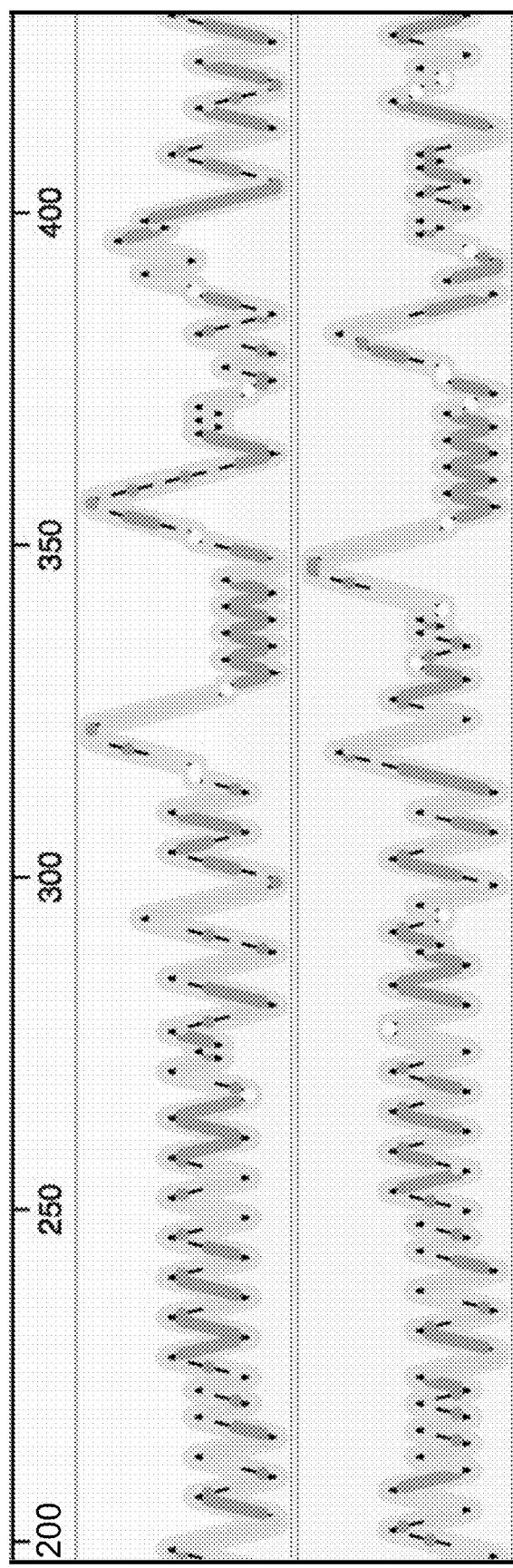
FIG. 18 is a screenshot of a visual analytic framework according to an implementation of a non-limiting embodiment or aspect of the process shown in FIG. 3.

Referring to FIG. 18, a screenshot of a movement pattern (e.g. hesitating) in a portion of a trajectory view (e.g., similar to FIGS. 4, 4C, 7G-7J, and 17) of the visual analytic framework for the game Pong® may be displayed.

Figure 19A:
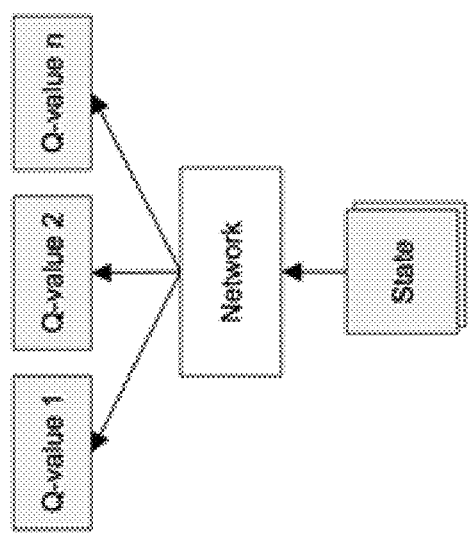
FIGS. 19A and 19B are diagrams of implementations of non-limiting embodiments or aspects of the process shown in FIG. 3.

Referring to FIG. 19A, an implementation of a DQN network is depicted. For the purpose of illustration, the input of the network (e.g., neural network(s)) may be the state 541 (e.g., of the environment 510) and the outputs may be the expected rewards 542 (e.g., q values, such as Q-value 1, Q-value 2, . . . , Q-value n, and/or the like) of different actions (e.g., action 1, action 2, . . . , action n, respectively). Additionally, after one or more iterations (e.g., 4 iterations), Q-learning may occur. For example, a loss function may be represented by the following equation:

$$L = \frac{1}{2}[\underbrace{r + \max_a Q(s', a')}_{target} - \underbrace{Q(s, a)}_{prediction}]^2$$

In the above equation, (s, a) may represent the pre-state 541 and predicted action 530, and (s', a') may represent the post-state 541 and predicted future action 530, and Q may be a neural network. Additionally or alternatively, to predict the future reward 542 based on the future state 541 and future action 530, a second neural network ($Q_t$) may be used. For example, the parameters of Q may be copied to $Q_t$ after a predetermined, adjustable, or dynamic number of iterations (e.g., every 1,000 iterations), and the number of iterations may be a hyperparameter. In some non-limiting embodiments or aspects, a Q-learning algorithm may be summarized as follows:

1. Do a feedforward pass for the current state s to get predicted q values for all actions.
2. Do a feedforward pass for the next state s' and calculate maximum overall network outputs $\max_a Q(s', a')$.
3. Set q value target for action to $r + y\max_a Q(s', a')$. For all other actions, set the q value target to the same as originally returned from step 1, making the error 0 for those outputs.
4. Update the weights using backpropagation.

Figure 19B:
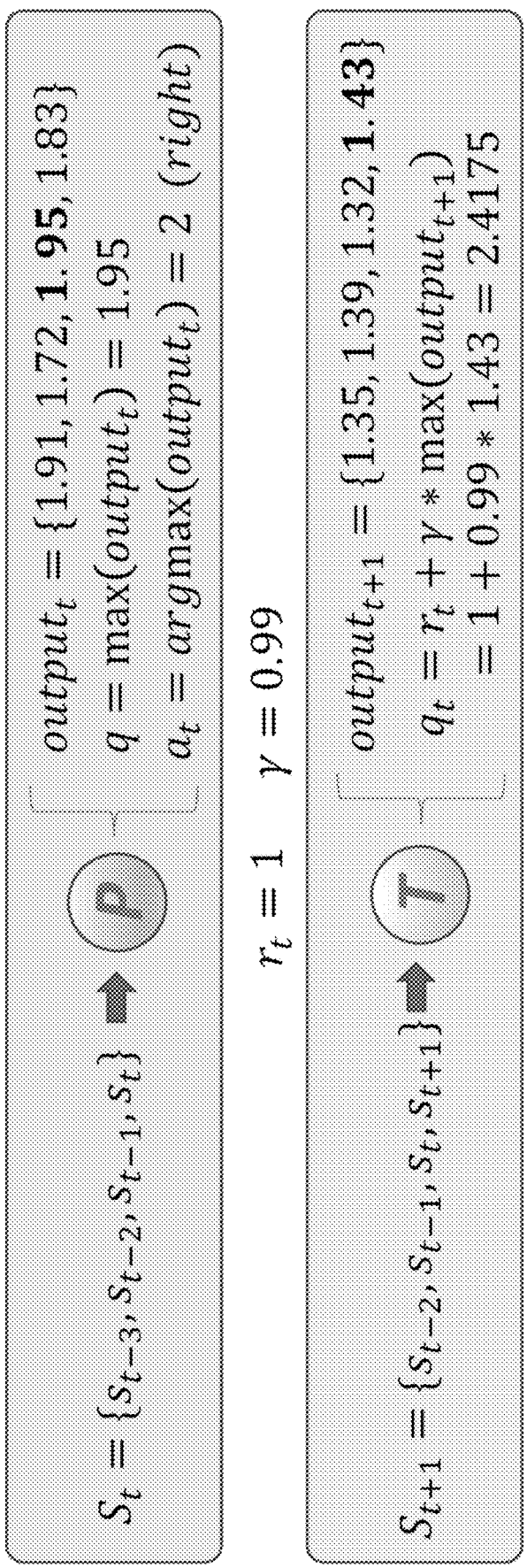

Referring to FIG. 19B, an exemplary loss calculation for a learn stage of an exemplary DQN network is depicted. The current state $S_t$ may include a set of inputs (e.g., images and/or the like) $s_{t-3}$, $s_{t-2}$, $s_{t-1}$, and $s_t$, as described herein. P may be a neural network, and the output$_t$ may represent the outputs of the neural network based on the inputs, as described herein. The q-value (q) may be the maximum of the outputs, as described herein. The predicted action ($a_t$) may be the action corresponding to the maximum output, as described herein. The predicted rewards may be represented by $r_t$, and y may represent a discount factor, as described herein.

Figure 20:
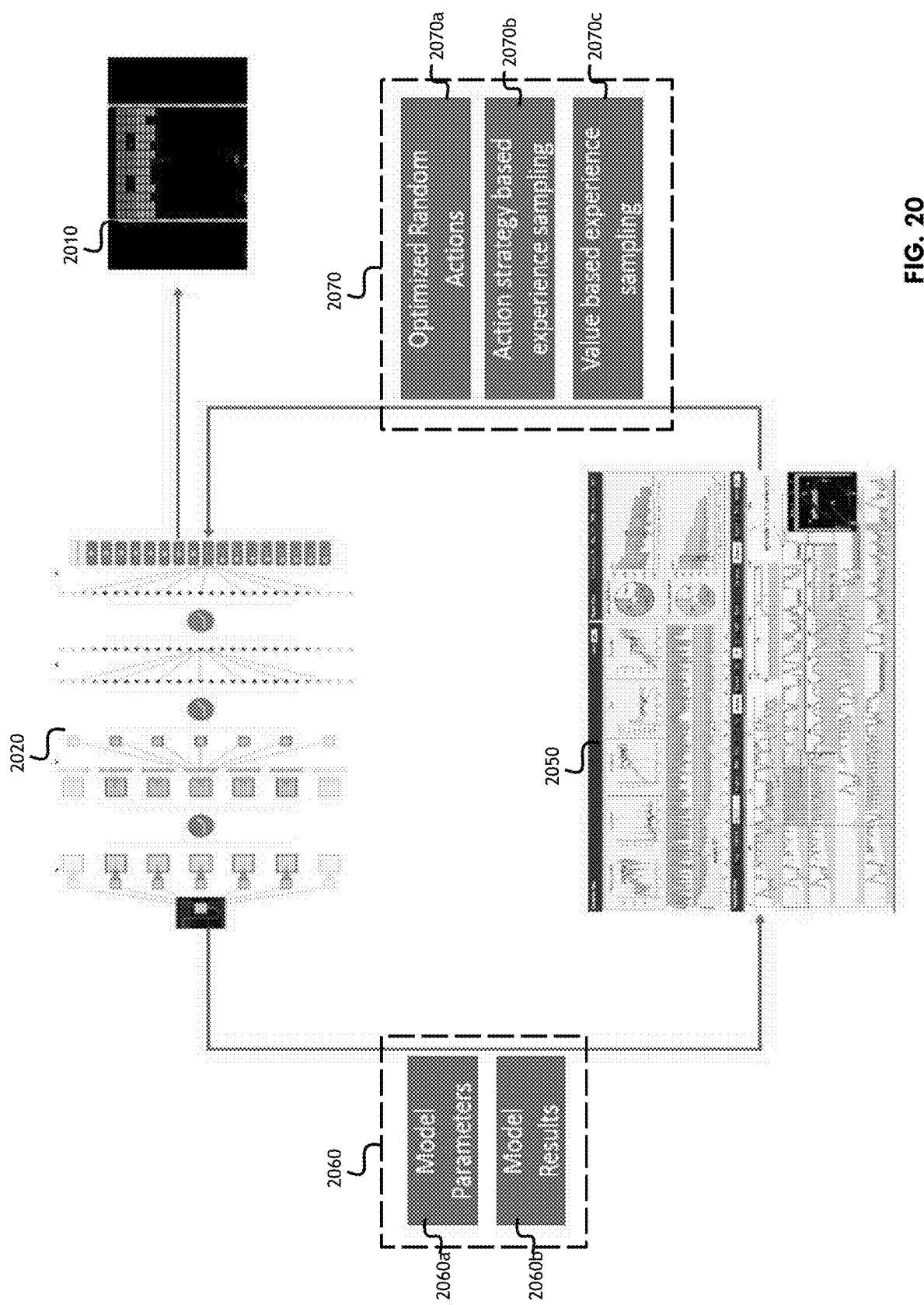
FIGS. 20-25 are diagrams of implementations of non-limiting embodiments or aspects of the process shown in FIG. 3.

Referring to FIG. 20, an exemplary implementation of the process 300 is depicted. For example, an agent may include a DQN model 2020 and may perform training and/or testing iterations in environment 2010. Data may be collected at 2060 (e.g., model parameters 2060a, model results/rewards 2060b, and/or the like), as described herein. As shown in FIG. 20, the model 2020 (e.g., DQN model of an agent 520 and/or the like) may be trained in an environment 2010 (e.g., the same as or similar to environment 510). For example, during an initialization stage, the model 2020 may use all random actions for the first 5000 iterations to initialize the model. Additionally or alternatively, after the initialization stage, by default, the model 2020 may use a certain parameters 2060a, e.g., a predetermined and/or selected random rate (e.g., 5% during testing iterations, 10% during training iterations, and/or the like). Additionally or alternatively, the model 2020 using such model parameters 2060a may produce certain results 2060b (e.g., action/movement patterns, rewards, lives lost, game termination, states, collected data, and/or the like), as described herein. In some non-limiting embodiments or aspects, the model parameters 2060a and/or results 2060b may be provided as inputs 2060 to a visual analytic framework 2050, as described herein. Based on the visual analytic framework 2050, changes/modifications 2070 to the model 2020 and/or the model parameters 2060a may be made to improve performance of the model 2020, as described herein. In some non-limiting embodiments or aspects, the changes/modifications 2070 may include adjusting and/or controlling the sampling of tuples (e.g., from experience replay memory) for training. For example, action strategy-based experience sampling 2070b, value-based experience sampling 2070c, and/or the like may be used, as described herein. In some non-limiting embodiments or aspects, the cycle may repeat using the changed/modified model 2020 and/or parameters 2060b to perform more iterations in environment 2010, to collect more inputs 2060 (e.g., results 2060b), to analyze the collected data (e.g., by visual analytical framework 2050), to make additional changes 2070, and/or the like.

Figure 21:
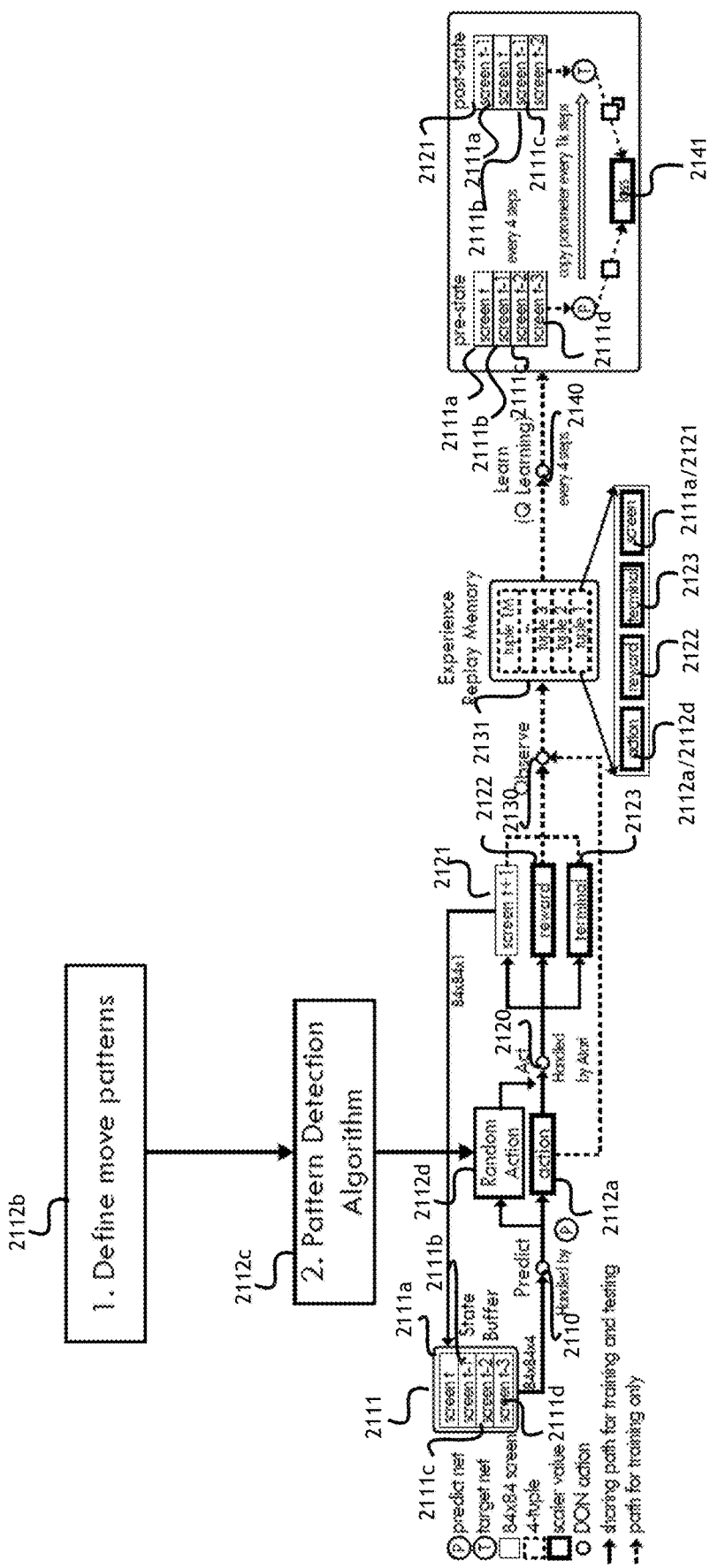

Referring to FIG. 21, an exemplary implementation of improving (e.g., optimizing) random actions for improving a model according to the process 300 is depicted. For example, the random rate may be adjusted and/or the use of random actions may be controlled, as described herein. In some non-limiting embodiments, at 2112b, at least one action/movement pattern may be defined, as described herein. Additionally or alternatively, at 2112c, the action/movement pattern(s) may be detected (e.g., by a pattern detection algorithm and/or the like), as described herein. In some non-limiting embodiments, based on the detection of such an action/movement pattern, a random action may be introduced and/or the random rate may be increased, as described herein. For example, rather than use a set number, the random rate may be initially set to 0%, and if one or more patterns (e.g., action patterns, movement patterns, and/or the like) are detected, a random action may be introduced and/or the random rate may be increased (e.g., to 5%, which is equal to 0.05, or another number, percentage, fraction, and/or the like). Additionally or alternatively, the random rate may depend on the environment (e.g., the game). As such, the model may become more efficient without taking unnecessary random actions, as described herein. In some non-limiting embodiments or aspects, at the predict stage 2110, the neural network (e.g., P) of the model may predict an action 2112a based on the inputs (e.g., screens 2111a-2111d) in the state buffer 2111, as described herein. Additionally or alternatively, a random action 2112d may be introduced (e.g., based on the random rate and/or the pattern detection algorithm 2112c), as described herein, which may supersede the predicted action 2112a. At the Act stage 2120, the agent may perform the predicted action 2112a or the random action 2112d (e.g., based on the random rate and/or the pattern detection 2112c), as described herein. The predicted action 2112a or random action 2112d may produce the next state (e.g., screen 2121), a reward 2122, a terminal state 2123 (e.g., life loss, game over, and/or the like), as described herein. At the observe stage 2130, the experience replay memory 2131 may store tuples of the predicted action 2112a or random action 2112d, reward 2122, terminal state 2123, screen 2111a, and/or next screen 2121, as described herein. At the learning stage 2140, a loss 2141 between the neural network (e.g., P) and a target neural network (e.g., 7) may be calculated and used for backpropagation, as described herein.

Figure 22:
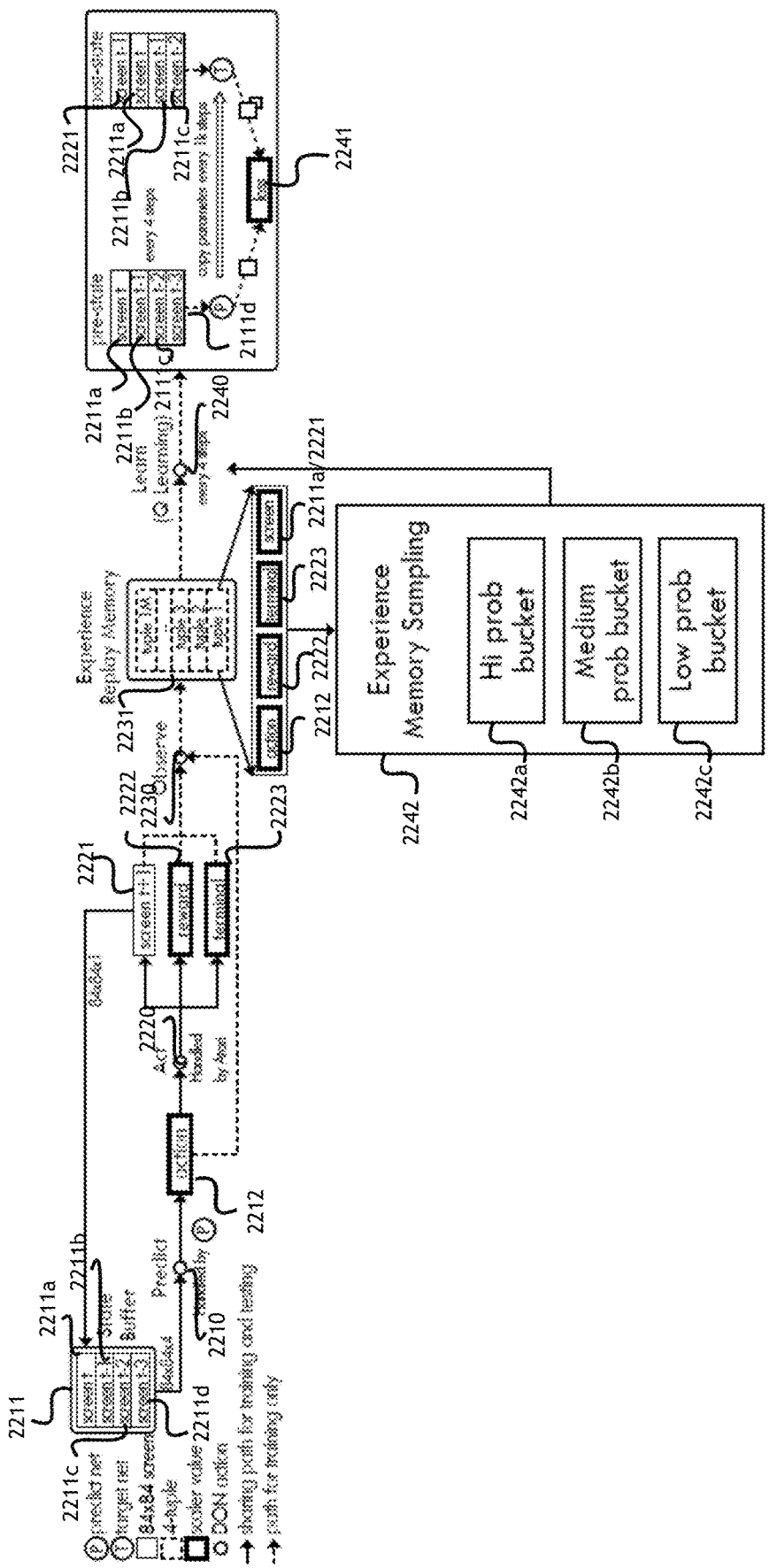

Referring to FIG. 22, an exemplary implementation of experience memory sampling for improving a model according to the process 300 is depicted. In some non-limiting embodiments or aspects, at the predict stage 2210, the neural network (e.g., P) of the model may predict an action 2212a based on the inputs (e.g., screens 2211a-2211d) in the state buffer 2211, as described herein. Additionally or alternatively, a random action 2212d may be introduced (e.g., based on the random rate and/or the pattern detection 2212c), as described herein, which may supersede the predicted action 2212a. At the Act stage 2220, the agent may perform the predicted action 2212a or the random action 2212d (e.g., based on the random rate and/or the pattern detection 2212c), as described herein. The predicted action 2212a or random action 2212d may produce the next state (e.g., screen 2221), a reward 2222, a terminal state 2223 (e.g., life loss, game over, and/or the like), as described herein. At the observe stage 2230, the experience replay memory 2231 may store tuples of the predicted action 2212a or random action 2212d, reward 2222, terminal state 2223, screen 2211a, and/or next screen 2221, as described herein. At the learning stage 2240, a tuple for learning may be selected (e.g., rather than merely randomly chosen, using the most recent tuple, and/or the like). For example, by default, a model (e.g., DQN model) may use a uniform sampling by randomly selecting tuples from experience replay memory 2231 when performing Q-learning during training, as described herein. Rather than choosing a random tuple with an equal probability for each tuple, each tuple may be assigned to one of a set of categorizations (e.g., buckets) with different sampling rates (e.g., a high probability bucket/categorization 2242a, a medium probability bucket/categorization 2242b, a low probability bucket/categorization 2242c, and/or the like). Additionally or alternatively, the model may be forced to learn more from good experiences (e.g., tuples in a category based on a pattern determined to be desirable, based on a high reward, and/or the like) and learn less from bad experiences (e.g., tuples in a category based on a pattern determined to be undesirable, based on a lack of reward, based on a terminal state (e.g., life loss or game over), and/or the like) by having a high sampling rate for good experiences (e.g., high probability bucket/categorization 2242a) and a low sampling rate for bad (e.g., low probability bucket/categorization 2242c). For the purpose of illustration, each bucket may be assigned with a sample rate. For example, assuming three buckets, sampling probabilities may be: low probability bucket/categorization 2242c (L)=0.1, medium probability bucket/categorization 2242b (M)=0.3, high probability bucket/categorization 2242a (H)=0.6. The sum of the sampling rates may be 1. Additionally or alternatively, when the agent (e.g., DQN agent) needs to select a tuple from the experience replay memory 2231 (e.g., after a certain number of iterations, as described herein), the agent employ experience memory sampling 2242. For example, the agent may generate a random number (e.g., 0.2). Referring to the aforementioned sampling rates, the agent may then select a tuple from the categorization/bucket corresponding to the generated random number (e.g., with L=0.1, M=0.3, H=0.6), a random number of 0.2 should fall into the M bucket with range greater than 0.1 and less than or equal to 0.4 (i.e., 0.1+0.3), which may be expressed as (0.1, 0.1+0.3]. Additionally or alternatively, the agent may select a tuple from the M bucket. Additionally or alternatively, every tuple in ER memory 2231 may be assigned to a categorization/bucket. Additionally or alternatively, a loss 2241 between the neural network (e.g., P) and a target neural network (e.g., 7) may be calculated and used for backpropagation, as described herein.

Figure 25:
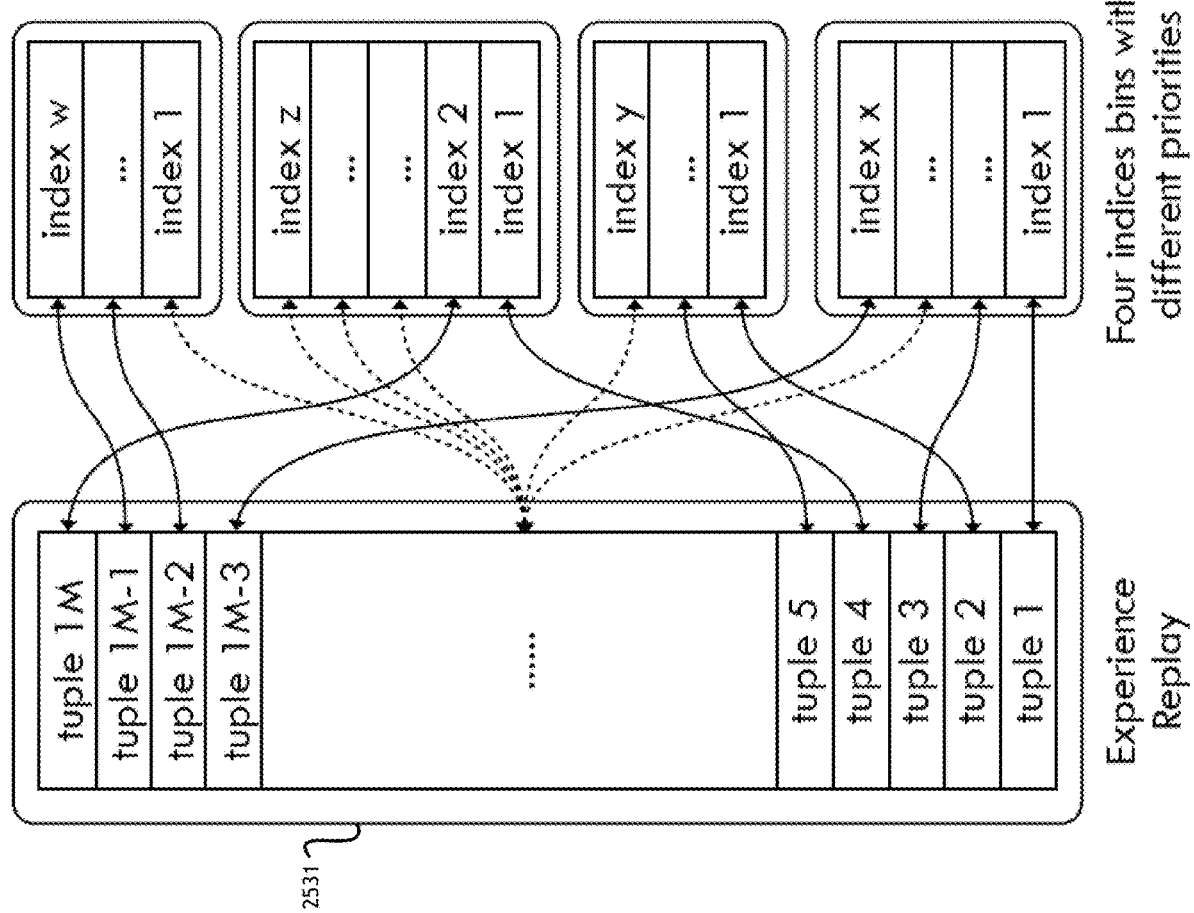

Referring to FIG. 25, an exemplary implementation of experience memory sampling for improving a model according to the process 300 is depicted. For the purpose of illustration, the experience replay (ER) memory may include tuples (e.g., 1 million (1M) tuples, which are categorized into four buckets/categorizations (e.g., index w, index x, index y, and index z). Each bucket/categorization may have its own sampling probability. For example, bucket w may have a high probability, bucket z may have a medium-high probability, bucket y may have a medium-low probability, and bucket x may have a low probability, relative to each other. Additionally or alternatively, each bucket may include an index (e.g., a key, pointer, identifier, and/or the like) linking to the actual tuples in the ER memory list. The tuples with identified patterns may be assigned to different buckets based on how good/bad the patterns are determined/deemed to be (e.g., desirable patterns, undesirable patterns, patterns associated with higher rewards, patterns associated with lower rewards, patterns associated with lack of reward, patterns associated with life loss and/or game over, and/or the like).

Figure 23:
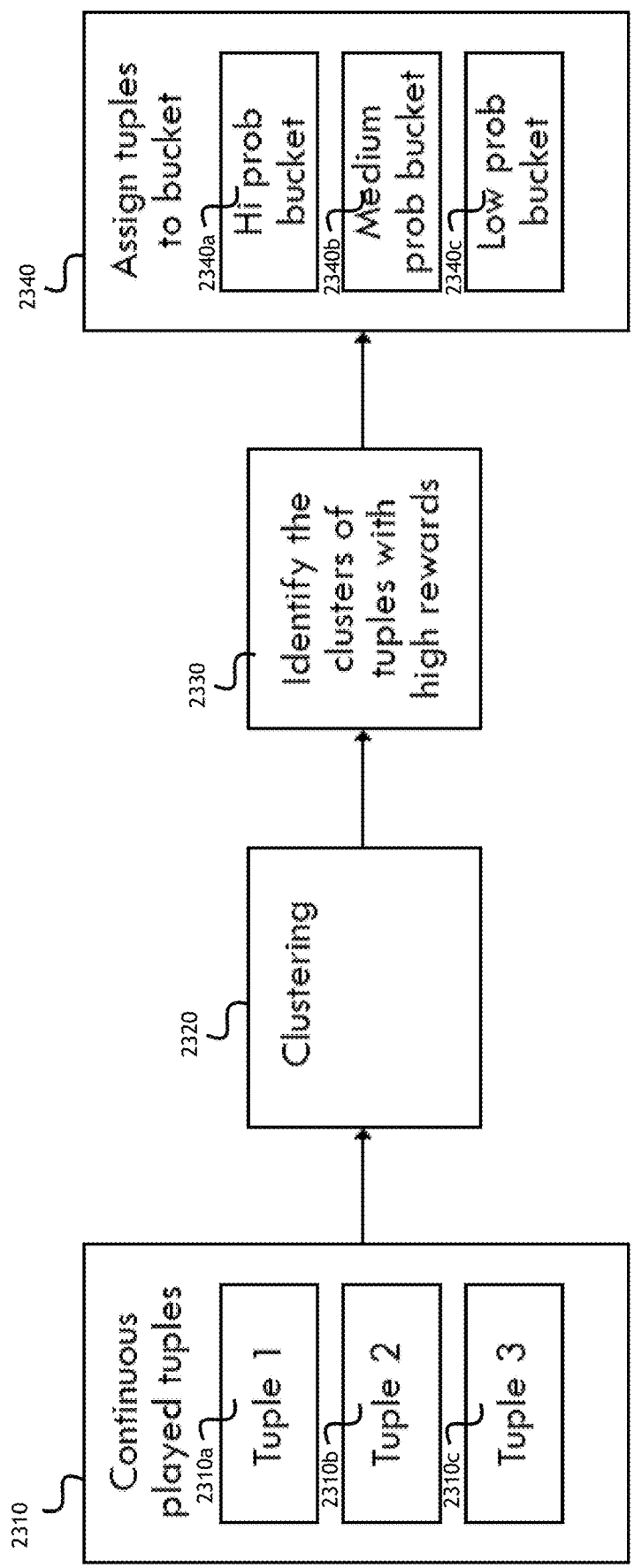

Referring to FIG. 23, an exemplary implementation of strategy-based experience memory sampling for improving a model according to the process 300 is depicted. For example, the sequence segments (e.g., tuples 1-3 and/or the like) may be stored at 2310. Additionally or alternatively, at 2320, the segments may be clustered into k clusters, e.g., $C_1$, $C_2$, ..., $C_k$, as described herein. In some non-limiting embodiments or aspects, each cluster may be a bucket/categorization, as described herein. In some non-limiting embodiments, at 2330, the desirability of each cluster may be identified (e.g., based on determining whether the tuples are associated with high rewards, desirable outcomes, undesirable outcomes, low rewards, no rewards, life loss, game over, and/or the like), as described herein. For example, the average rewards ($AvgR_i$) associated for each cluster, $C_i$, may be calculated (e.g., based on the rewards (r) and number of actions ($N_{actions}$) in $C_i$) as follows:

$$AvgR_i = \frac{\sum_{r \ in \ C_i} \text{Rewards}}{N_{actions}}$$

Additionally or alternatively, at 2340, each tuple in each cluster may be assigned into a bucket (e.g., high probability bucket 2340a, medium probability bucket 2340b, low probability bucket 2340c), as described herein. For example, the tuples in each cluster may be assigned to a bucket based on the average rewards. In some non-limiting embodiments or aspects, the sampling probability ($Prob_i$) of each bucket may be proportional to the average rewards over all buckets (e.g., clusters):

$$Prob_i = \frac{AvgR_i}{\sum_i^k AvgR_i}$$

Figure 24:
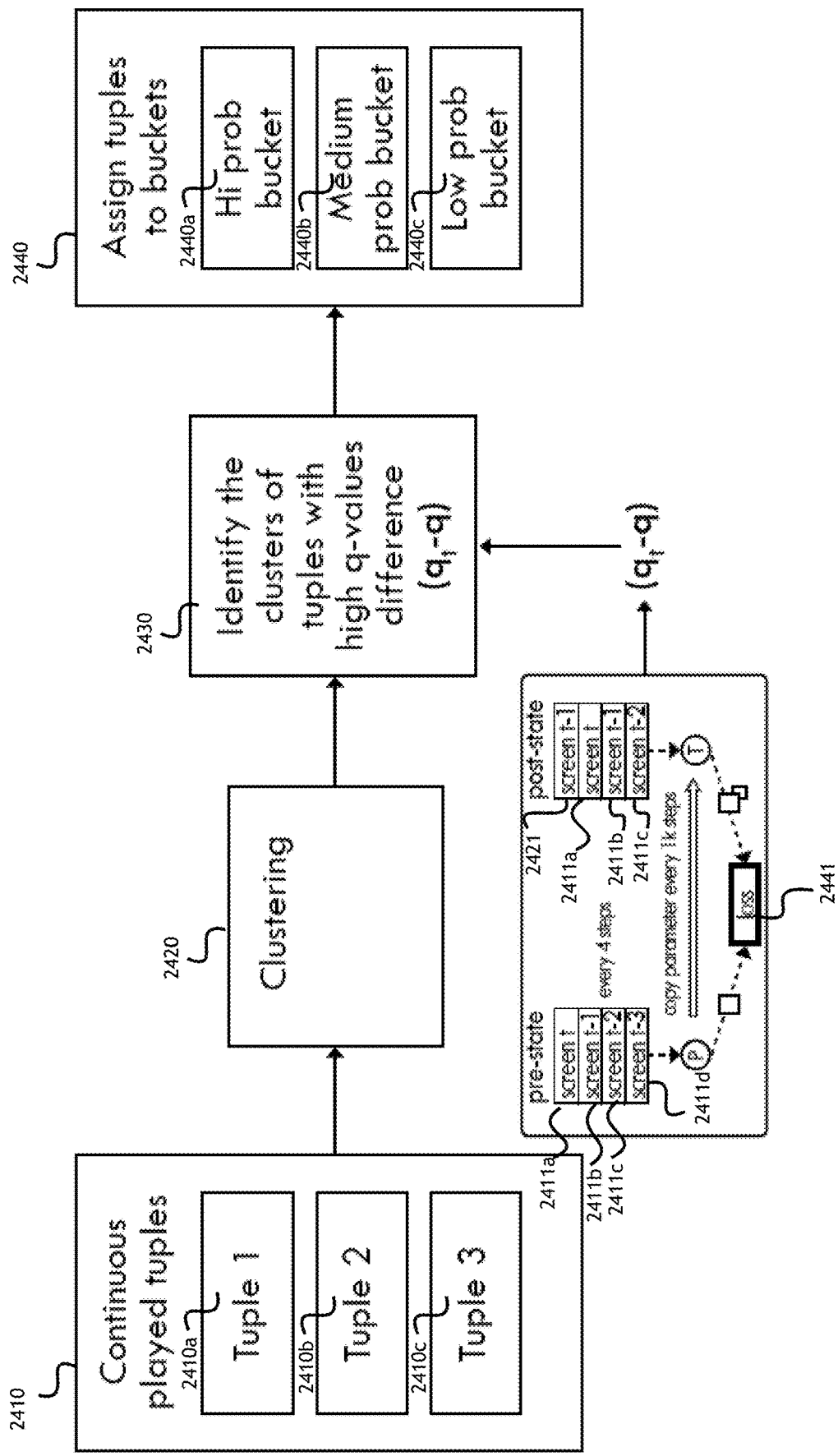

Referring to FIG. 24, an exemplary implementation of value-based experience memory sampling for improving a model according to the process 300 is depicted. For example, the sequence segments (e.g., tuples 1-3 and/or the like) may be stored at 2410. Additionally or alternatively, at 2420, the sequence segments may be clustered into k clusters, e.g., $C_1$, $C_2$, ..., $C_k$, as described herein. In some non-limiting embodiments or aspects, each cluster may be a bucket/categorization as described herein. In some non-limiting embodiments, at 2430, the desirability of each cluster may be identified (e.g., based on determining whether the tuples are associated with high rewards, desirable outcomes, undesirable outcomes, low rewards, no rewards, life loss, game over, and/or the like), as described herein. For example, the average q value difference (e.g., $Q_{diff}=|Q_t-Q|$) associated for each cluster, $C_i$, may be calculated as follows:

$$AvgQdiff_i = \frac{\sum_{r \ in \ C_i} Qdiff}{N_{actions}}$$

which may be the sum total of $Q_{diff}$ in $C_i$ over the number of actions in $C_i$. Additionally or alternatively, at 2440, each tuple in each cluster may be assigned into a bucket (e.g., high probability bucket 2440a, medium probability bucket 2440b, low probability bucket 2440c), as described herein. For example, the sampling probability of each bucket may be proportional to the average q value difference (e.g., $Q_{diff}$) over all buckets (e.g., clusters):

$$Prob_i = \frac{AvgQdiff_i}{\sum_i^k AvgQdiff_i}$$

Although the disclosed subject matter has been described in detail for the purpose of illustration based on what is currently considered to be the most practical and preferred embodiments or aspects, it is to be understood that such detail is solely for that purpose and that the disclosed subject matter is not limited to the disclosed embodiments or aspects, but, on the contrary, is intended to cover modifications and equivalent arrangements that are within the spirit and scope of the appended claims. For example, it is to be understood that the present disclosed subject matter contemplates that, to the extent possible, one or more features of any embodiment or aspect can be combined with one or more features of any other embodiment or aspect.

What is claimed is:

1. A method for implementing reinforcement learning by a neural network, comprising:
   for each epoch of a first predetermined number of epochs, performing a second predetermined number of training iterations and a third predetermined number of testing iterations using a first neural network, the first neural network comprising a first set of parameters, the training iterations comprising a first set of hyperparameters, and the testing iterations comprising a second set of hyperparameters;
   dividing the testing iterations into segments, each segment comprising a fourth predetermined number of testing iterations;
   determining a first pattern based on at least one of the segments; and
   adjusting at least one of the first set of hyperparameters or the second set of hyperparameters based on the pattern,
   wherein each training iteration comprises:
      receiving first state data indicating a first state of an environment;
      determining a first action from a set of possible actions based on the first state data using the first neural network;
      performing the first action within the environment;
      receiving second state data indicating a second state of the environment after performance of the first action and first reward data indicating a first reward achieved in the environment by performance of the first action; and
      storing first action data indicating the first action, the first reward data, the first state data, and the second state data,
   wherein a subset of the training iterations further comprises updating the first set of parameters of the first neural network based on at least one of the action data, the reward data, the first state data, and the second state data, wherein the subset of the training iterations is determined based on the first set of hyperparameters,
   wherein the method further comprises copying the first set of parameters from the first neural network to a second neural network after a fourth predetermined number of training iterations, and
   wherein updating the first set of parameters comprises:
      determining a first predicted reward based on the first state data using the first neural network;
      determining a second predicted reward based on the second state data and the first reward data using the second neural network; and
      adjusting the first set of parameters to reduce a difference between the first predicted reward and the second predicted reward.

2. The method of claim 1, further comprising:
   displaying a first view comprising a first chart of a first type and a second chart of a second type different than the first type, the first chart and second chart each representing all testing iterations of all epochs;
   displaying a second view comprising a third chart of a third type and a fourth chart of a fourth type different than the third type, the third chart and the fourth chart each representing all testing iterations of one epoch of the first predetermined number of epochs;
   dividing the one epoch into episodes, each episode comprising a set of consecutive iterations of the testing iterations until a condition is satisfied; and
   displaying a third view comprising a fifth chart of a fifth type, the fifth chart representing all testing iterations of one episode,
   wherein the second view is displayed in response to an interaction with the first view, and wherein the third view is displayed in response to an interaction with the second view.

3. The method of claim 2, further comprising displaying a dendrogram representing a clustering of patterns including the first pattern.

4. The method of claim 3, wherein determining the first pattern comprises:
   selecting the first pattern from the dendrogram, wherein selecting the first pattern causes at least one segment of the one episode in the fifth chart of the third view to be highlighted; and
   observing the first pattern in the third view.

5. The method of claim 2, further comprising displaying a fourth view comprising a sixth chart of a sixth type, a seventh chart of a seventh type, and an eighth chart of an eighth type, the sixth chart representing all testing iterations of one segment, the seventh chart representing processing elements of the neural network during the one segment, and the eighth chart representing at least one of an average state of an environment and a saliency map of processing elements in response thereto.

6. The method of claim 2, wherein determining the first pattern comprises observing the first pattern in the third view.

7. The method of claim 1, wherein:
   each testing iteration comprises:
      receiving third state data indicating a third state of an environment,
      determining a second action from the set of possible actions based on the third state data using the first neural network,
      performing the second action within the environment, and
      receiving fourth state data indicating a fourth state of the environment after performance of the second action and second reward data indicating a second reward achieved in the environment by performance of the second action.

8. The method of claim 1, wherein adjusting the at least one of the first set of hyperparameters or the second set of hyperparameters comprises at least one of:
   adjusting at least one of a probability of determining a random action or a condition for determining the random action for at least one of the training iterations or the testing iterations; or
   adjusting at least one of a probability of using a first subset of training iterations or a condition for using the first subset of training iterations for updating the first set of parameters of the first neural network.

9. A system for implementing reinforcement learning by a neural network, comprising:
 at least one processor; and
 at least one non-transitory computer readable medium comprising instructions to direct the at least one processor to:
  for each epoch of a first predetermined number of epochs, perform a second predetermined number of training iterations and a third predetermined number of testing iterations using a first neural network, the first neural network comprising a first set of parameters, the training iterations comprising a first set of hyperparameters, and the testing iterations comprising a second set of hyperparameters;
  divide the testing iterations into segments, each segment comprising a fourth predetermined number of testing iterations;
  determine a first pattern based on at least one of the segments; and
  adjust at least one of the first set of hyperparameters or the second set of hyperparameters based on the pattern,
 wherein, for each training iteration, the instructions further direct the at least one processor to:
  receive first state data indicating a first state of an environment;
  determine a first action from a set of possible actions based on the first state data using the first neural network;
  perform the first action within the environment;
  receive second state data indicating a second state of the environment after performance of the first action and first reward data indicating a first reward achieved in the environment by performance of the first action; and
  store first action data indicating the first action, the first reward data, the first state data, and the second state data,
 wherein, for a subset of the training iterations, the instructions further direct the at least one processor to update the first set of parameters of the first neural network based on at least one of the action data, the reward data, the first state data, and the second state data, wherein the subset of the training iterations is determined based on the first set of hyperparameters,
 wherein the instructions further direct the at least one processor to copy the first set of parameters from the first neural network to a second neural network after a fourth predetermined number of training iterations, and
 wherein updating the first set of parameters comprises:
  determining a first predicted reward based on the first state data using the first neural network;
  determining a second predicted reward based on the second state data and the first reward data using the second neural network; and
  adjusting the first set of parameters to reduce a difference between the first predicted reward and the second predicted reward.

10. The system of claim 9, wherein the instructions further direct the at least one processor to:
 display a first view comprising a first chart of a first type and a second chart of a second type different than the first type, the first chart and second chart each representing all testing iterations of all epochs;
 display a second view comprising a third chart of a third type and a fourth chart of a fourth type different than the third type, the third chart and the fourth chart each representing all testing iterations of one epoch of the first predetermined number of epochs;
 divide the one epoch into episodes, each episode comprising a set of consecutive iterations of the testing iterations until a condition is satisfied; and
 display a third view comprising a fifth chart of a fifth type, the fifth chart representing all testing iterations of one episode,
 wherein the second view is displayed in response to an interaction with the first view, and wherein the third view is displayed in response to an interaction with the second view.

11. The system of claim 10, wherein the instructions further direct the at least one processor to:
 display a dendrogram representing a clustering of patterns including the first pattern.

12. The system of claim 11, wherein determining the first pattern comprises receiving a selection of the first pattern from the dendrogram, wherein selecting the first pattern causes at least one segment of the one episode in the fifth chart of the third view to be highlighted and determining the first pattern based on the third view.

13. The system of claim 10, wherein the instructions further direct the at least one processor to:
 display a fourth view comprising a sixth chart of a sixth type, a seventh chart of a seventh type, and an eighth chart of an eighth type, the sixth chart representing all testing iterations of one segment, the seventh chart representing processing elements of the neural network during the one segment, and the eighth chart representing at least one of an average state of an environment and a saliency map of processing elements in response thereto.

14. The system of claim 10, wherein determining the first pattern comprises determining the first pattern based on the third view.

15. The system of claim 9, wherein:
 for each testing iteration, the instructions further direct the at least one processor to:
  receive third state data indicating a third state of an environment,
  determine a second action from the set of possible actions based on the third state data using the first neural network,
  perform the second action within the environment, and
  receive fourth state data indicating a fourth state of the environment after performance of the second action and second reward data indicating a second reward achieved in the environment by performance of the second action.

16. The system of claim 9, wherein adjusting the at least one of the first set of hyperparameters or the second set of hyperparameters comprises at least one of adjusting at least one of a probability of determining a random action or a condition for determining the random action for at least one of the training iterations or the testing iterations or adjusting at least one of a probability of using a first subset of training iterations or a condition for using the first subset of training iterations for updating the first set of parameters of the first neural network.

17. A computer program product for implementing reinforcement learning by a neural network, the computer program product comprising at least one non-transitory computer-readable medium including one or more instructions that, when executed by at least one processor, cause the at least one processor to:

for each epoch of a first predetermined number of epochs, perform a second predetermined number of training iterations and a third predetermined number of testing iterations using a first neural network, the first neural network comprising a first set of parameters, the training iterations comprising a first set of hyperparameters, and the testing iterations comprising a second set of hyperparameters;

divide the testing iterations into segments, each segment comprising a fourth predetermined number of testing iterations;

determine a first pattern based on at least one of the segments; and adjust at least one of the first set of hyperparameters or the second set of hyperparameters based on the pattern, wherein, for each training iteration, the instructions further direct the at least one processor to:
  receive first state data indicating a first state of an environment;
  determine a first action from a set of possible actions based on the first state data using the first neural network;
  perform the first action within the environment;
  receive second state data indicating a second state of the environment after performance of the first action and first reward data indicating a first reward achieved in the environment by performance of the first action; and
  store first action data indicating the first action, the first reward data, the first state data, and the second state data, wherein, for a subset of the training iterations, the instructions further direct the at least one processor to, update the first set of parameters of the first neural network based on at least one of the action data, the reward data, the first state data, and the second state data, wherein the subset of the training iterations is determined based on the first set of hyperparameters, wherein the instructions further direct the at least one processor to copy the first set of parameters from the first neural network to a second neural network after a fourth predetermined number of training iterations, and wherein updating the first set of parameters comprises determining a first predicted reward based on the first state data using the first neural network, determining a second predicted reward based on the second state data and the first reward data using the second neural network, and adjusting the first set of parameters to reduce a difference between the first predicted reward and the second predicted reward.

18. The computer program product of claim 17, wherein the instructions further direct the at least one processor to:
  display a first view comprising a first chart of a first type and a second chart of a second type different than the first type, the first chart and second chart each representing all testing iterations of all epochs;
  display a second view comprising a third chart of a third type and a fourth chart of a fourth type different than the third type, the third chart and the fourth chart each representing all testing iterations of one epoch of the first predetermined number of epochs;
  divide the one epoch into episodes, each episode comprising a set of consecutive iterations of the testing iterations until a condition is satisfied; and
  display a third view comprising a fifth chart of a fifth type, the fifth chart representing all testing iterations of one episode,
  wherein the second view is displayed in response to an interaction with the first view, and wherein the third view is displayed in response to an interaction with the second view.

19. The computer program product of claim 18, wherein the instructions further direct the at least one processor to:
  display a dendrogram representing a clustering of patterns including the first pattern,
  wherein determining the first pattern comprises receiving a selection of the first pattern from the dendrogram, wherein selecting the first pattern causes at least one segment of the one episode in the fifth chart of the third view to be highlighted and determining the first pattern based on the third view.

20. The computer program product of claim 17, wherein:
for each testing iteration, the instructions further direct the at least one processor to:
  receive third state data indicating a third state of an environment,
  determine a second action from the set of possible actions based on the third state data using the first neural network,
  perform the second action within the environment, and
  receive fourth state data indicating a fourth state of the environment after performance of the second action and second reward data indicating a second reward achieved in the environment by performance of the second action.

* * * * *